United States Patent
Ghose

(10) Patent No.: US 9,767,271 B2
(45) Date of Patent: *Sep. 19, 2017

(54) SYSTEM AND METHOD FOR VALIDATING PROGRAM EXECUTION AT RUN-TIME

(71) Applicant: The Research Foundation for The State University of New York, Binghamton, NY (US)

(72) Inventor: Kanad Ghose, Vestal, NY (US)

(73) Assignee: The Research Foundation for The State University of New York, Binghamton, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/981,011

(22) Filed: Dec. 28, 2015

(65) Prior Publication Data

US 2016/0117501 A1 Apr. 28, 2016

Related U.S. Application Data

(63) Continuation of application No. 14/330,441, filed on Jul. 14, 2014, now Pat. No. 9,223,967, which is a
(Continued)

(51) Int. Cl.
G06F 9/44 (2006.01)
G06F 9/38 (2006.01)
(Continued)

(52) U.S. Cl.
CPC ............ *G06F 21/51* (2013.01); *G06F 9/3834* (2013.01); *G06F 9/3851* (2013.01); *G06F 21/52* (2013.01);
(Continued)

(58) Field of Classification Search
CPC .......... G06F 21/51; G06F 21/52; G06F 21/54; G06F 21/72; G06F 21/74; G06F 21/79;
(Continued)

(56) References Cited

U.S. PATENT DOCUMENTS 4,247,892 A 1/1981 Lawrence
4,514,846 A 4/1985 Federico et al.
(Continued)

FOREIGN PATENT DOCUMENTS

EP 2658166 10/2013
JP 2010154098 7/2010

OTHER PUBLICATIONS

S. Davidoff. Cleartext passwords in linux memory. www.philosecurity.org, 2008.
(Continued)

*Primary Examiner* — Noura Zoubair
(74) *Attorney, Agent, or Firm* — Steven M. Hoffberg, Esq.; Ostrolenk Faber LLP

(57) ABSTRACT

A pipelined processor comprising a cache memory system, fetching instructions for execution from a portion of said cache memory system, an instruction commencing processing before a digital signature of the cache line that contained the instruction is verified against a reference signature of the cache line, the verification being done at the point of decoding, dispatching, or committing execution of the instruction, the reference signature being stored in an encrypted form in the processor's memory, and the key for decrypting the said reference signature being stored in a secure storage location. The instruction processing proceeds when the two signatures exactly match and, where further instruction processing is suspended or processing modified on a mismatch of the two said signatures.

20 Claims, 4 Drawing Sheets

Related U.S. Application Data continuation of application No. 13/183,857, filed on Jul. 15, 2011, now Pat. No. 8,782,434.

(60) Provisional application No. 61/364,795, filed on Jul. 15, 2010.

(51) Int. Cl.

| | | |
|---|---|---|
| *G06F 21/72* | (2013.01) | |
| *G06F 21/54* | (2013.01) | |
| *G06F 21/51* | (2013.01) | |
| *G06F 21/52* | (2013.01) | |
| *G06F 21/79* | (2013.01) | |
| G06F 11/14 | (2006.01) | |
| G06F 11/36 | (2006.01) | |
| H04L 9/32 | (2006.01) | |

(52) U.S. Cl.
CPC ............ *G06F 21/54* (2013.01); *G06F 21/72* (2013.01); *G06F 21/79* (2013.01); *G06F 11/1407* (2013.01); *G06F 11/3612* (2013.01)

(58) Field of Classification Search
CPC .... G06F 21/602; G06F 9/3834; G06F 9/3851; G06F 11/1407; G06F 11/3612; H04L 9/3247

See application file for complete search history.

(56) References Cited

U.S. PATENT DOCUMENTS

| | | | |
|---|---|---|---|
| 4,584,639 | A | 4/1986 | Hardy |
| 4,625,081 | A | 11/1986 | Lotito et al. |
| 4,665,520 | A | 5/1987 | Strom et al. |
| 4,674,038 | A | 6/1987 | Brelsford et al. |
| 4,916,605 | A | 4/1990 | Beardsley et al. |
| 4,987,532 | A | 1/1991 | Noguchi |
| 5,165,031 | A | 11/1992 | Pruul et al. |
| 5,170,340 | A | 12/1992 | Prokop et al. |
| 5,175,679 | A | 12/1992 | Allen et al. |
| 5,179,702 | A | 1/1993 | Spix et al. |
| 5,191,651 | A | 3/1993 | Halim et al. |
| 5,222,217 | A | 6/1993 | Blount et al. |
| 5,237,684 | A | 8/1993 | Record et al. |
| 5,261,089 | A | 11/1993 | Coleman et al. |
| 5,276,876 | A | 1/1994 | Coleman et al. |
| 5,305,056 | A | 4/1994 | Salgado et al. |
| 5,305,454 | A | 4/1994 | Record et al. |
| 5,319,773 | A | 6/1994 | Britton et al. |
| 5,319,774 | A | 6/1994 | Ainsworth et al. |
| 5,327,532 | A | 7/1994 | Ainsworth et al. |
| 5,347,632 | A | 9/1994 | Filepp et al. |
| 5,355,484 | A | 10/1994 | Record et al. |
| 5,363,505 | A | 11/1994 | Maslak et al. |
| 5,410,684 | A | 4/1995 | Ainsworth et al. |
| 5,410,700 | A | 4/1995 | Fecteau et al. |
| 5,421,012 | A | 5/1995 | Khoyi et al. |
| 5,446,904 | A | 8/1995 | Belt et al. |
| 5,530,868 | A | 6/1996 | Record et al. |
| 5,551,033 | A | 8/1996 | Foster et al. |
| 5,592,670 | A | 1/1997 | Pletcher |
| 5,606,668 | A | 2/1997 | Shwed |
| 5,608,720 | A | 3/1997 | Biegel et al. |
| 5,613,060 | A | 3/1997 | Britton et al. |
| 5,625,821 | A | 4/1997 | Record et al. |
| 5,758,072 | A | 5/1998 | Filepp et al. |
| 5,765,004 | A | 6/1998 | Foster et al. |
| 5,822,564 | A | 10/1998 | Chilton et al. |
| 5,903,766 | A | 5/1999 | Walker et al. |
| 5,905,855 | A | 5/1999 | Klaiber et al. |
| 5,944,821 | A | 8/1999 | Angelo |
| 6,016,500 | A | 1/2000 | Waldo et al. |
| 6,070,239 | A | 5/2000 | McManis |
| 6,075,938 | A | 6/2000 | Bugnion et al. |
| 6,094,528 | A | 7/2000 | Jordan |
| 6,112,304 | A | 8/2000 | Clawson |
| 6,115,712 | A | 9/2000 | Islam et al. |
| 6,178,504 | B1 | 1/2001 | Fieres et al. |
| 6,186,677 | B1 | 2/2001 | Angel et al. |
| 6,195,676 | B1 | 2/2001 | Spix et al. |
| 6,199,100 | B1 | 3/2001 | Filepp et al. |
| 6,199,198 | B1 | 3/2001 | Graham |
| 6,217,165 | B1 | 4/2001 | Silverbrook |
| 6,223,293 | B1 | 4/2001 | Foster et al. |
| 6,233,565 | B1 | 5/2001 | Lewis et al. |
| 6,243,716 | B1 | 6/2001 | Waldo et al. |
| 6,247,027 | B1 | 6/2001 | Chaudhry et al. |
| 6,275,852 | B1 | 8/2001 | Filepp et al. |
| 6,289,382 | B1 | 9/2001 | Bowman-Amuah |
| 6,301,673 | B1 | 10/2001 | Foster et al. |
| 6,304,915 | B1 | 10/2001 | Nguyen et al. |
| 6,315,200 | B1 | 11/2001 | Silverbrook et al. |
| 6,317,192 | B1 | 11/2001 | Silverbrook et al. |
| 6,317,438 | B1 | 11/2001 | Trebes, Jr. |
| 6,321,366 | B1 | 11/2001 | Tseng et al. |
| 6,332,163 | B1 | 12/2001 | Bowman-Amuah |
| 6,339,832 | B1 | 1/2002 | Bowman-Amuah |
| 6,353,881 | B1 | 3/2002 | Chaudhry et al. |
| 6,356,715 | B1 | 3/2002 | Silverbrook |
| 6,360,193 | B1 | 3/2002 | Stoyen |
| 6,362,868 | B1 | 3/2002 | Silverbrook |
| 6,362,869 | B1 | 3/2002 | Silverbrook |
| 6,378,068 | B1 | 4/2002 | Foster et al. |
| 6,397,379 | B1 | 5/2002 | Yates, Jr. et al. |
| 6,415,054 | B1 | 7/2002 | Silverbrook et al. |
| 6,416,154 | B1 | 7/2002 | Silverbrook |
| 6,421,739 | B1 | 7/2002 | Holiday |
| 6,430,570 | B1 | 8/2002 | Judge et al. |
| 6,430,649 | B1 | 8/2002 | Chaudhry et al. |
| 6,431,669 | B1 | 8/2002 | Silverbrook |
| 6,434,568 | B1 | 8/2002 | Bowman-Amuah |
| 6,434,628 | B1 | 8/2002 | Bowman-Amuah |
| 6,438,594 | B1 | 8/2002 | Bowman-Amuah |
| 6,438,677 | B1 | 8/2002 | Chaudhry et al. |
| 6,442,525 | B1 | 8/2002 | Silverbrook et al. |
| 6,442,663 | B1 | 8/2002 | Sun et al. |
| 6,442,748 | B1 | 8/2002 | Bowman-Amuah |
| 6,453,463 | B1 | 9/2002 | Chaudhry et al. |
| 6,459,495 | B1 | 10/2002 | Silverbrook |
| 6,460,067 | B1 | 10/2002 | Chaudhry et al. |
| 6,463,457 | B1 | 10/2002 | Armentrout et al. |
| 6,463,526 | B1 | 10/2002 | Chaudhry et al. |
| 6,463,582 | B1 | 10/2002 | Lethin et al. |
| 6,476,863 | B1 | 11/2002 | Silverbrook |
| 6,477,580 | B1 | 11/2002 | Bowman-Amuah |
| 6,477,665 | B1 | 11/2002 | Bowman-Amuah |
| 6,493,730 | B1 | 12/2002 | Lewis et al. |
| 6,496,850 | B1 | 12/2002 | Bowman-Amuah |
| 6,502,102 | B1 | 12/2002 | Haswell et al. |
| 6,502,135 | B1 | 12/2002 | Munger et al. |
| 6,502,213 | B1 | 12/2002 | Bowman-Amuah |
| 6,510,352 | B1 | 1/2003 | Badavas et al. |
| 6,523,027 | B1 | 2/2003 | Underwood |
| 6,523,059 | B1 | 2/2003 | Schmidt |
| 6,529,909 | B1 | 3/2003 | Bowman-Amuah |
| 6,529,948 | B1 | 3/2003 | Bowman-Amuah |
| 6,539,396 | B1 | 3/2003 | Bowman-Amuah |
| 6,542,645 | B1 | 4/2003 | Silverbrook et al. |
| 6,546,397 | B1 | 4/2003 | Rempell |
| 6,547,364 | B2 | 4/2003 | Silverbrook |
| 6,549,949 | B1 | 4/2003 | Bowman-Amuah |
| 6,549,959 | B1 | 4/2003 | Yates et al. |
| 6,550,057 | B1 | 4/2003 | Bowman-Amuah |
| 6,565,181 | B2 | 5/2003 | Silverbrook |
| 6,571,282 | B1 | 5/2003 | Bowman-Amuah |
| 6,578,068 | B1 | 6/2003 | Bowman-Amuah |
| 6,601,192 | B1 | 7/2003 | Bowman-Amuah |
| 6,601,233 | B1 | 7/2003 | Underwood |
| 6,601,234 | B1 | 7/2003 | Bowman-Amuah |
| 6,606,660 | B1 | 8/2003 | Bowman-Amuah |
| 6,606,744 | B1 | 8/2003 | Mikurak |
| 6,609,128 | B1 | 8/2003 | Underwood |
| 6,615,199 | B1 | 9/2003 | Bowman-Amuah |

(56) References Cited

U.S. PATENT DOCUMENTS

| | | |
|---|---|---|
| 6,615,253 B1 | 9/2003 | Bowman-Amuah |
| 6,618,117 B2 | 9/2003 | Silverbrook |
| 6,618,761 B2 | 9/2003 | Munger et al. |
| 6,625,751 B1 | 9/2003 | Starovic et al. |
| 6,633,878 B1 | 10/2003 | Underwood |
| 6,636,216 B1 | 10/2003 | Silverbrook et al. |
| 6,636,242 B2 | 10/2003 | Bowman-Amuah |
| 6,640,238 B1 | 10/2003 | Bowman-Amuah |
| 6,640,244 B1 | 10/2003 | Bowman-Amuah |
| 6,640,249 B1 | 10/2003 | Bowman-Amuah |
| 6,643,650 B1 | 11/2003 | Slaughter et al. |
| 6,644,771 B1 | 11/2003 | Silverbrook |
| 6,658,451 B1 | 12/2003 | Chaudhry et al. |
| 6,665,454 B1 | 12/2003 | Silverbrook et al. |
| 6,671,818 B1 | 12/2003 | Mikurak |
| 6,674,769 B1 | 1/2004 | Viswanath |
| 6,684,398 B2 | 1/2004 | Chaudhry et al. |
| 6,691,250 B1 | 2/2004 | Chandiramani et al. |
| 6,701,514 B1 | 3/2004 | Haswell et al. |
| 6,702,417 B2 | 3/2004 | Silverbrook |
| 6,704,862 B1 | 3/2004 | Chaudhry et al. |
| 6,704,871 B1 | 3/2004 | Kaplan et al. |
| 6,704,873 B1 | 3/2004 | Underwood |
| 6,708,273 B1 | 3/2004 | Ober et al. |
| 6,715,145 B1 | 3/2004 | Bowman-Amuah |
| 6,718,438 B2 | 4/2004 | Lewis et al. |
| 6,718,486 B1 | 4/2004 | Roselli et al. |
| 6,718,535 B1 | 4/2004 | Underwood |
| 6,718,538 B1 | 4/2004 | Mathiske |
| 6,721,944 B2 | 4/2004 | Chaudhry et al. |
| 6,732,363 B1 | 5/2004 | Chaudhry et al. |
| 6,742,015 B1 | 5/2004 | Bowman-Amuah |
| 6,742,123 B1 | 5/2004 | Foote |
| 6,750,901 B1 | 6/2004 | Silverbrook |
| 6,750,944 B2 | 6/2004 | Silverbrook et al. |
| 6,754,855 B1 | 6/2004 | Denninghoff et al. |
| 6,760,736 B2 | 7/2004 | Waldo et al. |
| 6,760,815 B1 | 7/2004 | Traversat et al. |
| 6,760,825 B1 | 7/2004 | Sexton et al. |
| 6,763,440 B1 | 7/2004 | Traversat et al. |
| 6,763,452 B1 | 7/2004 | Hohensee et al. |
| 6,772,296 B1 | 8/2004 | Mathiske |
| 6,779,107 B1 | 8/2004 | Yates |
| 6,786,420 B1 | 9/2004 | Silverbrook |
| 6,788,336 B1 | 9/2004 | Silverbrook |
| 6,788,688 B2 | 9/2004 | Trebes, Jr. |
| 6,788,980 B1 | 9/2004 | Johnson |
| 6,789,077 B1 | 9/2004 | Slaughter et al. |
| 6,789,126 B1 | 9/2004 | Saulpaugh et al. |
| 6,789,181 B1 | 9/2004 | Yates et al. |
| 6,792,466 B1 | 9/2004 | Saulpaugh et al. |
| 6,795,966 B1 | 9/2004 | Lim et al. |
| 6,803,989 B2 | 10/2004 | Silverbrook |
| 6,826,616 B2 | 11/2004 | Larson et al. |
| 6,826,748 B1 | 11/2004 | Hohensee et al. |
| 6,831,681 B1 | 12/2004 | Silverbrook |
| 6,832,367 B1 | 12/2004 | Choi et al. |
| 6,834,310 B2 | 12/2004 | Munger et al. |
| 6,837,427 B2 | 1/2005 | Overhultz et al. |
| 6,839,759 B2 | 1/2005 | Larson et al. |
| 6,842,906 B1 | 1/2005 | Bowman-Amuah |
| 6,850,274 B1 | 2/2005 | Silverbrook et al. |
| 6,850,979 B1 | 2/2005 | Saulpaugh et al. |
| 6,854,115 B1 | 2/2005 | Traversat et al. |
| 6,857,719 B2 | 2/2005 | Silverbrook |
| 6,862,594 B1 | 3/2005 | Saulpaugh et al. |
| 6,865,657 B1 | 3/2005 | Traversat et al. |
| 6,868,447 B1 | 3/2005 | Slaughter et al. |
| 6,874,066 B2 | 3/2005 | Traversat et al. |
| 6,879,341 B1 | 4/2005 | Silverbrook |
| 6,895,460 B2 | 5/2005 | Desoli et al. |
| 6,898,618 B1 | 5/2005 | Slaughter et al. |
| 6,898,791 B1 | 5/2005 | Chandy et al. |
| 6,907,473 B2 | 6/2005 | Schmidt et al. |
| 6,907,546 B1 | 6/2005 | Haswell et al. |
| 6,912,708 B2 | 6/2005 | Wallman et al. |
| 6,917,976 B1 | 7/2005 | Slaughter et al. |
| 6,918,084 B1 | 7/2005 | Slaughter et al. |
| 6,918,542 B2 | 7/2005 | Silverbrook et al. |
| 6,934,755 B1 | 8/2005 | Saulpaugh et al. |
| 6,934,832 B1 | 8/2005 | Van Dyke et al. |
| 6,938,130 B2 | 8/2005 | Jacobson et al. |
| 6,938,164 B1 | 8/2005 | England et al. |
| 6,941,410 B1 | 9/2005 | Traversat et al. |
| 6,941,545 B1 | 9/2005 | Reese et al. |
| 6,948,661 B2 | 9/2005 | Silverbrook et al. |
| 6,950,875 B1 | 9/2005 | Slaughter et al. |
| 6,953,235 B2 | 10/2005 | Silverbrook |
| 6,954,254 B2 | 10/2005 | Silverbrook |
| 6,954,923 B1 | 10/2005 | Yates, Jr. et al. |
| 6,957,237 B1 | 10/2005 | Traversat et al. |
| 6,970,869 B1 | 11/2005 | Slaughter et al. |
| 6,973,493 B1 | 12/2005 | Slaughter et al. |
| 6,973,646 B1 | 12/2005 | Bordawekar et al. |
| 6,978,462 B1 | 12/2005 | Adler et al. |
| 6,986,052 B1 | 1/2006 | Mittal |
| 6,986,562 B2 | 1/2006 | Silverbrook |
| 6,988,025 B2 | 1/2006 | Ransom et al. |
| 6,990,395 B2 | 1/2006 | Ransom et al. |
| 7,003,770 B1 | 2/2006 | Pang et al. |
| 7,007,852 B2 | 3/2006 | Silverbrook et al. |
| 7,010,573 B1 | 3/2006 | Saulpaugh et al. |
| 7,013,456 B1 | 3/2006 | Van Dyke et al. |
| 7,016,966 B1 | 3/2006 | Saulpaugh et al. |
| 7,020,532 B2 | 3/2006 | Johnson et al. |
| 7,020,697 B1 | 3/2006 | Goodman et al. |
| 7,021,535 B2 | 4/2006 | Overhultz et al. |
| 7,028,306 B2 | 4/2006 | Boloker et al. |
| 7,044,589 B2 | 5/2006 | Silverbrook |
| 7,047,394 B1 | 5/2006 | Van Dyke et al. |
| 7,050,143 B1 | 5/2006 | Silverbrook et al. |
| 7,051,192 B2 | 5/2006 | Chaudhry et al. |
| 7,052,103 B2 | 5/2006 | Silverbrook |
| 7,055,927 B2 | 6/2006 | Silverbrook |
| 7,065,549 B2 | 6/2006 | Sun et al. |
| 7,065,574 B1 | 6/2006 | Saulpaugh et al. |
| 7,065,633 B1 | 6/2006 | Yates, Jr. et al. |
| 7,069,421 B1 | 6/2006 | Yates, Jr. et al. |
| 7,072,967 B1 | 7/2006 | Saulpaugh et al. |
| 7,073,713 B2 | 7/2006 | Silverbrook et al. |
| 7,080,078 B1 | 7/2006 | Slaughter et al. |
| 7,083,108 B2 | 8/2006 | Silverbrook et al. |
| 7,084,951 B2 | 8/2006 | Silverbrook |
| 7,089,374 B2 | 8/2006 | Tremblay et al. |
| 7,092,011 B2 | 8/2006 | Silverbrook et al. |
| 7,093,004 B2 | 8/2006 | Bernardin et al. |
| 7,093,086 B1 | 8/2006 | van Rietschote |
| 7,093,989 B2 | 8/2006 | Walmsley et al. |
| 7,096,137 B2 | 8/2006 | Shipton et al. |
| 7,097,104 B2 | 8/2006 | Silverbrook et al. |
| 7,100,195 B1 | 8/2006 | Underwood |
| 7,100,834 B2 | 9/2006 | Silverbrook et al. |
| 7,110,139 B2 | 9/2006 | Silverbrook |
| 7,111,290 B1 | 9/2006 | Yates, Jr. et al. |
| 7,119,836 B2 | 10/2006 | Silverbrook |
| 7,121,639 B2 | 10/2006 | Plunkett |
| 7,124,101 B1 | 10/2006 | Mikurak |
| 7,128,386 B2 | 10/2006 | Silverbrook |
| 7,130,807 B1 | 10/2006 | Mikurak |
| 7,131,026 B2 | 10/2006 | Denninghoff et al. |
| 7,137,016 B2 | 11/2006 | Nalawadi et al. |
| 7,137,110 B1 | 11/2006 | Reese et al. |
| 7,140,726 B2 | 11/2006 | Silverbrook |
| 7,146,305 B2 | 12/2006 | van der Made |
| 7,152,939 B2 | 12/2006 | Silverbrook |
| 7,152,942 B2 | 12/2006 | Walmsley et al. |
| 7,155,395 B2 | 12/2006 | Silverbrook |
| 7,159,211 B2 | 1/2007 | Jalan et al. |
| 7,163,273 B2 | 1/2007 | Silverbrook |
| 7,163,345 B2 | 1/2007 | Walmsley et al. |
| 7,165,824 B2 | 1/2007 | Walmsley et al. |
| 7,168,076 B2 | 1/2007 | Chaudhry et al. |
| 7,171,323 B2 | 1/2007 | Shipton et al. |
| 7,181,572 B2 | 2/2007 | Walmsley |

(56) References Cited

U.S. PATENT DOCUMENTS

| | | |
|---|---|---|
| 7,181,613 B2 | 2/2007 | Boebert et al. |
| 7,185,319 B2 | 2/2007 | Kaler et al. |
| 7,185,323 B2 | 2/2007 | Nair et al. |
| 7,187,404 B2 | 3/2007 | Silverbrook et al. |
| 7,188,180 B2 | 3/2007 | Larson et al. |
| 7,188,251 B1 | 3/2007 | Slaughter et al. |
| 7,188,282 B2 | 3/2007 | Walmsley |
| 7,188,928 B2 | 3/2007 | Walmsley et al. |
| 7,191,440 B2 | 3/2007 | Cota-Robles et al. |
| 7,191,441 B2 | 3/2007 | Abbott et al. |
| 7,193,482 B2 | 3/2007 | Silverbrook |
| 7,200,705 B2 | 4/2007 | Santos et al. |
| 7,200,848 B1 | 4/2007 | Slaughter et al. |
| 7,201,319 B2 | 4/2007 | Silverbrook et al. |
| 7,203,477 B2 | 4/2007 | Coppinger et al. |
| 7,203,485 B2 | 4/2007 | Coppinger et al. |
| 7,206,805 B1 | 4/2007 | McLaughlin, Jr. |
| 7,206,903 B1 | 4/2007 | Moir et al. |
| 7,213,047 B2 | 5/2007 | Yeager et |
| 7,213,246 B1 | 5/2007 | van Rietschote et al. |
| 7,228,404 B1 | 6/2007 | Patel et al. |
| 7,233,421 B2 | 6/2007 | Silverbrook |
| 7,234,076 B2 | 6/2007 | Daynes et al. |
| 7,234,645 B2 | 6/2007 | Silverbrook et al. |
| 7,234,801 B2 | 6/2007 | Silverbrook |
| 7,237,140 B2 | 6/2007 | Nakamura et al. |
| 7,243,193 B2 | 7/2007 | Walmsley |
| 7,243,267 B2 | 7/2007 | Klemm et al. |
| 7,243,356 B1 | 7/2007 | Saulpaugh et al. |
| 7,249,280 B2 | 7/2007 | Lamport et al. |
| 7,252,353 B2 | 8/2007 | Silverbrook et al. |
| 7,254,390 B2 | 8/2007 | Coppinger et al. |
| 7,254,608 B2 | 8/2007 | Yeager et al. |
| 7,254,806 B1 | 8/2007 | Yates, Jr. et al. |
| 7,255,414 B2 | 8/2007 | Silverbrook |
| 7,260,543 B1 | 8/2007 | Saulpaugh et al. |
| 7,266,661 B2 | 9/2007 | Walmsley |
| 7,267,417 B2 | 9/2007 | Silverbrook et al. |
| 7,269,693 B2 | 9/2007 | Tremblay et al. |
| 7,269,694 B2 | 9/2007 | Tremblay et al. |
| 7,275,183 B2 | 9/2007 | Santos et al. |
| 7,275,246 B1 | 9/2007 | Yates, Jr. et al. |
| 7,275,800 B2 | 10/2007 | Silverbrook |
| 7,275,805 B2 | 10/2007 | Jackson Pulver et al. |
| 7,278,034 B2 | 10/2007 | Shipton |
| 7,278,697 B2 | 10/2007 | Plunkett |
| 7,278,723 B2 | 10/2007 | Silverbrook |
| 7,281,330 B2 | 10/2007 | Silverbrook et al. |
| 7,281,777 B2 | 10/2007 | Silverbrook et al. |
| 7,281,786 B2 | 10/2007 | Silverbrook |
| 7,283,162 B2 | 10/2007 | Silverbrook et al. |
| 7,286,815 B2 | 10/2007 | Coppinger et al. |
| 7,287,702 B2 | 10/2007 | Silverbrook et al. |
| 7,289,142 B2 | 10/2007 | Silverbrook |
| 7,289,156 B2 | 10/2007 | Silverbrook et al. |
| 7,289,964 B1 | 10/2007 | Bowman-Amuah |
| 7,290,852 B2 | 11/2007 | Jackson Pulver et al. |
| 7,293,267 B1 | 11/2007 | Fresko |
| 7,302,592 B2 | 11/2007 | Shipton et al. |
| 7,302,609 B2 | 11/2007 | Matena et al. |
| 7,307,526 B2 | 12/2007 | Rajapakse et al. |
| 7,311,257 B2 | 12/2007 | Silverbrook |
| 7,312,845 B2 | 12/2007 | Silverbrook |
| 7,314,261 B2 | 1/2008 | Jackson Pulver et al. |
| 7,320,142 B1 | 1/2008 | Kasper et al. |
| 7,325,897 B2 | 2/2008 | Silverbrook |
| 7,328,195 B2 | 2/2008 | Willis |
| 7,328,243 B2 | 2/2008 | Yeager et al. |
| 7,328,956 B2 | 2/2008 | Silverbrook et al. |
| 7,330,844 B2 | 2/2008 | Stoyen |
| 7,334,154 B2 | 2/2008 | Lorch et al. |
| 7,337,291 B2 | 2/2008 | Abadi et al. |
| 7,356,679 B1 | 4/2008 | Le et al. |
| 7,362,971 B2 | 4/2008 | Silverbrook et al. |
| 7,363,288 B2 | 4/2008 | Santos et al. |
| 7,366,880 B2 | 4/2008 | Chaudhry et al. |
| 7,370,064 B2 | 5/2008 | Yousefi'zadeh |
| 7,370,091 B1 | 5/2008 | Slaughter et al. |
| 7,370,360 B2 | 5/2008 | van der Made |
| 7,373,083 B2 | 5/2008 | Silverbrook et al. |
| 7,373,451 B2 | 5/2008 | Lam et al. |
| 7,374,096 B2 | 5/2008 | Overhultz et al. |
| 7,374,266 B2 | 5/2008 | Walmsley et al. |
| 7,376,755 B2 | 5/2008 | Pandya |
| 7,377,608 B2 | 5/2008 | Walmsley et al. |
| 7,377,609 B2 | 5/2008 | Walmsley et al. |
| 7,377,706 B2 | 5/2008 | Silverbrook et al. |
| 7,380,039 B2 | 5/2008 | Miloushev et al. |
| 7,380,051 B2 | 5/2008 | Birrell et al. |
| 7,382,264 B2 | 6/2008 | Rajapakse et al. |
| 7,389,383 B2 | 6/2008 | Tremblay et al. |
| 7,390,071 B2 | 6/2008 | Walmsley et al. |
| 7,391,435 B2 | 6/2008 | Silverbrook |
| 7,395,333 B1 | 7/2008 | Saulpaugh et al. |
| 7,395,536 B2 | 7/2008 | Verbeke et al. |
| 7,398,349 B2 | 7/2008 | Birrell et al. |
| 7,398,533 B1 | 7/2008 | Slaughter et al. |
| 7,399,043 B2 | 7/2008 | Walmsley et al. |
| 7,409,584 B2 | 8/2008 | Denninghoff et al. |
| 7,409,719 B2 | 8/2008 | Armstrong et al. |
| 7,412,518 B1 | 8/2008 | Duigou et al. |
| 7,412,520 B2 | 8/2008 | Sun |
| 7,415,723 B2 | 8/2008 | Pandya |
| 7,418,504 B2 | 8/2008 | Larson et al. |
| 7,421,698 B2 | 9/2008 | Fresko |
| 7,426,721 B1 | 9/2008 | Saulpaugh et al. |
| 7,427,117 B2 | 9/2008 | Jackson Pulver et al. |
| 7,430,670 B1 | 9/2008 | Horning et al. |
| 7,437,606 B2 | 10/2008 | Janakiraman et al. |
| 7,437,614 B2 | 10/2008 | Haswell et al. |
| 7,443,434 B2 | 10/2008 | Silverbrook |
| 7,444,601 B2 | 10/2008 | Proudler et al. |
| 7,444,644 B1 | 10/2008 | Slaughter et al. |
| 7,448,079 B2 | 11/2008 | Tremain |
| 7,448,707 B2 | 11/2008 | Jackson Pulver et al. |
| 7,452,048 B2 | 11/2008 | Silverbrook |
| 7,453,492 B2 | 11/2008 | Silverbrook |
| 7,456,861 B2 | 11/2008 | Silverbrook |
| 7,458,082 B1 | 11/2008 | Slaughter et al. |
| 7,460,152 B2 | 12/2008 | Silverbrook et al. |
| 7,461,931 B2 | 12/2008 | Silverbrook |
| 7,467,198 B2 | 12/2008 | Goodman et al. |
| 7,467,202 B2 | 12/2008 | Savchuk |
| 7,467,333 B2 | 12/2008 | Keeton et al. |
| 7,475,825 B2 | 1/2009 | Silverbrook et al. |
| 7,478,278 B2 | 1/2009 | Archer et al. |
| 7,480,761 B2 | 1/2009 | Birrell et al. |
| 7,483,050 B2 | 1/2009 | Silverbrook et al. |
| 7,483,053 B2 | 1/2009 | Silverbrook |
| 7,484,208 B1 | 1/2009 | Nelson |
| 7,484,831 B2 | 2/2009 | Walmsley et al. |
| 7,487,264 B2 | 2/2009 | Pandya |
| 7,490,151 B2 | 2/2009 | Munger et al. |
| 7,490,250 B2 | 2/2009 | Cromer et al. |
| 7,490,352 B2 | 2/2009 | Kramer et al. |
| 7,492,490 B2 | 2/2009 | Silverbrook |
| 7,505,068 B2 | 3/2009 | Silverbrook |
| 7,511,744 B2 | 3/2009 | Silverbrook et al. |
| 7,512,769 B1 | 3/2009 | Lowell et al. |
| 7,516,365 B2 | 4/2009 | Lev |
| 7,516,366 B2 | 4/2009 | Lev et al. |
| 7,517,036 B2 | 4/2009 | Walmsley et al. |
| 7,517,071 B2 | 4/2009 | Silverbrook |
| 7,523,111 B2 | 4/2009 | Walmsley |
| 7,524,045 B2 | 4/2009 | Silverbrook et al. |
| 7,524,047 B2 | 4/2009 | Silverbrook |
| 7,527,209 B2 | 5/2009 | Silverbrook |
| 7,529,897 B1 | 5/2009 | Waldspurger et al. |
| 7,533,141 B2 | 5/2009 | Nadgir et al. |
| 7,533,229 B1 | 5/2009 | van Rietschote |
| 7,536,462 B2 | 5/2009 | Pandya |
| 7,539,602 B2 | 5/2009 | Willis |
| 7,546,600 B2 | 6/2009 | Tumer et al. |
| 7,548,946 B1 | 6/2009 | Saulpaugh et al. |

(56) References Cited

U.S. PATENT DOCUMENTS

| | | |
|---|---|---|
| 7,549,167 B1 | 6/2009 | Huang et al. |
| 7,549,579 B2 | 6/2009 | Overhultz et al. |
| 7,549,715 B2 | 6/2009 | Walmsley et al. |
| 7,549,718 B2 | 6/2009 | Silverbrook et al. |
| 7,552,312 B2 | 6/2009 | Archer et al. |
| 7,552,434 B2 | 6/2009 | Turner et al. |
| 7,557,941 B2 | 7/2009 | Walmsley |
| 7,559,472 B2 | 7/2009 | Silverbrook et al. |
| 7,562,369 B1 | 7/2009 | Salamone et al. |
| 7,568,025 B2 | 7/2009 | Vasudeva |
| 7,571,312 B2 | 8/2009 | Scarlata et al. |
| 7,574,588 B2 | 8/2009 | Chaudhry et al. |
| 7,574,692 B2 | 8/2009 | Herscu |
| 7,575,313 B2 | 8/2009 | Silverbrook |
| 7,577,834 B1 | 8/2009 | Traversat et al. |
| 7,581,826 B2 | 9/2009 | Silverbrook |
| 7,590,869 B2 | 9/2009 | Hashimoto |
| 7,590,972 B2 | 9/2009 | Axelrod et al. |
| 7,592,829 B2 | 9/2009 | Walmsley et al. |
| 7,594,168 B2 | 9/2009 | Rempell |
| 7,596,790 B2 | 9/2009 | Moakley |
| 7,600,843 B2 | 10/2009 | Silverbrook et al. |
| 7,602,423 B2 | 10/2009 | Silverbrook |
| 7,603,392 B2 | 10/2009 | Ben-Yehuda et al. |
| 7,603,440 B1 | 10/2009 | Grabowski et al. |
| 7,603,707 B2 | 10/2009 | Seifert et al. |
| 7,607,129 B2 | 10/2009 | Rosu et al. |
| 7,607,757 B2 | 10/2009 | Silverbrook et al. |
| 7,610,510 B2 | 10/2009 | Agarwal et al. |
| 7,613,749 B2 | 11/2009 | Flynn, Jr. et al. |
| 7,613,929 B2 | 11/2009 | Cohen et al. |
| 7,620,821 B1 | 11/2009 | Grohoski et al. |
| 7,621,607 B2 | 11/2009 | Silverbrook |
| 7,624,383 B2 | 11/2009 | Barr et al. |
| 7,627,693 B2 | 12/2009 | Pandya |
| 7,629,999 B2 | 12/2009 | Silverbrook |
| 7,631,107 B2 | 12/2009 | Pandya |
| 7,631,190 B2 | 12/2009 | Walmsley |
| 7,631,966 B2 | 12/2009 | Silverbrook et al. |
| 7,636,940 B2 | 12/2009 | Yim |
| 7,653,833 B1 | 1/2010 | Miller et al. |
| 7,654,626 B2 | 2/2010 | Silverbrook et al. |
| 7,657,419 B2 | 2/2010 | van der Made |
| 7,660,998 B2 | 2/2010 | Walmsley |
| 7,663,502 B2 | 2/2010 | Breed |
| 7,665,834 B2 | 2/2010 | Silverbrook |
| 7,669,040 B2 | 2/2010 | Dice |
| 7,669,081 B2 | 2/2010 | Lett et al. |
| 7,676,456 B2 | 3/2010 | Suganuma et al. |
| 7,680,919 B2 | 3/2010 | Nelson |
| 7,681,075 B2 | 3/2010 | Havemose et al. |
| 7,685,251 B2 | 3/2010 | Houlihan et al. |
| 7,685,254 B2 | 3/2010 | Pandya |
| 7,689,676 B2 | 3/2010 | Vinberg et al. |
| 7,689,859 B2 | 3/2010 | Westenberg |
| 7,694,139 B2 | 4/2010 | Nachenberg et al. |
| 7,698,465 B2 | 4/2010 | Lamport |
| 7,701,506 B2 | 4/2010 | Silverbrook |
| 7,702,660 B2 | 4/2010 | Chan et al. |
| 7,707,583 B2 | 4/2010 | Schmidt et al. |
| 7,707,621 B2 | 4/2010 | Walmsley |
| 7,716,077 B1 | 5/2010 | Mikurak |
| 7,716,492 B1 | 5/2010 | Saulpaugh et al. |
| 7,721,138 B1 | 5/2010 | Lyadvinsky et al. |
| 7,721,139 B2 | 5/2010 | Castro et al. |
| 7,722,172 B2 | 5/2010 | Silverbrook |
| 7,725,703 B2 | 5/2010 | Hunter et al. |
| 7,730,299 B2 | 6/2010 | Boebert et al. |
| 7,730,312 B2 | 6/2010 | Everett et al. |
| 7,730,364 B2 | 6/2010 | Chang et al. |
| 7,734,607 B2 | 6/2010 | Grinstein et al. |
| 7,734,859 B2 | 6/2010 | Daniel et al. |
| 7,734,921 B2 | 6/2010 | Lotspiech |
| 7,735,944 B2 | 6/2010 | Silverbrook et al. |
| 7,739,517 B2 | 6/2010 | Sahita et al. |
| 7,743,126 B2 | 6/2010 | Russell |
| 7,743,389 B2 | 6/2010 | Mahalingam et al. |
| 7,747,154 B2 | 6/2010 | Silverbrook |
| 7,747,730 B1 | 6/2010 | Harlow |
| 7,747,814 B2 | 6/2010 | Green |
| 7,747,887 B2 | 6/2010 | Shipton et al. |
| 7,750,971 B2 | 7/2010 | Silverbrook |
| 7,752,459 B2 | 7/2010 | Cowan et al. |
| 7,757,086 B2 | 7/2010 | Walmsley |
| 7,758,143 B2 | 7/2010 | Silverbrook et al. |
| 7,760,743 B2 | 7/2010 | Shokri et al. |
| 7,770,008 B2 | 8/2010 | Walmsley |
| 7,779,270 B2 | 8/2010 | Horning et al. |
| 7,779,298 B2 | 8/2010 | Challenger et al. |
| 7,779,394 B2 | 8/2010 | Homing et al. |
| 7,783,779 B1 | 8/2010 | Scales et al. |
| 7,783,886 B2 | 8/2010 | Walmsley |
| 7,783,914 B1 | 8/2010 | Havemose |
| 7,789,501 B2 | 9/2010 | Silverbrook |
| 7,793,853 B2 | 9/2010 | Silverbrook et al. |
| 7,805,626 B2 | 9/2010 | Shipton |
| 7,805,761 B2 | 9/2010 | Ray et al. |
| 7,808,610 B2 | 10/2010 | Silverbrook |
| 7,810,081 B2 | 10/2010 | Dickenson et al. |
| 7,814,142 B2 | 10/2010 | Mamou et al. |
| 7,814,295 B2 | 10/2010 | Inglett et al. |
| 7,814,470 B2 | 10/2010 | Mamou et al. |
| 7,817,981 B2 | 10/2010 | Coppinger et al. |
| 7,818,510 B2 | 10/2010 | Tremblay et al. |
| 7,818,519 B2 | 10/2010 | Plunkett |
| 7,822,410 B2 | 10/2010 | Coppinger et al. |
| 7,822,979 B2 | 10/2010 | Mittal |
| 7,823,135 B2 | 10/2010 | Horning et al. |
| 7,826,088 B2 | 11/2010 | Silverbrook |
| 7,831,787 B1 | 11/2010 | Yueh |
| 7,831,827 B2 | 11/2010 | Walmsley |
| 7,832,842 B2 | 11/2010 | Jackson Pulver et al. |
| 7,836,215 B2 | 11/2010 | Fuente |
| 7,836,303 B2 | 11/2010 | Levy et al. |
| 7,837,115 B2 | 11/2010 | Silverbrook et al. |
| 7,839,803 B1 | 11/2010 | Snelgrove et al. |
| 7,840,787 B2 | 11/2010 | De Pauw et al. |
| 7,844,954 B2 | 11/2010 | Venkitachalam et al. |
| 7,849,450 B1 | 12/2010 | Rydh et al. |
| 7,849,624 B2 | 12/2010 | Holt et al. |
| 7,865,608 B1 | 1/2011 | Schuba et al. |
| 7,865,872 B2 | 1/2011 | Chamieh et al. |
| 7,865,893 B1 | 1/2011 | Omelyanchuk et al. |
| 7,866,778 B2 | 1/2011 | Silverbrook et al. |
| 7,870,217 B2 | 1/2011 | Pandya |
| 7,870,424 B2 | 1/2011 | Okabe |
| 7,873,869 B2 | 1/2011 | Darrington et al. |
| 7,877,436 B2 | 1/2011 | Arimilli et al. |
| 7,882,216 B2 | 2/2011 | Houlihan et al. |
| 7,890,689 B2 | 2/2011 | Lam et al. |
| 7,899,788 B2 | 3/2011 | Chandhok et al. |
| 7,899,915 B2 | 3/2011 | Reisman |
| 7,900,003 B2 | 3/2011 | Ben-Yehuda et al. |
| 7,904,664 B2 | 3/2011 | Tremblay et al. |
| 7,904,746 B2 | 3/2011 | Nakamura et al. |
| 7,908,255 B2 | 3/2011 | Detlefs et al. |
| 7,908,653 B2 | 3/2011 | Brickell et al. |
| 7,917,469 B2 | 3/2011 | Bernhard et al. |
| 7,917,596 B2 | 3/2011 | Chan et al. |
| 7,921,211 B2 | 4/2011 | Larson et al. |
| 7,921,686 B2 | 4/2011 | Bagepalli et al. |
| 7,924,313 B2 | 4/2011 | Silverbrook et al. |
| 7,925,791 B2 | 4/2011 | Ellis et al. |
| 7,925,850 B1 | 4/2011 | Waldspurger et al. |
| 7,930,733 B1 | 4/2011 | Iftode et al. |
| 7,931,200 B2 | 4/2011 | Silverbrook et al. |
| 7,933,990 B2 | 4/2011 | Munger et al. |
| 7,934,020 B1 | 4/2011 | Xu et al. |
| 7,934,035 B2 | 4/2011 | Miloushev et al. |
| 7,936,395 B2 | 5/2011 | Silverbrook |
| 7,937,547 B2 | 5/2011 | Liu et al. |
| 7,937,618 B2 | 5/2011 | Dorai et al. |
| 7,941,402 B2 | 5/2011 | Smits |
| 7,941,647 B2 | 5/2011 | Yates, Jr. et al. |

(56) References Cited

U.S. PATENT DOCUMENTS

| | | |
|---|---|---|
| 7,941,664 B2 | 5/2011 | Wheeler et al. |
| 7,941,698 B1 | 5/2011 | Aggarwal et al. |
| 7,941,799 B2 | 5/2011 | Easton et al. |
| 7,942,332 B2 | 5/2011 | Silverbrook et al. |
| 7,944,920 B2 | 5/2011 | Pandya |
| 7,945,654 B2 | 5/2011 | Larson et al. |
| 7,953,588 B2 | 5/2011 | Altman et al. |
| 7,957,009 B2 | 6/2011 | Silverbrook |
| 7,957,991 B2 | 6/2011 | Mikurak |
| 7,958,558 B1 | 6/2011 | Leake et al. |
| 7,962,137 B2 | 6/2011 | Coppinger et al. |
| 7,962,545 B2 | 6/2011 | Knauerhase et al. |
| 7,962,620 B2 | 6/2011 | Safari et al. |
| 7,962,703 B1 | 6/2011 | Shah et al. |
| 7,962,798 B2 | 6/2011 | Locasto et al. |
| 7,962,909 B1 | 6/2011 | Klaiber |
| 7,965,425 B2 | 6/2011 | Silverbrook |
| 7,966,519 B1 | 6/2011 | Aggarwal et al. |
| 7,966,614 B2 | 6/2011 | Chodroff et al. |
| 7,970,736 B2 | 6/2011 | Ben-Yehuda et al. |
| 7,971,015 B2 | 6/2011 | Waldspurger et al. |
| 7,975,138 B2 | 7/2011 | Andrade |
| 7,975,165 B2 | 7/2011 | Shneorson et al. |
| 7,975,176 B2 | 7/2011 | Bak et al. |
| 7,979,846 B2 | 7/2011 | Grechanik et al. |
| 7,984,304 B1 | 7/2011 | Waldspurger et al. |
| 7,984,965 B2 | 7/2011 | Silverbrook et al. |
| 7,987,274 B2 | 7/2011 | Larson et al. |
| 7,987,491 B2 | 7/2011 | Reisman |
| 8,001,232 B1 | 8/2011 | Saulpaugh et al. |
| 8,001,342 B2 | 8/2011 | Armstrong et al. |
| 8,001,505 B2 | 8/2011 | Bist et al. |
| 8,005,966 B2 | 8/2011 | Pandya |
| 8,006,079 B2 | 8/2011 | Goodson et al. |
| 8,010,495 B1 | 8/2011 | Kuznetzov et al. |
| 8,011,010 B2 | 8/2011 | Michael et al. |
| 8,011,747 B2 | 9/2011 | Walmsley et al. |
| 8,016,400 B2 | 9/2011 | Silverbrook |
| 8,019,964 B2 | 9/2011 | Greiner et al. |
| 8,020,099 B1 | 9/2011 | Lu |
| 8,020,979 B2 | 9/2011 | Silverbrook |
| 8,028,071 B1 | 9/2011 | Mahalingam et al. |
| 8,032,409 B1 | 10/2011 | Mikurak |
| 8,037,112 B2 | 10/2011 | Nath et al. |
| 8,037,202 B2 | 10/2011 | Yeager et al. |
| 8,037,278 B2 | 10/2011 | Greiner et al. |
| 8,037,350 B1 | 10/2011 | Aggarwal et al. |
| 8,038,239 B2 | 10/2011 | Walmsley et al. |
| 8,041,760 B2 | 10/2011 | Mamou et al. |
| 8,041,922 B2 | 10/2011 | Greiner et al. |
| 8,041,923 B2 | 10/2011 | Greiner et al. |
| 8,046,579 B2 | 10/2011 | Kresina |
| 8,051,181 B2 | 11/2011 | Larson et al. |
| 8,055,886 B2 | 11/2011 | Tashiro et al. |
| 8,055,940 B2 | 11/2011 | Ellis et al. |
| 8,060,553 B2 | 11/2011 | Mamou et al. |
| 8,061,828 B2 | 11/2011 | Silverbrook |
| 8,065,240 B2 | 11/2011 | Jung et al. |
| 8,065,504 B2 | 11/2011 | Yates, Jr. et al. |
| 8,065,722 B2 | 11/2011 | Barford et al. |
| 8,068,151 B2 | 11/2011 | Silverbrook et al. |
| 8,069,218 B1 | 11/2011 | Tormasov et al. |
| 8,069,374 B2 | 11/2011 | Panigrahy et al. |
| 8,074,055 B1 | 12/2011 | Yates, Jr. et al. |
| 8,077,207 B2 | 12/2011 | Silverbrook |
| 8,078,854 B2 | 12/2011 | Vick et al. |
| 8,078,910 B1 | 12/2011 | Backensto et al. |
| 8,082,405 B2 | 12/2011 | Greiner et al. |
| 8,082,468 B1 | 12/2011 | Backensto et al. |
| 8,082,481 B2 | 12/2011 | Casper et al. |
| 8,082,491 B1 | 12/2011 | Abdelaziz et al. |
| 8,086,811 B2 | 12/2011 | Gainey, Jr. et al. |
| 8,090,452 B2 | 1/2012 | Johnson et al. |
| 8,098,285 B2 | 1/2012 | Silverbrook |
| 8,102,071 B2 | 1/2012 | Catlin |
| 8,103,674 B2 | 1/2012 | de Moura et al. |
| 8,103,851 B2 | 1/2012 | Greiner et al. |
| 8,108,455 B2 | 1/2012 | Yeager et al. |
| 8,108,662 B2 | 1/2012 | Darrington et al. |
| 8,108,722 B1 | 1/2012 | Havemose et al. |
| 8,108,855 B2 | 1/2012 | Dias et al. |
| 8,112,423 B2 | 2/2012 | Bernhard et al. |
| 8,117,372 B2 | 2/2012 | Daniel et al. |
| 8,117,417 B2 | 2/2012 | Greiner et al. |
| 8,117,496 B2 | 2/2012 | Bashir et al. |
| 8,117,554 B1 | 2/2012 | Grechishkin et al. |
| 8,121,828 B2 | 2/2012 | Yates, Jr. et al. |
| 8,122,434 B2 | 2/2012 | Kostadinov et al. |
| 8,127,060 B2 | 2/2012 | Doll et al. |
| 8,127,121 B2 | 2/2012 | Yates, Jr. et al. |
| 8,127,412 B2 | 3/2012 | Gleichauf et al. |
| 8,131,845 B1 | 3/2012 | Vasudeva |
| 8,131,851 B2 | 3/2012 | Harlow |
| 8,135,796 B1 | 3/2012 | Slaughter et al. |
| 8,140,565 B2 | 3/2012 | D'Angelo et al. |
| 8,140,905 B2 | 3/2012 | Beaty et al. |
| 8,140,907 B2 | 3/2012 | Beaty et al. |
| 8,145,945 B2 | 3/2012 | Lee |
| 8,151,083 B2 | 4/2012 | Greiner et al. |
| 8,156,373 B2 | 4/2012 | Zheng et al. |
| 8,161,172 B2 | 4/2012 | Reisman |
| 8,161,321 B2 | 4/2012 | Zheng et al. |
| 8,161,479 B2 | 4/2012 | Sedukhin et al. |
| 8,165,286 B2 | 4/2012 | Ciet et al. |
| 8,166,477 B1 | 4/2012 | Tormasov |
| 8,166,693 B2 | 5/2012 | Hughes et al. |
| 8,171,301 B2 | 5/2012 | Seguin et al. |
| 8,171,338 B2 | 5/2012 | Agesen et al. |
| 8,171,554 B2 | 5/2012 | Elovici et al. |
| 8,176,364 B1 | 5/2012 | Havemose |
| 8,181,150 B2 | 5/2012 | Szpak et al. |
| 8,181,182 B1 | 5/2012 | Martin |
| 8,181,239 B2 | 5/2012 | Pandya |
| 8,185,502 B2 | 5/2012 | Irisawa et al. |
| 8,190,574 B2 | 5/2012 | Barnes et al. |
| 8,195,722 B1 | 6/2012 | Havemose et al. |
| 8,195,739 B2 | 6/2012 | Bernardin et al. |
| 8,195,774 B2 | 6/2012 | Lambeth et al. |
| 8,195,984 B2 | 6/2012 | Alberi et al. |
| 8,196,139 B2 | 6/2012 | Easton et al. |
| 8,196,205 B2 | 6/2012 | Gribble et al. |
| 8,200,771 B2 | 6/2012 | Ganesh et al. |
| 8,201,169 B2 | 6/2012 | Venkitachalam et al. |
| 8,204,082 B2 | 6/2012 | Jungck et al. |
| 8,205,120 B2 | 6/2012 | Heidasch et al. |
| 8,205,194 B2 | 6/2012 | Fries et al. |
| 8,209,524 B2 | 6/2012 | Ferren et al. |
| 8,209,680 B1 | 6/2012 | Le et al. |
| 8,214,191 B2 | 7/2012 | Ferren et al. |
| 8,214,367 B2 | 7/2012 | Baratto et al. |
| 8,214,622 B2 | 7/2012 | Blandy et al. |
| 8,214,686 B2 | 7/2012 | Ueda |
| 8,214,829 B2 | 7/2012 | Neogi et al. |
| 8,219,063 B2 | 7/2012 | Rogel et al. |
| 8,219,947 B2 | 7/2012 | Bist et al. |
| 8,225,314 B2 | 7/2012 | Martins et al. |
| 8,233,882 B2 | 7/2012 | Rogel |
| 8,239,340 B2 | 8/2012 | Hanson |
| 8,239,633 B2 | 8/2012 | Wood et al. |
| 8,239,646 B2 | 8/2012 | Colbert et al. |
| 8,239,649 B2 | 8/2012 | Gainey, Jr. et al. |
| 8,244,954 B2 | 8/2012 | Ganesh et al. |
| 8,245,013 B2 | 8/2012 | Ganesh et al. |
| 8,245,083 B2 | 8/2012 | Van Der Merwe et al. |
| 8,250,405 B2 | 8/2012 | Elnozahy |
| 8,255,651 B2 | 8/2012 | Liu et al. |
| 8,260,904 B2 | 9/2012 | Nelson |
| 8,261,233 B2 | 9/2012 | Szpak et al. |
| 8,266,125 B2 | 9/2012 | Wester et al. |
| 8,266,275 B2 | 9/2012 | Xu et al. |
| 8,266,276 B1 | 9/2012 | Vasudeva |
| 8,266,404 B2 | 9/2012 | Waldspurger et al. |
| 8,266,607 B2 | 9/2012 | Burka et al. |
| 8,271,336 B2 | 9/2012 | Mikurak |

(56) References Cited

U.S. PATENT DOCUMENTS

| | | |
|---|---|---|
| 8,271,950 B2 | 9/2012 | Bharadwaj |
| 8,271,990 B2 | 9/2012 | De et al. |
| 8,274,665 B2 | 9/2012 | Silverbrook |
| 8,276,127 B2 | 9/2012 | Rydh et al. |
| 8,280,944 B2 | 10/2012 | Laadan et al. |
| 8,280,974 B2 | 10/2012 | Herington |
| 8,281,317 B1 | 10/2012 | Backensto et al. |
| 8,281,318 B2 | 10/2012 | Chanda et al. |
| 8,285,999 B1 | 10/2012 | Ghose et al. |
| 8,286,174 B1 | 10/2012 | Schmidt et al. |
| 8,295,834 B2 | 10/2012 | Coppinger et al. |
| 8,295,835 B2 | 10/2012 | Coppinger et al. |
| 8,296,419 B1 | 10/2012 | Khanna et al. |
| 8,296,551 B2 | 10/2012 | Bugnion |
| 8,296,759 B1 | 10/2012 | Hutchins et al. |
| 8,301,672 B2 | 10/2012 | Jiva et al. |
| 8,301,700 B1 | 10/2012 | Havemose |
| 8,302,094 B2 | 10/2012 | Rogel et al. |
| 8,307,187 B2 | 11/2012 | Chawla et al. |
| 8,312,224 B2 | 11/2012 | Elnozahy |
| 8,315,991 B2 | 11/2012 | Mandagere et al. |
| 8,321,558 B1 | 11/2012 | Sirota et al. |
| 8,321,643 B1 | 11/2012 | Vaghani et al. |
| 8,321,948 B2 | 11/2012 | Robinson et al. |
| 8,326,449 B2 | 12/2012 | Hartz et al. |
| 8,327,350 B2 | 12/2012 | Chess et al. |
| 8,328,101 B2 | 12/2012 | Silverbrook et al. |
| 8,332,632 B2 | 12/2012 | Iftode et al. |
| 8,332,649 B2 | 12/2012 | Yokota et al. |
| 8,332,689 B2 | 12/2012 | Timashev et al. |
| 8,332,824 B2 | 12/2012 | Shemenzon et al. |
| 8,335,906 B2 | 12/2012 | Greiner et al. |
| 8,341,749 B2 | 12/2012 | Rogel |
| 8,346,726 B2 | 1/2013 | Liu et al. |
| 8,346,891 B2 | 1/2013 | Safari et al. |
| 8,347,072 B2 | 1/2013 | Mittal |
| 8,347,140 B1 | 1/2013 | Backensto et al. |
| 8,347,288 B1 | 1/2013 | Brandwine |
| 8,352,801 B2 | 1/2013 | Van Der Merwe et al. |
| 8,356,314 B2 | 1/2013 | Sprunk |
| 8,370,493 B2 | 2/2013 | Sirota et al. |
| 8,370,530 B2 | 2/2013 | Tripathi et al. |
| 8,370,609 B1 | 2/2013 | Favor et al. |
| 8,370,802 B2 | 2/2013 | Pacifici et al. |
| 8,370,811 B2 | 2/2013 | Grechanik et al. |
| 8,370,814 B2 | 2/2013 | Grechanik et al. |
| 8,370,837 B2 | 2/2013 | Emelianov et al. |
| 8,370,838 B1 | 2/2013 | Omelyanchuk et al. |
| 8,375,188 B1 | 2/2013 | Shah et al. |
| 8,381,028 B2 | 2/2013 | Elnozahy |
| 8,381,032 B2 | 2/2013 | Burn et al. |
| 8,381,224 B2 | 2/2013 | Huetter et al. |
| 8,386,428 B2 | 2/2013 | Kuznetzov et al. |
| 8,386,594 B2 | 2/2013 | Underwood et al. |
| 8,386,838 B1 | 2/2013 | Byan |
| 8,386,853 B2 | 2/2013 | Alberi et al. |
| 8,387,022 B2 | 2/2013 | Horning et al. |
| 8,392,838 B2 | 3/2013 | Chawla et al. |
| 8,397,032 B2 | 3/2013 | Elnozahy |
| 8,397,088 B1 | 3/2013 | Ghose |
| 8,401,940 B1 | 3/2013 | Havemose |
| 8,401,941 B1 | 3/2013 | Havemose |
| 8,402,305 B1 | 3/2013 | Havemose |
| 8,402,318 B2 | 3/2013 | Nieh et al. |
| 8,402,464 B2 | 3/2013 | Dice et al. |
| 8,407,428 B2 | 3/2013 | Cheriton et al. |
| 8,407,455 B2 | 3/2013 | Christie et al. |
| 8,407,518 B2 | 3/2013 | Nelson et al. |
| 8,413,145 B2 | 4/2013 | Chou et al. |
| 8,417,885 B2 | 4/2013 | Chou et al. |
| 8,417,916 B2 | 4/2013 | Greiner et al. |
| 8,423,959 B1 | 4/2013 | Petras |
| 8,423,961 B2 | 4/2013 | Byers et al. |
| 8,424,005 B2 | 4/2013 | Strom et al. |
| 8,429,362 B1 | 4/2013 | Natanzon et al. |
| 8,433,682 B2 | 4/2013 | Ngo |
| 8,433,951 B1 | 4/2013 | Havemose et al. |
| 8,434,093 B2 | 4/2013 | Larimore et al. |
| 8,438,256 B2 | 5/2013 | Rogel et al. |
| 8,438,360 B2 | 5/2013 | Youngworth |
| 8,438,609 B2 | 5/2013 | Cohen et al. |
| 8,442,955 B2 | 5/2013 | Al Kiswany et al. |
| 8,443,069 B2 | 5/2013 | Bagepalli et al. |
| 8,443,367 B1 | 5/2013 | Taylor et al. |
| 8,446,224 B2 | 5/2013 | Cortadella et al. |
| 8,448,022 B1 | 5/2013 | Scott |
| 8,453,120 B2 | 5/2013 | Ceze et al. |
| 8,458,341 B2 | 6/2013 | Larson et al. |
| 8,458,517 B1 | 6/2013 | Vermeulen et al. |
| 8,458,696 B2 | 6/2013 | Park et al. |
| 8,463,825 B1 | 6/2013 | Harty et al. |
| 8,464,256 B1 | 6/2013 | Havemose |
| 8,468,310 B2 | 6/2013 | Colbert et al. |
| 8,468,521 B2 | 6/2013 | Pawlowski |
| 8,473,594 B2 | 6/2013 | Astete et al. |
| 8,473,627 B2 | 6/2013 | Astete et al. |
| 8,473,900 B2 | 6/2013 | Frost |
| 8,484,732 B1 | 7/2013 | Chen et al. |
| 8,489,699 B2 | 7/2013 | Goggin et al. |
| 8,489,853 B2 | 7/2013 | Greiner et al. |
| 8,489,939 B2 | 7/2013 | Hiltunen et al. |
| 8,495,326 B2 | 7/2013 | Gainey, Jr. et al. |
| 8,495,633 B2 | 7/2013 | Easton et al. |
| 8,495,708 B2 | 7/2013 | Cohen et al. |
| 8,498,966 B1 | 7/2013 | Waghole |
| 8,499,297 B2 | 7/2013 | Chen et al. |
| 8,504,670 B2 | 8/2013 | Wu et al. |
| 8,504,696 B2 | 8/2013 | Larson et al. |
| 8,504,697 B2 | 8/2013 | Larson et al. |
| 8,504,791 B2 | 8/2013 | Cheriton et al. |
| 8,510,596 B1 | 8/2013 | Gupta et al. |
| 8,510,827 B1 | 8/2013 | Leake et al. |
| 8,516,117 B2 | 8/2013 | Munger et al. |
| 8,516,131 B2 | 8/2013 | Larson et al. |
| 8,520,002 B2 | 8/2013 | Stambaugh |
| 8,521,888 B2 | 8/2013 | Larson et al. |
| 8,527,462 B1 | 9/2013 | Talius et al. |
| 8,527,640 B2 | 9/2013 | Reisman |
| 8,527,809 B1 | 9/2013 | Backensto et al. |
| 8,527,990 B1 | 9/2013 | Marathe et al. |
| 8,533,382 B2 | 9/2013 | Scales et al. |
| 8,533,390 B2 | 9/2013 | Dong et al. |
| 8,533,663 B2 | 9/2013 | Moir et al. |
| 8,533,713 B2 | 9/2013 | Dong |
| 8,539,066 B1 | 9/2013 | Vasudeva |
| 8,539,137 B1 | 9/2013 | Protassov et al. |
| 8,539,262 B2 | 9/2013 | Huang et al. |
| 8,539,434 B2 | 9/2013 | Vertes |
| 8,539,488 B1 | 9/2013 | Havemose |
| 8,548,146 B2 | 10/2013 | Soo et al. |
| 8,548,790 B2 | 10/2013 | Tylutki |
| 8,549,210 B2 | 10/2013 | Hunter et al. |
| 8,549,241 B2 | 10/2013 | Scales et al. |
| 8,549,275 B2 | 10/2013 | Mittal |
| 8,549,313 B2 | 10/2013 | Seguin et al. |
| 8,549,646 B2 | 10/2013 | Stavrou et al. |
| 8,554,899 B2 | 10/2013 | Larson et al. |
| 8,554,900 B2 | 10/2013 | Nelson |
| 8,554,981 B2 | 10/2013 | Schmidt et al. |
| 8,560,366 B2 | 10/2013 | Mikurak |
| 8,560,705 B2 | 10/2013 | Larson et al. |
| 8,560,772 B1 | 10/2013 | Piszczek et al. |
| 8,560,816 B2 | 10/2013 | Moir et al. |
| 8,561,045 B2 | 10/2013 | Porras et al. |
| 8,561,046 B2 | 10/2013 | Song et al. |
| 8,566,640 B2 | 10/2013 | Timashev et al. |
| 8,572,247 B2 | 10/2013 | Larson et al. |
| 8,572,613 B1 | 10/2013 | Brandwine |
| 8,572,735 B2 | 10/2013 | Ghosh et al. |
| 8,572,876 B2 | 11/2013 | Shekarri et al. |
| 8,576,881 B2 | 11/2013 | Jungck et al. |
| 8,577,845 B2 | 11/2013 | Nguyen et al. |
| 8,578,000 B2 | 11/2013 | Van Wie et al. |
| 8,584,101 B2 | 11/2013 | Moon et al. |

(56) References Cited

U.S. PATENT DOCUMENTS

| | | |
|---|---|---|
| 8,584,127 B2 | 11/2013 | Yoshida |
| 8,588,179 B2 | 11/2013 | Fujino |
| 8,589,406 B2 | 11/2013 | Lillibridge |
| 8,595,191 B2 | 11/2013 | Prahlad et al. |
| 8,601,086 B2 | 12/2013 | Pandya |
| 8,601,483 B2 | 12/2013 | He et al. |
| 8,601,498 B2 | 12/2013 | Laurich et al. |
| 8,607,039 B2 | 12/2013 | Filali-Adib et al. |
| 8,607,242 B2 | 12/2013 | Clarke |
| 8,612,802 B1 | 12/2013 | Havemose |
| 8,621,180 B2 | 12/2013 | Greiner et al. |
| 8,621,183 B2 | 12/2013 | Hohmuth et al. |
| 8,621,275 B1 | 12/2013 | Havemose |
| 8,621,283 B2 | 12/2013 | Van Der Merwe et al. |
| 8,621,496 B2 | 12/2013 | Madampath |
| 8,622,839 B1 | 1/2014 | McKenzie et al. |
| 8,627,000 B2 | 1/2014 | Green et al. |
| 8,627,053 B2 | 1/2014 | Mittal |
| 8,627,143 B2 | 1/2014 | Ranganathan et al. |
| 8,631,066 B2 | 1/2014 | Lim et al. |
| 8,631,216 B2 | 1/2014 | Greiner et al. |
| 8,631,248 B2 | 1/2014 | Cowan et al. |
| 8,631,411 B1 | 1/2014 | Ghose |
| 8,631,456 B2 | 1/2014 | Reisman |
| 8,639,599 B1 | 1/2014 | Havemose |
| 8,645,240 B1 | 2/2014 | Havemose |
| 8,645,754 B1 | 2/2014 | Backensto et al. |
| 8,645,958 B2 | 2/2014 | Huetter et al. |
| 8,656,077 B2 | 2/2014 | Miloushev et al. |
| 8,656,412 B2 | 2/2014 | Kashyap |
| 8,661,457 B2 | 2/2014 | Kashyap |
| 8,667,066 B1 | 3/2014 | Havemose |
| 8,671,085 B2 | 3/2014 | Dhamankar et al. |
| 8,677,352 B2 | 3/2014 | Hiltgen et al. |
| 8,682,795 B2 | 3/2014 | Lenkov et al. |
| 8,683,004 B2 | 3/2014 | Bauer |
| 8,694,821 B2 | 4/2014 | Griffith et al. |
| 8,694,828 B2 | 4/2014 | Nelson et al. |
| 8,706,992 B2 | 4/2014 | Liu et al. |
| 8,713,268 B2 | 4/2014 | Dillow et al. |
| 8,713,273 B2 | 4/2014 | Waldspurger et al. |
| 8,713,293 B2 | 4/2014 | Tashiro et al. |
| 8,713,362 B2 | 4/2014 | Griffith et al. |
| 8,719,520 B1 | 5/2014 | Piszczek et al. |
| 8,719,849 B1 | 5/2014 | Madampath |
| 8,725,782 B2 | 5/2014 | Starks et al. |
| 8,726,078 B1 | 5/2014 | Havemose |
| 8,726,251 B2 | 5/2014 | Kalogeropulos et al. |
| 8,732,023 B2 | 5/2014 | Mikurak |
| 8,739,164 B2 | 5/2014 | Chung et al. |
| 8,745,098 B1 | 6/2014 | Havemose et al. |
| 8,745,442 B1 | 6/2014 | Havemose |
| 8,745,601 B1 | 6/2014 | Carlson et al. |
| 8,752,048 B1 | 6/2014 | Backensto et al. |
| 8,752,049 B1 | 6/2014 | Backensto et al. |
| 8,769,127 B2 | 7/2014 | Selimis et al. |
| 8,775,871 B1 | 7/2014 | Backensto et al. |
| 8,776,038 B2 | 7/2014 | Larimore et al. |
| 8,782,365 B1 | 7/2014 | Mooring et al. |
| 8,782,434 B1 | 7/2014 | Ghose |
| 8,782,435 B1 | 7/2014 | Ghose |
| 8,782,632 B1 | 7/2014 | Chigurapati et al. |
| 8,788,792 B2 | 7/2014 | Yates, Jr. et al. |
| 8,789,034 B1 | 7/2014 | Emelyanov et al. |
| 8,799,119 B1 | 8/2014 | Havemose |
| 8,805,788 B2 | 8/2014 | Gross, IV et al. |
| 8,806,266 B1 | 8/2014 | Qu et al. |
| 8,818,886 B2 | 8/2014 | Havemose |
| 8,825,830 B2 | 9/2014 | Newton et al. |
| 8,826,070 B1 | 9/2014 | Havemose et al. |
| 8,826,273 B1 | 9/2014 | Chen |
| 8,832,682 B2 | 9/2014 | Xu et al. |
| 8,839,426 B1 | 9/2014 | Brueckner et al. |
| 8,843,643 B2 | 9/2014 | Larson et al. |
| 8,850,009 B2 | 9/2014 | Larson et al. |
| 8,850,583 B1 | 9/2014 | Nelson et al. |
| 8,856,473 B2 | 10/2014 | van Riel |
| 8,856,767 B2 | 10/2014 | Jalan et al. |
| 8,862,538 B2 | 10/2014 | Patil et al. |
| 8,862,861 B2 | 10/2014 | Olson et al. |
| 8,868,506 B1 | 10/2014 | Bhargava et al. |
| 8,868,705 B2 | 10/2014 | Larson et al. |
| 8,869,139 B2 | 10/2014 | Le et al. |
| 8,875,160 B2 | 10/2014 | Hunt et al. |
| 8,880,473 B1 | 11/2014 | Havemose et al. |
| 8,880,866 B2 | 11/2014 | Doerr et al. |
| 8,881,171 B1 | 11/2014 | Backensto et al. |
| 8,893,129 B1 | 11/2014 | Havemose |
| 8,893,147 B2 | 11/2014 | Yin et al. |
| 8,902,340 B2 | 12/2014 | Silverbrook |
| 8,903,705 B2 | 12/2014 | Douceur et al. |
| 8,904,189 B1 | 12/2014 | Ghose |
| 8,904,516 B2 | 12/2014 | Larson et al. |
| 8,908,051 B2 | 12/2014 | Silverbrook |
| 8,908,069 B2 | 12/2014 | Silverbrook |
| 8,913,137 B2 | 12/2014 | Silverbrook |
| 8,918,879 B1 | 12/2014 | Li et al. |
| 8,922,791 B2 | 12/2014 | Silverbrook |
| 8,928,897 B2 | 1/2015 | Silverbrook |
| 8,930,705 B1 | 1/2015 | Ghose et al. |
| 8,936,196 B2 | 1/2015 | Silverbrook et al. |
| 8,937,727 B2 | 1/2015 | Silverbrook |
| 8,943,201 B2 | 1/2015 | Larson et al. |
| 8,943,501 B1 | 1/2015 | Havemose |
| 8,945,605 B2 | 2/2015 | Boucher et al. |
| 8,947,592 B2 | 2/2015 | Silverbrook |
| 8,947,679 B2 | 2/2015 | Silverbrook |
| 8,949,585 B2 | 2/2015 | Hiltgen et al. |
| 8,953,178 B2 | 2/2015 | Silverbrook |
| 8,955,111 B2 | 2/2015 | Glew et al. |
| 8,966,312 B1 | 2/2015 | Gupta et al. |
| 8,966,315 B2 | 2/2015 | Burn et al. |
| 8,977,736 B2 | 3/2015 | Nelson |
| 8,996,912 B1 | 3/2015 | Havemose et al. |
| 9,003,229 B1 | 4/2015 | Havemose |
| 9,009,212 B2 | 4/2015 | Sankararaman |
| 9,026,849 B2 | 5/2015 | Patterson et al. |
| 9,027,003 B2 | 5/2015 | Weissman et al. |
| 9,027,022 B2 | 5/2015 | Huetter et al. |
| 9,027,115 B2 | 5/2015 | Larson et al. |
| 9,032,170 B2 | 5/2015 | Vaghani et al. |
| 9,032,249 B1 | 5/2015 | Havemose |
| 9,037,713 B2 | 5/2015 | Larson et al. |
| 9,037,883 B2 | 5/2015 | Huang et al. |
| 9,038,163 B2 | 5/2015 | Larson et al. |
| 9,043,640 B1 | 5/2015 | Havemose |
| 9,047,178 B2 | 6/2015 | Talagala et al. |
| 9,058,599 B1 | 6/2015 | Havemose |
| 9,058,600 B1 | 6/2015 | Havemose |
| 9,063,721 B2 | 6/2015 | Ghose |
| 9,063,821 B1 | 6/2015 | Emelyanov et al. |
| 9,064,099 B2 | 6/2015 | Horning et al. |
| 9,065,706 B2 | 6/2015 | Koinuma et al. |
| 9,069,782 B2 | 6/2015 | Yang et al. |
| 9,071,526 B2 | 6/2015 | Avdanin et al. |
| 9,077,694 B2 | 7/2015 | Larson et al. |
| 9,077,695 B2 | 7/2015 | Larson et al. |
| 9,081,602 B1 | 7/2015 | Omelyanchuk et al. |
| 9,086,969 B2 | 7/2015 | Bekiroglu et al. |
| 9,092,837 B2 | 7/2015 | Bala et al. |
| 9,094,399 B2 | 7/2015 | Larson et al. |
| 9,094,449 B2 | 7/2015 | Brueckner et al. |
| 9,098,347 B2 | 8/2015 | Hiltgen et al. |
| 9,098,700 B2 | 8/2015 | Sethumadhavan et al. |
| 9,100,371 B2 | 8/2015 | Bagepalli et al. |
| 9,100,375 B2 | 8/2015 | Larson et al. |
| 9,104,624 B2 | 8/2015 | Timashev et al. |
| 9,110,722 B2 | 8/2015 | Adams et al. |
| 9,116,812 B2 | 8/2015 | Joshi et al. |
| 9,116,847 B2 | 8/2015 | Liu et al. |
| 9,117,087 B2 | 8/2015 | Tan et al. |
| 9,122,765 B1 | 9/2015 | Chen |
| 9,122,873 B2 | 9/2015 | Ghose |
| 9,135,063 B1 | 9/2015 | Ghose |

(56) References Cited

U.S. PATENT DOCUMENTS

| | | |
|---|---|---|
| 9,135,667 B2 | 9/2015 | Drees et al. |
| 9,137,397 B2 | 9/2015 | Silverbrook |
| 9,141,502 B2 | 9/2015 | Havemose |
| 9,141,786 B2 | 9/2015 | Edery et al. |
| 9,146,764 B1 | 9/2015 | Wagner |
| 9,146,819 B2 | 9/2015 | Banikazemi et al. |
| 9,148,530 B2 | 9/2015 | Silverbrook |
| 9,152,508 B1 | 10/2015 | Barnes et al. |
| 9,152,610 B2 | 10/2015 | Drees et al. |
| 9,154,433 B2 | 10/2015 | Koponen et al. |
| 9,158,626 B1 | 10/2015 | Havemose et al. |
| 9,158,810 B2 | 10/2015 | Aingaran et al. |
| 9,164,566 B2 | 10/2015 | Ghose |
| 9,164,843 B1 | 10/2015 | Havemose |
| 9,164,847 B1 | 10/2015 | Havemose et al. |
| 9,178,833 B2 | 11/2015 | Koponen et al. |
| 9,179,020 B2 | 11/2015 | Silverbrook |
| 9,183,089 B1 | 11/2015 | Havemose |
| 9,185,125 B2 | 11/2015 | Varsanyi et al. |
| 9,185,246 B2 | 11/2015 | Silverbrook |
| 9,189,233 B2 | 11/2015 | Sasanka et al. |
| 9,189,265 B2 | 11/2015 | Hiltgen et al. |
| 9,189,621 B2 | 11/2015 | Touboul |
| 9,195,519 B2 | 11/2015 | Tan et al. |
| 9,201,737 B1 | 12/2015 | Backensto et al. |
| 9,207,934 B2 | 12/2015 | Larimore et al. |
| 9,208,030 B1 | 12/2015 | Mooring et al. |
| 9,218,278 B2 | 12/2015 | Talagala et al. |
| 9,219,747 B2 | 12/2015 | Amoroso et al. |
| 9,219,755 B2 | 12/2015 | Touboul |
| 9,219,832 B2 | 12/2015 | Silverbrook |
| 9,223,967 B2 | 12/2015 | Ghose |
| 9,229,758 B2 | 1/2016 | Ammons et al. |
| 9,230,122 B2 | 1/2016 | Ghose |
| 9,231,882 B2 | 1/2016 | Fulton et al. |
| 9,237,244 B2 | 1/2016 | Silverbrook |
| 9,239,765 B2 | 1/2016 | Block et al. |
| 9,246,833 B2 | 1/2016 | Koponen et al. |
| 9,251,004 B1 | 2/2016 | Havemose |
| 9,251,098 B2 | 2/2016 | Haid et al. |
| 9,253,109 B2 | 2/2016 | Koponen et al. |
| 9,256,496 B1 | 2/2016 | Havemose |
| 9,262,194 B2 | 2/2016 | Sudhakar |
| 9,268,602 B2 | 2/2016 | Prahlad et al. |
| 9,268,702 B2 | 2/2016 | Bilas et al. |
| 9,280,393 B2 | 3/2016 | Bird et al. |
| 9,282,166 B2 | 3/2016 | Markley et al. |
| 9,286,109 B1 | 3/2016 | Backensto et al. |
| 9,286,703 B2 | 3/2016 | Brumer et al. |
| 9,292,330 B2 | 3/2016 | Bonilla et al. |
| 9,294,282 B1 | 3/2016 | Potlapally et al. |
| 9,304,869 B1 | 4/2016 | Backensto et al. |
| 9,311,140 B2 | 4/2016 | Raghu et al. |
| 9,311,313 B2 | 4/2016 | Le et al. |
| 9,317,315 B2 | 4/2016 | Mehta |
| 9,317,326 B2 | 4/2016 | Ramanathan et al. |
| 9,323,550 B2 | 4/2016 | Lim et al. |
| 9,323,556 B2 | 4/2016 | Wagner |
| 9,323,623 B1 | 4/2016 | Havemose |
| 9,323,921 B2 | 4/2016 | Hunt et al. |
| 9,329,894 B2 | 5/2016 | Raghu |
| 9,336,040 B2 | 5/2016 | Dong et al. |
| 9,336,099 B1 | 5/2016 | Havemose |
| 9,348,652 B2 | 5/2016 | Raghu |
| 9,354,921 B2 | 5/2016 | Nelson |
| 9,354,927 B2 | 5/2016 | Hiltgen et al. |
| 9,354,977 B1 | 5/2016 | Backensto et al. |
| 9,355,161 B1 | 5/2016 | Havemose |
| 9,356,962 B2 | 5/2016 | Ilieva et al. |
| 9,372,732 B2 | 6/2016 | Adams et al. |
| 9,374,346 B2 | 6/2016 | Larson et al. |
| 9,378,059 B2 | 6/2016 | Huetter et al. |
| 9,384,347 B1 | 7/2016 | Havemose |
| 9,386,000 B2 | 7/2016 | Larson et al. |
| 9,389,893 B2 | 7/2016 | Raghu |
| 9,389,933 B2 | 7/2016 | Baumann et al. |
| 9,389,959 B1 | 7/2016 | Backensto et al. |
| 9,391,801 B2 | 7/2016 | Raghu |
| 2002/0002706 A1 | 1/2002 | Sprunk |
| 2002/0003884 A1 | 1/2002 | Sprunk |
| 2002/0019844 A1 | 2/2002 | Kurowski et al. |
| 2002/0030712 A1 | 3/2002 | Silverbrook |
| 2002/0030713 A1 | 3/2002 | Silverbrook |
| 2002/0032903 A1 | 3/2002 | Sprunk |
| 2002/0033854 A1 | 3/2002 | Silverbrook |
| 2002/0065776 A1 | 5/2002 | Calder et al. |
| 2002/0065869 A1 | 5/2002 | Calder et al. |
| 2002/0065874 A1 | 5/2002 | Chien et al. |
| 2002/0065876 A1 | 5/2002 | Chien et al. |
| 2002/0065912 A1 | 5/2002 | Catchpole et al. |
| 2002/0065945 A1 | 5/2002 | Calder et al. |
| 2002/0066021 A1 | 5/2002 | Chien et al. |
| 2002/0066022 A1 | 5/2002 | Calder et al. |
| 2002/0069369 A1 | 6/2002 | Tremain |
| 2002/0071104 A1 | 6/2002 | Silverbrook |
| 2002/0073101 A1 | 6/2002 | Stoyen |
| 2002/0073283 A1 | 6/2002 | Lewis et al. |
| 2002/0080335 A1 | 6/2002 | Silverbrook |
| 2002/0092003 A1 | 7/2002 | Calder et al. |
| 2002/0092015 A1 | 7/2002 | Sprunk et al. |
| 2002/0093980 A1 | 7/2002 | Trebes |
| 2002/0094084 A1 | 7/2002 | Wasilewski et al. |
| 2002/0095665 A1 | 7/2002 | Chaudhry et al. |
| 2002/0147969 A1 | 10/2002 | Lethin et al. |
| 2002/0161884 A1 | 10/2002 | Munger et al. |
| 2002/0161925 A1 | 10/2002 | Munger et al. |
| 2002/0188653 A1 | 12/2002 | Sun |
| 2002/0194388 A1 | 12/2002 | Boloker et al. |
| 2003/0005102 A1 | 1/2003 | Russell |
| 2003/0018826 A1 | 1/2003 | Chaudhry et al. |
| 2003/0028861 A1 | 2/2003 | Wallman et al. |
| 2003/0037142 A1 | 2/2003 | Munger et al. |
| 2003/0058277 A1 | 3/2003 | Bowman-Amuah |
| 2003/0068185 A1 | 4/2003 | Silverbrook |
| 2003/0079116 A1 | 4/2003 | Chaudlhry et al. |
| 2003/0092972 A1 | 5/2003 | Mantilla et al. |
| 2003/0097278 A1 | 5/2003 | Mantilla et al. |
| 2003/0112419 A1 | 6/2003 | Silverbrook |
| 2003/0117496 A1 | 6/2003 | Silverbrook |
| 2003/0149962 A1 | 8/2003 | Willis et al. |
| 2003/0154061 A1 | 8/2003 | Willis |
| 2003/0154284 A1 | 8/2003 | Bernardin et al. |
| 2003/0158960 A1 | 8/2003 | Engberg |
| 2003/0167307 A1 | 9/2003 | Filepp et al. |
| 2003/0167342 A1 | 9/2003 | Munger et al. |
| 2003/0167421 A1 | 9/2003 | Klemm |
| 2003/0182572 A1 | 9/2003 | Cowan et al. |
| 2003/0187911 A1 | 10/2003 | Abd-El-Malek et al. |
| 2003/0188141 A1 | 10/2003 | Chaudhry et al. |
| 2003/0191795 A1 | 10/2003 | Bernardin et al. |
| 2003/0208500 A1 | 11/2003 | Daynes et al. |
| 2003/0208673 A1 | 11/2003 | Chaudhry et al. |
| 2003/0212987 A1 | 11/2003 | Demuth et al. |
| 2003/0229900 A1 | 12/2003 | Reisman |
| 2004/0004129 A1 | 1/2004 | Silverbrook |
| 2004/0004651 A1 | 1/2004 | Silverbrook |
| 2004/0004698 A1 | 1/2004 | Silverbrook et al. |
| 2004/0007121 A1 | 1/2004 | Graves et al. |
| 2004/0008261 A1 | 1/2004 | Silverbrook |
| 2004/0008262 A1 | 1/2004 | Silverbrook et al. |
| 2004/0008327 A1 | 1/2004 | Silverbrook |
| 2004/0010545 A1 | 1/2004 | Pandya |
| 2004/0010612 A1 | 1/2004 | Pandya |
| 2004/0015627 A1 | 1/2004 | Desoli et al. |
| 2004/0030739 A1 | 2/2004 | Yousefi'zadeh |
| 2004/0030757 A1 | 2/2004 | Pandya |
| 2004/0030770 A1 | 2/2004 | Pandya |
| 2004/0030806 A1 | 2/2004 | Pandya |
| 2004/0031058 A1 | 2/2004 | Reisman |
| 2004/0037299 A1 | 2/2004 | Pandya |
| 2004/0037319 A1 | 2/2004 | Pandya |
| 2004/0041018 A1 | 3/2004 | Silverbrook et al. |
| 2004/0051753 A1 | 3/2004 | Silverbrook |
| 2004/0055004 A1 | 3/2004 | Sun et al. |

(56) References Cited

U.S. PATENT DOCUMENTS

| | | |
|---|---|---|
| 2004/0056105 A1 | 3/2004 | Silverbrook et al. |
| 2004/0061734 A1 | 4/2004 | Silverbrook |
| 2004/0064351 A1 | 4/2004 | Mikurak |
| 2004/0065738 A1 | 4/2004 | Silverbrook et al. |
| 2004/0075747 A1 | 4/2004 | Silverbrook |
| 2004/0075821 A1 | 4/2004 | Silverbrook |
| 2004/0080620 A1 | 4/2004 | Silverbrook |
| 2004/0088347 A1 | 5/2004 | Yeager et al. |
| 2004/0088348 A1 | 5/2004 | Yeager et al. |
| 2004/0088369 A1 | 5/2004 | Yeager et al. |
| 2004/0088646 A1 | 5/2004 | Yeager et al. |
| 2004/0090553 A1 | 5/2004 | Silverbrook |
| 2004/0098154 A1 | 5/2004 | McCarthy |
| 2004/0098447 A1 | 5/2004 | Verbeke et al. |
| 2004/0098485 A1 | 5/2004 | Larson et al. |
| 2004/0103205 A1 | 5/2004 | Larson et al. |
| 2004/0107025 A1 | 6/2004 | Ransom et al. |
| 2004/0107285 A1 | 6/2004 | Larson et al. |
| 2004/0107286 A1 | 6/2004 | Larson et al. |
| 2004/0119827 A1 | 6/2004 | Silverbrook et al. |
| 2004/0125209 A1 | 7/2004 | Silverbrook et al. |
| 2004/0125212 A1 | 7/2004 | Silverbrook et al. |
| 2004/0128670 A1 | 7/2004 | Robinson et al. |
| 2004/0129789 A1 | 7/2004 | Silverbrook et al. |
| 2004/0133640 A1 | 7/2004 | Yeager et al. |
| 2004/0138787 A1 | 7/2004 | Ransom et al. |
| 2004/0141061 A1 | 7/2004 | Silverbrook |
| 2004/0143710 A1 | 7/2004 | Walmsley |
| 2004/0148307 A1 | 7/2004 | Rempell |
| 2004/0153558 A1 | 8/2004 | Gunduc et al. |
| 2004/0158549 A1 | 8/2004 | Matena et al. |
| 2004/0162951 A1 | 8/2004 | Jacobson et al. |
| 2004/0162989 A1* | 8/2004 | Kirovski ............... G06F 21/52 713/189 |
| 2004/0165588 A1 | 8/2004 | Pandya |
| 2004/0168030 A1 | 8/2004 | Traversat et al. |
| 2004/0172626 A1 | 9/2004 | Jalan et al. |
| 2004/0174570 A1 | 9/2004 | Plunkett et al. |
| 2004/0179072 A1 | 9/2004 | Silverbrook |
| 2004/0181303 A1 | 9/2004 | Walmsley |
| 2004/0183843 A1 | 9/2004 | Walmsley et al. |
| 2004/0183914 A1 | 9/2004 | Silverbrook |
| 2004/0187115 A1 | 9/2004 | Tremblay et al. |
| 2004/0187116 A1 | 9/2004 | Tremblay et al. |
| 2004/0187123 A1 | 9/2004 | Tremblay et al. |
| 2004/0189355 A1 | 9/2004 | Walmsley |
| 2004/0189731 A1 | 9/2004 | Robert Walmsley et al. |
| 2004/0193880 A1 | 9/2004 | Walmsley |
| 2004/0196320 A1 | 10/2004 | Walmsley et al. |
| 2004/0196513 A1 | 10/2004 | Silverbrook |
| 2004/0199786 A1 | 10/2004 | Walmsley et al. |
| 2004/0201647 A1 | 10/2004 | Jackson Pulver et al. |
| 2004/0201939 A1 | 10/2004 | Shipton et al. |
| 2004/0205377 A1 | 10/2004 | Nakamura et al. |
| 2004/0205414 A1 | 10/2004 | Roselli et al. |
| 2004/0210320 A1 | 10/2004 | Pandya |
| 2004/0212652 A1 | 10/2004 | Silverbrook |
| 2004/0213482 A1 | 10/2004 | Silverbrook |
| 2004/0213613 A1 | 10/2004 | Silverbrook |
| 2004/0218048 A1 | 11/2004 | Silverbrook |
| 2004/0218049 A1 | 11/2004 | Silverbrook |
| 2004/0218934 A1 | 11/2004 | Silverbrook |
| 2004/0221194 A1 | 11/2004 | Denninghoff et al. |
| 2004/0221287 A1 | 11/2004 | Walmsley |
| 2004/0223010 A1 | 11/2004 | Plunkett |
| 2004/0225881 A1 | 11/2004 | Walmsley et al. |
| 2004/0227205 A1 | 11/2004 | Walmsley |
| 2004/0230960 A1 | 11/2004 | Nair et al. |
| 2004/0243978 A1 | 12/2004 | Walmsley |
| 2004/0243986 A1 | 12/2004 | Nishiyama |
| 2004/0246503 A1 | 12/2004 | Silverbrook |
| 2004/0249757 A1 | 12/2004 | Walmsley et al. |
| 2004/0254648 A1 | 12/2004 | Johnson et al. |
| 2004/0254962 A1 | 12/2004 | Kodama et al. |
| 2004/0254964 A1 | 12/2004 | Kodama et al. |
| 2004/0267691 A1 | 12/2004 | Vasudeva |
| 2005/0005200 A1 | 1/2005 | Matena et al. |
| 2005/0015781 A1 | 1/2005 | Brown et al. |
| 2005/0027870 A1 | 2/2005 | Trebes |
| 2005/0050545 A1 | 3/2005 | Moakley |
| 2005/0055399 A1 | 3/2005 | Savchuk |
| 2005/0055588 A1 | 3/2005 | Nalawadi et al. |
| 2005/0064849 A1 | 3/2005 | Coppinger et al. |
| 2005/0064857 A1 | 3/2005 | Coppinger et al. |
| 2005/0064868 A1 | 3/2005 | Coppinger et al. |
| 2005/0076331 A1 | 4/2005 | Das et al. |
| 2005/0086211 A1 | 4/2005 | Mayer |
| 2005/0086451 A1 | 4/2005 | Yates, Jr. et al. |
| 2005/0086520 A1 | 4/2005 | Dharmapurikar et al. |
| 2005/0086650 A1 | 4/2005 | Yates, Jr. et al. |
| 2005/0090258 A1 | 4/2005 | Coppinger et al. |
| 2005/0091545 A1 | 4/2005 | Soppera |
| 2005/0092849 A1 | 5/2005 | Silverbrook |
| 2005/0093909 A1 | 5/2005 | Silverbrook |
| 2005/0094166 A1 | 5/2005 | Silverbrook |
| 2005/0099445 A1 | 5/2005 | Silverbrook |
| 2005/0108518 A1 | 5/2005 | Pandya |
| 2005/0113092 A1 | 5/2005 | Coppinger et al. |
| 2005/0122399 A1 | 6/2005 | Silverbrook et al. |
| 2005/0125513 A1 | 6/2005 | Sin-Ling Lam et al. |
| 2005/0127181 A1 | 6/2005 | Silverbrook |
| 2005/0145701 A1 | 7/2005 | Silverbrook et al. |
| 2005/0146583 A1 | 7/2005 | Silverbrook |
| 2005/0146613 A1 | 7/2005 | Silverbrook et al. |
| 2005/0146614 A1 | 7/2005 | Silverbrook |
| 2005/0151777 A1 | 7/2005 | Silverbrook |
| 2005/0151819 A1 | 7/2005 | Silverbrook |
| 2005/0152596 A1 | 7/2005 | Walmsley |
| 2005/0156736 A1 | 7/2005 | Rajapakse et al. |
| 2005/0158043 A1 | 7/2005 | Silverbrook |
| 2005/0160316 A1 | 7/2005 | Shipton |
| 2005/0160423 A1 | 7/2005 | Bantz et al. |
| 2005/0162455 A1 | 7/2005 | Silverbrook |
| 2005/0162456 A1 | 7/2005 | Silverbrook |
| 2005/0166040 A1 | 7/2005 | Walmsley |
| 2005/0172018 A1 | 8/2005 | Devine et al. |
| 2005/0177633 A1 | 8/2005 | Plunkett |
| 2005/0177635 A1 | 8/2005 | Schmidt et al. |
| 2005/0179781 A1 | 8/2005 | Silverbrook |
| 2005/0182985 A1 | 8/2005 | Shipton et al. |
| 2005/0183072 A1 | 8/2005 | Horning et al. |
| 2005/0185198 A1 | 8/2005 | Silverbrook |
| 2005/0185461 A1 | 8/2005 | Silverbrook et al. |
| 2005/0188218 A1 | 8/2005 | Walmsley et al. |
| 2005/0193269 A1 | 9/2005 | Haswell et al. |
| 2005/0198303 A1 | 9/2005 | Knauerhase et al. |
| 2005/0204348 A1 | 9/2005 | Horning et al. |
| 2005/0209930 A1 | 9/2005 | Coppinger et al. |
| 2005/0210179 A1 | 9/2005 | Walmsley et al. |
| 2005/0210275 A1 | 9/2005 | Homing et al. |
| 2005/0213761 A1 | 9/2005 | Walmsley et al. |
| 2005/0218236 A1 | 10/2005 | Silverbrook et al. |
| 2005/0222931 A1 | 10/2005 | Mamou et al. |
| 2005/0223109 A1 | 10/2005 | Mamou et al. |
| 2005/0228808 A1 | 10/2005 | Mamou et al. |
| 2005/0232046 A1 | 10/2005 | Mamou et al. |
| 2005/0234969 A1 | 10/2005 | Mamou et al. |
| 2005/0235274 A1 | 10/2005 | Mamou et al. |
| 2005/0240354 A1 | 10/2005 | Mamou et al. |
| 2005/0240592 A1 | 10/2005 | Mamou et al. |
| 2005/0246708 A1 | 11/2005 | Turner et al. |
| 2005/0247793 A1 | 11/2005 | Silverbrook et al. |
| 2005/0251803 A1 | 11/2005 | Turner et al. |
| 2005/0256843 A1 | 11/2005 | Santos et al. |
| 2005/0257080 A1 | 11/2005 | Santos et al. |
| 2005/0257090 A1 | 11/2005 | Santos et al. |
| 2005/0258248 A1 | 11/2005 | Silverbrook et al. |
| 2005/0262188 A1 | 11/2005 | Mamou et al. |
| 2005/0262189 A1 | 11/2005 | Mamou et al. |
| 2005/0262190 A1 | 11/2005 | Mamou et al. |
| 2005/0262191 A1 | 11/2005 | Mamou et al. |
| 2005/0262192 A1 | 11/2005 | Mamou et al. |
| 2005/0262193 A1 | 11/2005 | Mamou et al. |
| 2005/0262194 A1 | 11/2005 | Mamou et al. |

(56) References Cited

U.S. PATENT DOCUMENTS

| | | |
|---|---|---|
| 2005/0262301 A1 | 11/2005 | Jacobson et al. |
| 2005/0268071 A1 | 12/2005 | Blandy et al. |
| 2005/0268290 A1 | 12/2005 | Cognigni et al. |
| 2005/0275815 A1 | 12/2005 | Silverbrook |
| 2005/0283644 A1 | 12/2005 | Lorch et al. |
| 2005/0283659 A1 | 12/2005 | Lamport et al. |
| 2005/0289246 A1 | 12/2005 | Easton et al. |
| 2006/0007261 A1 | 1/2006 | Silverbrook |
| 2006/0010195 A1 | 1/2006 | Mamou et al. |
| 2006/0012652 A1 | 1/2006 | Silverbrook |
| 2006/0015749 A1 | 1/2006 | Mittal |
| 2006/0020790 A1 | 1/2006 | Sprunk |
| 2006/0021029 A1 | 1/2006 | Brickell et al. |
| 2006/0028516 A1 | 2/2006 | Silverbrook |
| 2006/0036426 A1 | 2/2006 | Barr et al. |
| 2006/0040667 A9 | 2/2006 | Coppinger et al. |
| 2006/0041786 A1 | 2/2006 | Janakiraman et al. |
| 2006/0050286 A1 | 3/2006 | Silverbrook et al. |
| 2006/0052962 A1 | 3/2006 | Shipton et al. |
| 2006/0053439 A1 | 3/2006 | Sprunk |
| 2006/0055782 A1 | 3/2006 | Silverbrook et al. |
| 2006/0056728 A1 | 3/2006 | Silverbrook et al. |
| 2006/0059253 A1 | 3/2006 | Goodman et al. |
| 2006/0061795 A1 | 3/2006 | Walmsley |
| 2006/0067592 A1 | 3/2006 | Walmsley et al. |
| 2006/0069717 A1 | 3/2006 | Mamou et al. |
| 2006/0071951 A1 | 4/2006 | Walmsley et al. |
| 2006/0071981 A1 | 4/2006 | Plunkett |
| 2006/0072030 A1 | 4/2006 | Silverbrook |
| 2006/0072952 A1 | 4/2006 | Walmsley et al. |
| 2006/0074994 A1 | 4/2006 | Smits |
| 2006/0076423 A1 | 4/2006 | Silverbrook et al. |
| 2006/0077248 A1 | 4/2006 | Silverbrook |
| 2006/0082609 A1 | 4/2006 | Walmsley et al. |
| 2006/0087525 A1 | 4/2006 | Jackson Pulver et al. |
| 2006/0092205 A1 | 5/2006 | Jackson Pulver et al. |
| 2006/0092222 A1 | 5/2006 | Jackson Pulver et al. |
| 2006/0095276 A1 | 5/2006 | Axelrod et al. |
| 2006/0098042 A1 | 5/2006 | Silverbrook et al. |
| 2006/0098044 A1 | 5/2006 | Jackson Pulver et al. |
| 2006/0110011 A1 | 5/2006 | Cohen et al. |
| 2006/0110199 A1 | 5/2006 | Walmsley et al. |
| 2006/0112278 A1 | 5/2006 | Cohen et al. |
| 2006/0112279 A1 | 5/2006 | Cohen et al. |
| 2006/0112280 A1 | 5/2006 | Cohen et al. |
| 2006/0122939 A1 | 6/2006 | Cohen et al. |
| 2006/0123010 A1 | 6/2006 | Landry et al. |
| 2006/0125854 A1 | 6/2006 | Jackson Pulver et al. |
| 2006/0125855 A1 | 6/2006 | Silverbrook et al. |
| 2006/0125857 A1 | 6/2006 | Silverbrook et al. |
| 2006/0125858 A1 | 6/2006 | Silverbrook et al. |
| 2006/0125859 A1 | 6/2006 | Walmsley et al. |
| 2006/0125861 A1 | 6/2006 | Silverbrook et al. |
| 2006/0125863 A1 | 6/2006 | Silverbrook et al. |
| 2006/0125876 A1 | 6/2006 | Walmsley et al. |
| 2006/0129806 A1 | 6/2006 | Walmsley |
| 2006/0132512 A1 | 6/2006 | Walmsley et al. |
| 2006/0132516 A1 | 6/2006 | Walmsley et al. |
| 2006/0132518 A1 | 6/2006 | Jackson Pulver et al. |
| 2006/0132521 A1 | 6/2006 | Walmsley et al. |
| 2006/0132525 A1 | 6/2006 | Walmsley et al. |
| 2006/0132822 A1 | 6/2006 | Walmsley |
| 2006/0136570 A1 | 6/2006 | Pandya |
| 2006/0136720 A1 | 6/2006 | Armstrong et al. |
| 2006/0136725 A1 | 6/2006 | Walmsley |
| 2006/0136781 A1 | 6/2006 | Lamport |
| 2006/0139380 A1 | 6/2006 | Walmsley et al. |
| 2006/0139386 A1 | 6/2006 | Silverbrook et al. |
| 2006/0139387 A1 | 6/2006 | Silverbrook et al. |
| 2006/0139388 A1 | 6/2006 | Silverbrook et al. |
| 2006/0139681 A1 | 6/2006 | Walmsley |
| 2006/0143350 A1 | 6/2006 | Miloushev et al. |
| 2006/0143454 A1 | 6/2006 | Walmsley |
| 2006/0143517 A1 | 6/2006 | Douceur et al. |
| 2006/0146101 A1 | 7/2006 | Silverbrook |
| 2006/0149945 A1 | 7/2006 | Chaudhry et al. |
| 2006/0149946 A1 | 7/2006 | Chaudhry et al. |
| 2006/0155930 A1 | 7/2006 | Birrell et al. |
| 2006/0155931 A1 | 7/2006 | Birrell et al. |
| 2006/0158519 A1 | 7/2006 | Silverbrook |
| 2006/0164451 A1 | 7/2006 | Pulver et al. |
| 2006/0164452 A1 | 7/2006 | Walmsley et al. |
| 2006/0164453 A1 | 7/2006 | Silverbrook et al. |
| 2006/0164454 A1 | 7/2006 | Walmsley et al. |
| 2006/0164455 A1 | 7/2006 | Silverbrook et al. |
| 2006/0164462 A1 | 7/2006 | Silverbrook et al. |
| 2006/0178918 A1 | 8/2006 | Mikurak |
| 2006/0181558 A1 | 8/2006 | Walmsley et al. |
| 2006/0184935 A1 | 8/2006 | Abels et al. |
| 2006/0184936 A1 | 8/2006 | Abels et al. |
| 2006/0184937 A1 | 8/2006 | Abels et al. |
| 2006/0187251 A1 | 8/2006 | Pulver et al. |
| 2006/0195508 A1 | 8/2006 | Bernardin et al. |
| 2006/0200632 A1 | 9/2006 | Tremblay et al. |
| 2006/0212146 A1 | 9/2006 | Johnson et al. |
| 2006/0212750 A1 | 9/2006 | Denninghoff et al. |
| 2006/0214012 A1 | 9/2006 | Silverbrook et al. |
| 2006/0218563 A1 | 9/2006 | Grinstein et al. |
| 2006/0225065 A1 | 10/2006 | Chandhok et al. |
| 2006/0230216 A1 | 10/2006 | Fuente |
| 2006/0230407 A1 | 10/2006 | Rosu et al. |
| 2006/0231627 A1 | 10/2006 | Silverbrook et al. |
| 2006/0233367 A1 | 10/2006 | Birrell et al. |
| 2006/0241921 A1 | 10/2006 | Willis |
| 2006/0256944 A1 | 11/2006 | Silverbrook |
| 2006/0259818 A1 | 11/2006 | Howell et al. |
| 2006/0265508 A1 | 11/2006 | Angel et al. |
| 2006/0274112 A1 | 12/2006 | Jackson Pulver et al. |
| 2006/0274114 A1 | 12/2006 | Silverbrook et al. |
| 2006/0282681 A1 | 12/2006 | Scheidt et al. |
| 2006/0294312 A1 | 12/2006 | Walmsley |
| 2007/0005919 A1 | 1/2007 | van Riel |
| 2007/0006150 A9 | 1/2007 | Walmsley |
| 2007/0011023 A1 | 1/2007 | Silverbrook |
| 2007/0011650 A1 | 1/2007 | Hage et al. |
| 2007/0019016 A1 | 1/2007 | Silverbrook et al. |
| 2007/0035566 A1 | 2/2007 | Silverbrook |
| 2007/0040856 A1 | 2/2007 | Silverbrook |
| 2007/0046955 A1 | 3/2007 | Silverbrook |
| 2007/0050367 A1 | 3/2007 | Suganuma et al. |
| 2007/0050686 A1 | 3/2007 | Keeton et al. |
| 2007/0055753 A1 | 3/2007 | Robb |
| 2007/0067590 A1 | 3/2007 | Savagaonkar et al. |
| 2007/0067630 A1 | 3/2007 | Lenkov et al. |
| 2007/0074258 A1 | 3/2007 | Wood et al. |
| 2007/0083491 A1 | 4/2007 | Walmsley et al. |
| 2007/0088939 A1 | 4/2007 | Baumberger et al. |
| 2007/0099683 A1 | 5/2007 | Panther Trice et al. |
| 2007/0100834 A1 | 5/2007 | Landry et al. |
| 2007/0120673 A1 | 5/2007 | Rajapakse et al. |
| 2007/0128899 A1 | 6/2007 | Mayer |
| 2007/0136579 A1 | 6/2007 | Levy et al. |
| 2007/0174750 A1 | 7/2007 | Borin |
| 2007/0174910 A1 | 7/2007 | Zachman et al. |
| 2007/0174915 A1 | 7/2007 | Gribble et al. |
| 2007/0180509 A1 | 8/2007 | Swartz et al. |
| 2007/0200890 A1 | 8/2007 | Silverbrook |
| 2007/0201845 A1 | 8/2007 | Silverbrook et al. |
| 2007/0201846 A1 | 8/2007 | Silverbrook et al. |
| 2007/0206611 A1 | 9/2007 | Shokri et al. |
| 2007/0211285 A1 | 9/2007 | Shipton |
| 2007/0226359 A1 | 9/2007 | Gunduc et al. |
| 2007/0233880 A1 | 10/2007 | Nieh et al. |
| 2007/0234070 A1 | 10/2007 | Horning et al. |
| 2007/0234302 A1 | 10/2007 | Suzuki et al. |
| 2007/0234337 A1 | 10/2007 | Suzuki et al. |
| 2007/0234342 A1 | 10/2007 | Flynn et al. |
| 2007/0234356 A1 | 10/2007 | Martins et al. |
| 2007/0239804 A1 | 10/2007 | Armstrong et al. |
| 2007/0240171 A1 | 10/2007 | Biro et al. |
| 2007/0244937 A1 | 10/2007 | Flynn et al. |
| 2007/0244962 A1 | 10/2007 | Laadan et al. |
| 2007/0245334 A1 | 10/2007 | Nieh et al. |
| 2007/0249320 A1 | 10/2007 | Coppinger et al. |

(56) References Cited

U.S. PATENT DOCUMENTS

| | | |
|---|---|---|
| 2007/0254638 A1 | 11/2007 | Coppinger et al. |
| 2007/0260733 A1 | 11/2007 | Havemose et al. |
| 2007/0266368 A1 | 11/2007 | Szpak et al. |
| 2007/0271445 A1 | 11/2007 | Tremblay et al. |
| 2007/0271830 A1 | 11/2007 | Holt et al. |
| 2007/0276879 A1 | 11/2007 | Rothman et al. |
| 2007/0282926 A1 | 12/2007 | Ben-Yehuda et al. |
| 2007/0282951 A1 | 12/2007 | Selimis et al. |
| 2007/0283353 A1 | 12/2007 | Tremblay et al. |
| 2007/0288247 A1 | 12/2007 | Mackay |
| 2008/0005792 A1 | 1/2008 | Larson et al. |
| 2008/0016249 A1 | 1/2008 | Ellis et al. |
| 2008/0022276 A1 | 1/2008 | Coppinger et al. |
| 2008/0022874 A1 | 1/2008 | Silverbrook |
| 2008/0024642 A1 | 1/2008 | Silverbrook et al. |
| 2008/0034201 A1 | 2/2008 | Munger et al. |
| 2008/0034350 A1* | 2/2008 | Conti ................ G06F 21/54 717/124 |
| 2008/0040279 A1 | 2/2008 | Coppinger et al. |
| 2008/0040477 A1 | 2/2008 | Johnson et al. |
| 2008/0040783 A1 | 2/2008 | Larson et al. |
| 2008/0040791 A1 | 2/2008 | Munger et al. |
| 2008/0040792 A1 | 2/2008 | Larson et al. |
| 2008/0046598 A1 | 2/2008 | Johnson et al. |
| 2008/0046699 A1 | 2/2008 | Pauw et al. |
| 2008/0052386 A1 | 2/2008 | Johnson et al. |
| 2008/0052695 A1 | 2/2008 | Dickenson et al. |
| 2008/0059214 A1 | 3/2008 | Vinberg et al. |
| 2008/0060077 A1 | 3/2008 | Cowan et al. |
| 2008/0062232 A1 | 3/2008 | Silverbrook |
| 2008/0085107 A1 | 4/2008 | Silverbrook |
| 2008/0087736 A1 | 4/2008 | Silverbrook |
| 2008/0104531 A1 | 5/2008 | Stambaugh |
| 2008/0104532 A1 | 5/2008 | Stambaugh |
| 2008/0109756 A1 | 5/2008 | Stambaugh |
| 2008/0109757 A1 | 5/2008 | Stambaugh |
| 2008/0109758 A1 | 5/2008 | Stambaugh |
| 2008/0109759 A1 | 5/2008 | Stambaugh |
| 2008/0109760 A1 | 5/2008 | Stambaugh |
| 2008/0109761 A1 | 5/2008 | Stambaugh |
| 2008/0111818 A1 | 5/2008 | Stambaugh |
| 2008/0120350 A1 | 5/2008 | Grabowski et al. |
| 2008/0120620 A1 | 5/2008 | Lett et al. |
| 2008/0126502 A1 | 5/2008 | Holt |
| 2008/0126505 A1 | 5/2008 | Holt |
| 2008/0126506 A1 | 5/2008 | Holt |
| 2008/0129725 A1 | 6/2008 | Stambaugh |
| 2008/0133688 A1 | 6/2008 | Holt |
| 2008/0133692 A1 | 6/2008 | Holt |
| 2008/0133694 A1 | 6/2008 | Holt |
| 2008/0133869 A1 | 6/2008 | Holt |
| 2008/0134161 A1 | 6/2008 | Chamieh et al. |
| 2008/0140801 A1 | 6/2008 | Holt |
| 2008/0140982 A1 | 6/2008 | Holt |
| 2008/0141065 A1 | 6/2008 | Okabe |
| 2008/0148262 A1 | 6/2008 | Dice |
| 2008/0150963 A1 | 6/2008 | Stambaugh |
| 2008/0155169 A1 | 6/2008 | Hiltgen et al. |
| 2008/0155208 A1 | 6/2008 | Hiltgen et al. |
| 2008/0155223 A1 | 6/2008 | Hiltgen et al. |
| 2008/0162889 A1 | 7/2008 | Cascaval et al. |
| 2008/0165253 A9 | 7/2008 | Silverbrook |
| 2008/0165254 A1 | 7/2008 | Silverbrook et al. |
| 2008/0172632 A1 | 7/2008 | Stambaugh |
| 2008/0177994 A1 | 7/2008 | Mayer |
| 2008/0183882 A1 | 7/2008 | Flynn et al. |
| 2008/0184229 A1 | 7/2008 | Rosu et al. |
| 2008/0189432 A1 | 8/2008 | Abali et al. |
| 2008/0189468 A1 | 8/2008 | Schmidt et al. |
| 2008/0189700 A1 | 8/2008 | Schmidt et al. |
| 2008/0189769 A1 | 8/2008 | Casado et al. |
| 2008/0195840 A1 | 8/2008 | Archer et al. |
| 2008/0196026 A1 | 8/2008 | Azagury et al. |
| 2008/0201602 A1 | 8/2008 | Agarwal et al. |
| 2008/0215796 A1 | 9/2008 | Lam et al. |
| 2008/0215920 A1 | 9/2008 | Mayer et al. |
| 2008/0216073 A1 | 9/2008 | Yates et al. |
| 2008/0216168 A1 | 9/2008 | Larson et al. |
| 2008/0222415 A1 | 9/2008 | Munger et al. |
| 2008/0222604 A1 | 9/2008 | Murphy |
| 2008/0234998 A1 | 9/2008 | Cohen et al. |
| 2008/0234999 A1 | 9/2008 | Cohen et al. |
| 2008/0235000 A1 | 9/2008 | Cohen et al. |
| 2008/0235001 A1 | 9/2008 | Cohen et al. |
| 2008/0235002 A1 | 9/2008 | Cohen et al. |
| 2008/0235711 A1 | 9/2008 | Cohen et al. |
| 2008/0235756 A1 | 9/2008 | Cohen et al. |
| 2008/0235764 A1 | 9/2008 | Cohen et al. |
| 2008/0243935 A1 | 10/2008 | Castro et al. |
| 2008/0244535 A1 | 10/2008 | Nelson et al. |
| 2008/0244544 A1 | 10/2008 | Neelakantam et al. |
| 2008/0244747 A1 | 10/2008 | Gleichauf et al. |
| 2008/0250051 A1 | 10/2008 | Grechanik et al. |
| 2008/0250265 A1 | 10/2008 | Chang et al. |
| 2008/0253395 A1 | 10/2008 | Pandya |
| 2008/0259711 A1 | 10/2008 | Shipton et al. |
| 2008/0263114 A1 | 10/2008 | Nath et al. |
| 2008/0263658 A1 | 10/2008 | Michael et al. |
| 2008/0270199 A1 | 10/2008 | Chess et al. |
| 2008/0270838 A1 | 10/2008 | Dorai et al. |
| 2008/0288558 A1 | 11/2008 | De Pauw et al. |
| 2008/0288747 A1 | 11/2008 | Inglett et al. |
| 2008/0294937 A1 | 11/2008 | Ueda |
| 2008/0295114 A1 | 11/2008 | Argade et al. |
| 2008/0307258 A1 | 12/2008 | Challenger et al. |
| 2008/0307414 A1 | 12/2008 | Alpern et al. |
| 2008/0313345 A1 | 12/2008 | Bernardin et al. |
| 2008/0313364 A1 | 12/2008 | Flynn et al. |
| 2008/0320122 A1 | 12/2008 | Houlihan et al. |
| 2008/0320123 A1 | 12/2008 | Houlihan et al. |
| 2008/0320269 A1 | 12/2008 | Houlihan et al. |
| 2008/0320594 A1 | 12/2008 | Jiang |
| 2009/0006445 A1 | 1/2009 | Shemenzon et al. |
| 2009/0006621 A1 | 1/2009 | Ellis et al. |
| 2009/0006710 A1 | 1/2009 | Daniel et al. |
| 2009/0006888 A1 | 1/2009 | Bernhard et al. |
| 2009/0007063 A1 | 1/2009 | Szpak et al. |
| 2009/0007105 A1 | 1/2009 | Fries et al. |
| 2009/0007106 A1 | 1/2009 | Araujo, Jr. et al. |
| 2009/0007111 A1 | 1/2009 | Nelson et al. |
| 2009/0019262 A1 | 1/2009 | Tashiro et al. |
| 2009/0019538 A1 | 1/2009 | Pandya |
| 2009/0024851 A1 | 1/2009 | Andrade |
| 2009/0031307 A1 | 1/2009 | Chodroff et al. |
| 2009/0031309 A1 | 1/2009 | Lev |
| 2009/0031310 A1 | 1/2009 | Lev et al. |
| 2009/0036125 A1 | 2/2009 | Coppinger et al. |
| 2009/0037329 A1 | 2/2009 | Coppinger et al. |
| 2009/0037330 A1 | 2/2009 | Coppinger et al. |
| 2009/0037585 A1 | 2/2009 | Miloushev et al. |
| 2009/0037672 A1 | 2/2009 | Colbert et al. |
| 2009/0037680 A1 | 2/2009 | Colbert et al. |
| 2009/0042552 A1 | 2/2009 | Coppinger et al. |
| 2009/0043700 A1 | 2/2009 | Coppinger et al. |
| 2009/0044186 A1 | 2/2009 | Biro |
| 2009/0044265 A1 | 2/2009 | Ghosh et al. |
| 2009/0063665 A1 | 3/2009 | Bagepalli et al. |
| 2009/0064094 A1 | 3/2009 | Burka et al. |
| 2009/0064557 A1 | 3/2009 | Hughes et al. |
| 2009/0077329 A1 | 3/2009 | Wood et al. |
| 2009/0094603 A1 | 4/2009 | Hiltgen et al. |
| 2009/0094673 A1 | 4/2009 | Seguin et al. |
| 2009/0106256 A1 | 4/2009 | Safari et al. |
| 2009/0106424 A1 | 4/2009 | Safari et al. |
| 2009/0112616 A1 | 4/2009 | Jung et al. |
| 2009/0112617 A1 | 4/2009 | Jung et al. |
| 2009/0112620 A1 | 4/2009 | Jung et al. |
| 2009/0112621 A1 | 4/2009 | Jung et al. |
| 2009/0113109 A1 | 4/2009 | Nelson et al. |
| 2009/0113420 A1 | 4/2009 | Pawlowski |
| 2009/0113423 A1 | 4/2009 | Hiltgen et al. |
| 2009/0113528 A1 | 4/2009 | Ananda et al. |
| 2009/0118593 A1 | 5/2009 | Jung et al. |
| 2009/0119154 A1 | 5/2009 | Jung et al. |

(56) References Cited

U.S. PATENT DOCUMENTS

| | | |
|---|---|---|
| 2009/0119493 A1 | 5/2009 | Venkitachalam et al. |
| 2009/0119684 A1 | 5/2009 | Mahalingam et al. |
| 2009/0125904 A1 | 5/2009 | Nelson |
| 2009/0132275 A1 | 5/2009 | Jung et al. |
| 2009/0135215 A1 | 5/2009 | Silverbrook et al. |
| 2009/0135232 A1 | 5/2009 | Silverbrook et al. |
| 2009/0138945 A1 | 5/2009 | Savchuk |
| 2009/0150883 A1 | 6/2009 | Tripathi et al. |
| 2009/0150885 A1 | 6/2009 | Safari et al. |
| 2009/0157882 A1 | 6/2009 | Kashyap |
| 2009/0158260 A1 | 6/2009 | Moon et al. |
| 2009/0164031 A1 | 6/2009 | Johnson et al. |
| 2009/0164501 A1 | 6/2009 | de Moura et al. |
| 2009/0164848 A1 | 6/2009 | Heidasch et al. |
| 2009/0164981 A1 | 6/2009 | Heidasch et al. |
| 2009/0165139 A1 | 6/2009 | Yerazunis et al. |
| 2009/0182964 A1 | 7/2009 | Greiner et al. |
| 2009/0182966 A1 | 7/2009 | Greiner et al. |
| 2009/0182971 A1 | 7/2009 | Greiner et al. |
| 2009/0182972 A1 | 7/2009 | Greiner et al. |
| 2009/0182973 A1 | 7/2009 | Greiner et al. |
| 2009/0182974 A1 | 7/2009 | Greiner et al. |
| 2009/0182975 A1 | 7/2009 | Greiner et al. |
| 2009/0185014 A1 | 7/2009 | Silverbrook |
| 2009/0187724 A1 | 7/2009 | Greiner et al. |
| 2009/0187728 A1 | 7/2009 | Greiner et al. |
| 2009/0187732 A1 | 7/2009 | Greiner et al. |
| 2009/0193214 A1 | 7/2009 | Greiner et al. |
| 2009/0198762 A1 | 8/2009 | Arimilli et al. |
| 2009/0198949 A1 | 8/2009 | Kuligowski et al. |
| 2009/0204785 A1 | 8/2009 | Yates, Jr. et al. |
| 2009/0204964 A1 | 8/2009 | Foley et al. |
| 2009/0204966 A1 | 8/2009 | Johnson et al. |
| 2009/0207255 A1 | 8/2009 | Silverbrook |
| 2009/0208910 A1 | 8/2009 | Brueckner et al. |
| 2009/0210769 A1 | 8/2009 | Casper et al. |
| 2009/0213150 A1 | 8/2009 | Silverbrook |
| 2009/0216910 A1 | 8/2009 | Duchesneau |
| 2009/0216984 A1 | 8/2009 | Gainey, Jr. et al. |
| 2009/0217021 A1 | 8/2009 | Goodson et al. |
| 2009/0217050 A1 | 8/2009 | Amiel et al. |
| 2009/0222496 A1 | 9/2009 | Liu et al. |
| 2009/0222558 A1 | 9/2009 | Xu et al. |
| 2009/0228889 A1 | 9/2009 | Yoshida |
| 2009/0230686 A1 | 9/2009 | Catlin |
| 2009/0242636 A1 | 10/2009 | Silverbrook |
| 2009/0244215 A1 | 10/2009 | Silverbrook et al. |
| 2009/0244292 A1 | 10/2009 | Silverbrook et al. |
| 2009/0248611 A1 | 10/2009 | Xu et al. |
| 2009/0249049 A1 | 10/2009 | Weissman et al. |
| 2009/0249357 A1 | 10/2009 | Chanda et al. |
| 2009/0249488 A1 | 10/2009 | Robinson et al. |
| 2009/0251737 A1 | 10/2009 | Silverbrook |
| 2009/0257102 A1 | 10/2009 | Silverbrook |
| 2009/0259612 A1 | 10/2009 | Hanson |
| 2009/0262149 A1 | 10/2009 | Silverbrook |
| 2009/0262741 A1 | 10/2009 | Jungck et al. |
| 2009/0262929 A1 | 10/2009 | Walmsley |
| 2009/0278901 A1 | 11/2009 | Silverbrook |
| 2009/0282101 A1 | 11/2009 | Lim et al. |
| 2009/0282386 A1 | 11/2009 | Moir et al. |
| 2009/0284279 A1 | 11/2009 | Walmsley et al. |
| 2009/0288075 A1 | 11/2009 | Song et al. |
| 2009/0288084 A1 | 11/2009 | Astete et al. |
| 2009/0292858 A1 | 11/2009 | Lambeth et al. |
| 2009/0300528 A1 | 12/2009 | Stambaugh |
| 2009/0307528 A1 | 12/2009 | Byers et al. |
| 2009/0313620 A1 | 12/2009 | Sedukhin et al. |
| 2009/0316581 A1 | 12/2009 | Kashyap et al. |
| 2009/0319672 A1 | 12/2009 | Reisman |
| 2009/0319738 A1 | 12/2009 | Ben-Yehuda et al. |
| 2009/0320073 A1 | 12/2009 | Reisman |
| 2009/0327471 A1 | 12/2009 | Astete et al. |
| 2010/0005258 A1 | 1/2010 | Westenberg |
| 2010/0010968 A1 | 1/2010 | Redlich et al. |
| 2010/0011127 A1 | 1/2010 | Johnson et al. |
| 2010/0011238 A1 | 1/2010 | Nakamura et al. |
| 2010/0011243 A1 | 1/2010 | Locasto et al. |
| 2010/0011446 A1 | 1/2010 | Klucher et al. |
| 2010/0023308 A1 | 1/2010 | Willis et al. |
| 2010/0023703 A1 | 1/2010 | Christie et al. |
| 2010/0023704 A1 | 1/2010 | Christie et al. |
| 2010/0023706 A1 | 1/2010 | Christie et al. |
| 2010/0023707 A1 | 1/2010 | Hohmuth et al. |
| 2010/0030878 A1 | 2/2010 | Grabowski et al. |
| 2010/0031358 A1 | 2/2010 | Elovici et al. |
| 2010/0037096 A1 | 2/2010 | Bum et al. |
| 2010/0037206 A1 | 2/2010 | Larimore et al. |
| 2010/0037235 A1 | 2/2010 | Larimore et al. |
| 2010/0042846 A1 | 2/2010 | Trotter et al. |
| 2010/0047760 A1 | 2/2010 | Best et al. |
| 2010/0063613 A1 | 3/2010 | Popp |
| 2010/0070678 A1 | 3/2010 | Zhang et al. |
| 2010/0070935 A1 | 3/2010 | Bist et al. |
| 2010/0070940 A1 | 3/2010 | Bist et al. |
| 2010/0070978 A1 | 3/2010 | Chawla et al. |
| 2010/0071068 A1 | 3/2010 | Bauschert et al. |
| 2010/0076604 A1 | 3/2010 | Johnson et al. |
| 2010/0077160 A1 | 3/2010 | Liu et al. |
| 2010/0079600 A1 | 4/2010 | Silverbrook |
| 2010/0082922 A1 | 4/2010 | George et al. |
| 2010/0091116 A1 | 4/2010 | Silverbrook et al. |
| 2010/0094948 A1 | 4/2010 | Ganesh et al. |
| 2010/0095074 A1 | 4/2010 | Ganesh et al. |
| 2010/0095075 A1 | 4/2010 | Ganesh et al. |
| 2010/0095100 A1 | 4/2010 | Darrington et al. |
| 2010/0095152 A1 | 4/2010 | Darrington et al. |
| 2010/0103837 A1 | 4/2010 | Jungck et al. |
| 2010/0107113 A1 | 4/2010 | Innes et al. |
| 2010/0107158 A1 | 4/2010 | Chen et al. |
| 2010/0122052 A1 | 5/2010 | Waldspurger et al. |
| 2010/0122073 A1 | 5/2010 | Narayanaswamy et al. |
| 2010/0138830 A1 | 6/2010 | Astete et al. |
| 2010/0138841 A1 | 6/2010 | Dice et al. |
| 2010/0153662 A1 | 6/2010 | Vick et al. |
| 2010/0153674 A1 | 6/2010 | Park et al. |
| 2010/0153690 A1 | 6/2010 | Vick et al. |
| 2010/0153776 A1 | 6/2010 | Vick et al. |
| 2010/0154051 A1 | 6/2010 | Bauer |
| 2010/0161559 A1 | 6/2010 | Patil et al. |
| 2010/0161750 A1 | 6/2010 | Pandya |
| 2010/0162249 A1 | 6/2010 | Shpeisman et al. |
| 2010/0162250 A1 | 6/2010 | Adl-Tabatabai et al. |
| 2010/0169537 A1 | 7/2010 | Nelson |
| 2010/0169894 A1 | 7/2010 | Sheaffer et al. |
| 2010/0170951 A1 | 7/2010 | Silverbrook et al. |
| 2010/0174770 A1 | 7/2010 | Pandya |
| 2010/0174802 A1 | 7/2010 | Chan et al. |
| 2010/0180275 A1 | 7/2010 | Neogi et al. |
| 2010/0185590 A1 | 7/2010 | D'Angelo et al. |
| 2010/0192220 A1 | 7/2010 | Heizmann et al. |
| 2010/0211663 A1 | 8/2010 | Barboy et al. |
| 2010/0211681 A1 | 8/2010 | Chan et al. |
| 2010/0223499 A1 | 9/2010 | Panigrahy et al. |
| 2010/0223616 A1 | 9/2010 | De et al. |
| 2010/0235647 A1 | 9/2010 | Buer |
| 2010/0241673 A1 | 9/2010 | Wu et al. |
| 2010/0241726 A1 | 9/2010 | Wu |
| 2010/0241807 A1 | 9/2010 | Wu et al. |
| 2010/0251018 A1 | 9/2010 | Tamura |
| 2010/0251031 A1 | 9/2010 | Nieh et al. |
| 2010/0251363 A1 | 9/2010 | Todorovic |
| 2010/0268691 A1 | 10/2010 | Grinstein et al. |
| 2010/0274767 A1 | 10/2010 | Irisawa et al. |
| 2010/0274890 A1 | 10/2010 | Patel et al. |
| 2010/0280996 A1 | 11/2010 | Gross et al. |
| 2010/0281195 A1 | 11/2010 | Daniel et al. |
| 2010/0281239 A1* | 11/2010 | Sudhakar ............. G06F 9/3824 712/222 |
| 2010/0287280 A1 | 11/2010 | Sivan |
| 2010/0305720 A1 | 12/2010 | Doll et al. |
| 2010/0305721 A1 | 12/2010 | Kostadinov et al. |
| 2010/0306773 A1 | 12/2010 | Lee et al. |
| 2010/0315516 A1 | 12/2010 | Silverbrook et al. |

(56) References Cited

U.S. PATENT DOCUMENTS

| | | |
|---|---|---|
| 2010/0318991 A1 | 12/2010 | Venkitachalam et al. |
| 2010/0322071 A1 | 12/2010 | Avdanin et al. |
| 2010/0328064 A1 | 12/2010 | Rogel |
| 2010/0330953 A1 | 12/2010 | Rogel et al. |
| 2010/0330961 A1 | 12/2010 | Rogel |
| 2010/0332630 A1 | 12/2010 | Harlow |
| 2010/0332635 A1 | 12/2010 | Rogel et al. |
| 2010/0332889 A1 | 12/2010 | Shneorson et al. |
| 2010/0333088 A1 | 12/2010 | Rogel et al. |
| 2011/0004868 A1 | 1/2011 | Bharadwaj |
| 2011/0004935 A1 | 1/2011 | Moffie et al. |
| 2011/0010711 A1 | 1/2011 | Patwardhan |
| 2011/0016453 A1 | 1/2011 | Grechanik et al. |
| 2011/0019647 A1 | 1/2011 | Fujino |
| 2011/0023050 A1 | 1/2011 | Strom et al. |
| 2011/0029970 A1 | 2/2011 | Arasaratnam |
| 2011/0032830 A1 | 2/2011 | Merwe et al. |
| 2011/0035358 A1 | 2/2011 | Naik |
| 2011/0035513 A1 | 2/2011 | Jevans et al. |
| 2011/0035733 A1 | 2/2011 | Horning et al. |
| 2011/0041006 A1 | 2/2011 | Fowler |
| 2011/0047376 A1 | 2/2011 | Mittal |
| 2011/0047618 A1 | 2/2011 | Evans et al. |
| 2011/0061043 A1 | 3/2011 | Rydh et al. |
| 2011/0066786 A1 | 3/2011 | Colbert |
| 2011/0067014 A1 | 3/2011 | Song et al. |
| 2011/0072430 A1 | 3/2011 | Mani |
| 2011/0074850 A1 | 3/2011 | Walmsley et al. |
| 2011/0082996 A1 | 4/2011 | Wester et al. |
| 2011/0087779 A1 | 4/2011 | Martin et al. |
| 2011/0093700 A1 | 4/2011 | Mittal |
| 2011/0096930 A1 | 4/2011 | Walmsley |
| 2011/0113208 A1 | 5/2011 | Jouppi et al. |
| 2011/0122261 A1 | 5/2011 | Silverbrook |
| 2011/0125951 A1 | 5/2011 | Youngworth |
| 2011/0131183 A1 | 6/2011 | Chandhok et al. |
| 2011/0131402 A1 | 6/2011 | Mittal |
| 2011/0153992 A1 | 6/2011 | Srinivas et al. |
| 2011/0156914 A1 | 6/2011 | Sheharri et al. |
| 2011/0161730 A1 | 6/2011 | Van Der Merwe et al. |
| 2011/0161988 A1 | 6/2011 | Kashyap |
| 2011/0162076 A1 | 6/2011 | Song et al. |
| 2011/0167087 A1 | 7/2011 | Larson et al. |
| 2011/0167194 A1 | 7/2011 | Scales et al. |
| 2011/0167195 A1 | 7/2011 | Scales et al. |
| 2011/0167196 A1 | 7/2011 | Scales et al. |
| 2011/0167298 A1 | 7/2011 | Lee |
| 2011/0167416 A1 | 7/2011 | Sager et al. |
| 2011/0173441 A1 | 7/2011 | Bagepalli et al. |
| 2011/0173615 A1 | 7/2011 | Easton et al. |
| 2011/0173698 A1 | 7/2011 | Polyakov et al. |
| 2011/0178983 A1 | 7/2011 | Bernhard et al. |
| 2011/0179399 A1 | 7/2011 | Bekiroglu et al. |
| 2011/0184993 A1 | 7/2011 | Chawla et al. |
| 2011/0185053 A1 | 7/2011 | Larson et al. |
| 2011/0185169 A1 | 7/2011 | Munger et al. |
| 2011/0185292 A1 | 7/2011 | Chawla et al. |
| 2011/0185355 A1 | 7/2011 | Chawla et al. |
| 2011/0197022 A1 | 8/2011 | Green et al. |
| 2011/0197097 A1 | 8/2011 | Beaty et al. |
| 2011/0202927 A1 | 8/2011 | Miloushev et al. |
| 2011/0208908 A1 | 8/2011 | Chou et al. |
| 2011/0209151 A1 | 8/2011 | Chung et al. |
| 2011/0211080 A1 | 9/2011 | Silverbrook |
| 2011/0214050 A1 | 9/2011 | Stambaugh |
| 2011/0218966 A1 | 9/2011 | Barnes et al. |
| 2011/0218968 A1 | 9/2011 | Liu et al. |
| 2011/0219419 A1 | 9/2011 | Reisman |
| 2011/0225419 A1 | 9/2011 | Munger et al. |
| 2011/0231825 A1 | 9/2011 | Grechanik et al. |
| 2011/0238775 A1 | 9/2011 | Wu et al. |
| 2011/0251868 A1 | 10/2011 | Mikurak |
| 2011/0258625 A1 | 10/2011 | Waldspurger et al. |
| 2011/0258692 A1 | 10/2011 | Morrison et al. |
| 2011/0264729 A1 | 10/2011 | Kulgavin |
| 2011/0270998 A1 | 11/2011 | Larson et al. |
| 2011/0271136 A1 | 11/2011 | Abbot et al. |
| 2011/0276962 A1 | 11/2011 | Chambers et al. |
| 2011/0278355 A1 | 11/2011 | Silverbrook et al. |
| 2011/0280387 A1 | 11/2011 | Soo et al. |
| 2011/0283246 A1 | 11/2011 | Bist et al. |
| 2011/0283262 A1 | 11/2011 | Ceze et al. |
| 2011/0289345 A1 | 11/2011 | Agesen et al. |
| 2011/0289507 A1 | 11/2011 | Khan et al. |
| 2011/0296113 A1 | 12/2011 | Elnozahy |
| 2011/0296241 A1 | 12/2011 | Elnozahy |
| 2011/0296245 A1 | 12/2011 | Alberi et al. |
| 2011/0296440 A1 | 12/2011 | Laurich et al. |
| 2011/0307897 A1 | 12/2011 | Atterbury et al. |
| 2011/0310209 A1 | 12/2011 | Silverbrook |
| 2011/0320882 A1 | 12/2011 | Beaty et al. |
| 2012/0005461 A1 | 1/2012 | Moir et al. |
| 2012/0005672 A1 | 1/2012 | Cervantes et al. |
| 2012/0011341 A1 | 1/2012 | Greiner et al. |
| 2012/0011401 A1 | 1/2012 | Ranganathan et al. |
| 2012/0011504 A1 | 1/2012 | Ahmad et al. |
| 2012/0011508 A1 | 1/2012 | Ahmad |
| 2012/0013408 A1 | 1/2012 | Cortadella et al. |
| 2012/0017213 A1 | 1/2012 | Hunt et al. |
| 2012/0023209 A1 | 1/2012 | Fletcher et al. |
| 2012/0023313 A1 | 1/2012 | Tashiro et al. |
| 2012/0030653 A1 | 2/2012 | Porras et al. |
| 2012/0030659 A1 | 2/2012 | Porras et al. |
| 2012/0030661 A1 | 2/2012 | Porras et al. |
| 2012/0042034 A1 | 2/2012 | Goggin et al. |
| 2012/0042086 A1 | 2/2012 | Larson et al. |
| 2012/0054332 A1 | 3/2012 | Sahu et al. |
| 2012/0054345 A1 | 3/2012 | Sahu et al. |
| 2012/0054408 A1 | 3/2012 | Dong et al. |
| 2012/0054409 A1 | 3/2012 | Block et al. |
| 2012/0054412 A1 | 3/2012 | Gainey, Jr. et al. |
| 2012/0060165 A1 | 3/2012 | Clarke |
| 2012/0066676 A1 | 3/2012 | Dong et al. |
| 2012/0069131 A1 | 3/2012 | Abelow |
| 2012/0079368 A1 | 3/2012 | Abdelaziz et al. |
| 2012/0084393 A1 | 4/2012 | Williams et al. |
| 2012/0084520 A1 | 4/2012 | Chou et al. |
| 2012/0084782 A1 | 4/2012 | Chou et al. |
| 2012/0089410 A1 | 4/2012 | Mikurak |
| 2012/0089485 A1 | 4/2012 | Williams et al. |
| 2012/0089694 A1 | 4/2012 | Pandya |
| 2012/0089971 A1 | 4/2012 | Williams et al. |
| 2012/0096134 A1 | 4/2012 | Suit |
| 2012/0096158 A1 | 4/2012 | Astete et al. |
| 2012/0096282 A1 | 4/2012 | Henry et al. |
| 2012/0096541 A1 | 4/2012 | Larson et al. |
| 2012/0102204 A1 | 4/2012 | Larson et al. |
| 2012/0102206 A1 | 4/2012 | Larson et al. |
| 2012/0102369 A1 | 4/2012 | Hiltunen et al. |
| 2012/0110103 A1 | 5/2012 | Larson et al. |
| 2012/0110185 A1 | 5/2012 | Ganesan et al. |
| 2012/0110186 A1 | 5/2012 | Kapur et al. |
| 2012/0113293 A1 | 5/2012 | Silverbrook |
| 2012/0117237 A1 | 5/2012 | Larson et al. |
| 2012/0117382 A1 | 5/2012 | Larson et al. |
| 2012/0117610 A1 | 5/2012 | Pandya |
| 2012/0124285 A1 | 5/2012 | Soran et al. |
| 2012/0137106 A1 | 5/2012 | Greiner et al. |
| 2012/0137119 A1 | 5/2012 | Doerr et al. |
| 2012/0137286 A1 | 5/2012 | Schimpf et al. |
| 2012/0144005 A1 | 6/2012 | Quintard |
| 2012/0144153 A1 | 6/2012 | Greiner et al. |
| 2012/0144167 A1 | 6/2012 | Yates, Jr. et al. |
| 2012/0144232 A1 | 6/2012 | Griffith et al. |
| 2012/0144233 A1 | 6/2012 | Griffith et al. |
| 2012/0151225 A1 | 6/2012 | Huang et al. |
| 2012/0158610 A1 | 6/2012 | Botvinick et al. |
| 2012/0159101 A1 | 6/2012 | Miyoshi |
| 2012/0159462 A1 | 6/2012 | Leibman et al. |
| 2012/0159478 A1 | 6/2012 | Spradlin et al. |
| 2012/0164613 A1 | 6/2012 | Jung et al. |
| 2012/0166758 A1 | 6/2012 | Greiner et al. |
| 2012/0173732 A1 | 7/2012 | Sullivan |
| 2012/0174104 A1 | 7/2012 | Neogi et al. |

(56) References Cited

U.S. PATENT DOCUMENTS

| | | |
|---|---|---|
| 2012/0179446 A1 | 7/2012 | Tylutki |
| 2012/0185855 A1 | 7/2012 | Cervantes et al. |
| 2012/0191908 A1 | 7/2012 | North et al. |
| 2012/0191942 A1 | 7/2012 | Blandy et al. |
| 2012/0192142 A1 | 7/2012 | Schimpf et al. |
| 2012/0192207 A1 | 7/2012 | Kashyap |
| 2012/0204061 A1 | 8/2012 | Agesen et al. |
| 2012/0204266 A1 | 8/2012 | Yoo |
| 2012/0209822 A1 | 8/2012 | Prabhakar et al. |
| 2012/0210042 A1 | 8/2012 | Lim et al. |
| 2012/0216045 A1 | 8/2012 | Seguin et al. |
| 2012/0216198 A1 | 8/2012 | Easton et al. |
| 2012/0218901 A1 | 8/2012 | Jungck et al. |
| 2012/0221803 A1 | 8/2012 | Stabrawa et al. |
| 2012/0222042 A1 | 8/2012 | Chess et al. |
| 2012/0226699 A1 | 9/2012 | Lillibridge |
| 2012/0226795 A1 | 9/2012 | Larson et al. |
| 2012/0226870 A1 | 9/2012 | Elnozahy |
| 2012/0226939 A1 | 9/2012 | Elnozahy |
| 2012/0226947 A1 | 9/2012 | Alberi et al. |
| 2012/0227041 A1 | 9/2012 | Lambeth et al. |
| 2012/0232947 A1 | 9/2012 | McLachlan et al. |
| 2012/0233547 A1 | 9/2012 | McLachlan |
| 2012/0239624 A1 | 9/2012 | Barnes et al. |
| 2012/0239739 A1 | 9/2012 | Manglik et al. |
| 2012/0246513 A9 | 9/2012 | Bum et al. |
| 2012/0246638 A1 | 9/2012 | He et al. |
| 2012/0246727 A1 | 9/2012 | Elovici et al. |
| 2012/0254286 A1 | 10/2012 | Harlow |
| 2012/0254355 A1 | 10/2012 | Kihara |
| 2012/0254862 A1 | 10/2012 | Dong |
| 2012/0254888 A1 | 10/2012 | Kalogeropulos et al. |
| 2012/0259722 A1 | 10/2012 | Mikurak |
| 2012/0260123 A1 | 10/2012 | Madampath |
| 2012/0265959 A1 | 10/2012 | Le et al. |
| 2012/0266018 A1 | 10/2012 | Tanaka |
| 2012/0266132 A1 | 10/2012 | Coppinger et al. |
| 2012/0272240 A1 | 10/2012 | Starks et al. |
| 2012/0278278 A1 | 11/2012 | Wester et al. |
| 2012/0278573 A1 | 11/2012 | Colbert et al. |
| 2012/0278793 A1 | 11/2012 | Jalan et al. |
| 2012/0284477 A1 | 11/2012 | Gainey, Jr. et al. |
| 2012/0284699 A1 | 11/2012 | Van Der Merwe et al. |
| 2012/0284714 A1 | 11/2012 | Venkitachalam et al. |
| 2012/0284716 A1 | 11/2012 | Martins et al. |
| 2012/0290820 A1 | 11/2012 | Olson et al. |
| 2012/0290950 A1 | 11/2012 | Rapaport et al. |
| 2012/0297246 A1 | 11/2012 | Liu et al. |
| 2012/0310888 A1 | 12/2012 | Kuznetzov et al. |
| 2012/0311180 A1 | 12/2012 | Barkey et al. |
| 2012/0311580 A1 | 12/2012 | Emelianov et al. |
| 2012/0324378 A1 | 12/2012 | Stambaugh |
| 2012/0324417 A1 | 12/2012 | Somani et al. |
| 2012/0324447 A1 | 12/2012 | Huetter et al. |
| 2012/0324448 A1 | 12/2012 | Huetter et al. |
| 2012/0324449 A1 | 12/2012 | Huetter et al. |
| 2012/0324453 A1 | 12/2012 | Chandramouli et al. |
| 2012/0331444 A1 | 12/2012 | Szpak et al. |
| 2013/0007090 A1 | 1/2013 | Sankararaman |
| 2013/0007409 A1 | 1/2013 | Ganesh et al. |
| 2013/0007735 A1 | 1/2013 | Bookman et al. |
| 2013/0007744 A1 | 1/2013 | Arasaratnam |
| 2013/0010125 A1 | 1/2013 | Silverbrook |
| 2013/0010128 A1 | 1/2013 | Silverbrook |
| 2013/0010129 A1 | 1/2013 | Silverbrook |
| 2013/0010135 A1 | 1/2013 | Silverbrook |
| 2013/0010136 A1 | 1/2013 | Silverbrook |
| 2013/0010150 A1 | 1/2013 | Silverbrook |
| 2013/0010151 A1 | 1/2013 | Silverbrook |
| 2013/0010159 A1 | 1/2013 | Silverbrook |
| 2013/0010167 A1 | 1/2013 | Silverbrook |
| 2013/0013795 A1 | 1/2013 | Larson et al. |
| 2013/0013839 A1 | 1/2013 | Silverbrook |
| 2013/0013893 A1 | 1/2013 | Silverbrook |
| 2013/0013953 A1 | 1/2013 | Eck et al. |
| 2013/0014226 A1 | 1/2013 | Larson et al. |
| 2013/0014227 A1 | 1/2013 | Larson et al. |
| 2013/0014228 A1 | 1/2013 | Munger et al. |
| 2013/0014259 A1 | 1/2013 | Gribble et al. |
| 2013/0015239 A1 | 1/2013 | Silverbrook |
| 2013/0016232 A1 | 1/2013 | Silverbrook |
| 2013/0016233 A1 | 1/2013 | Silverbrook |
| 2013/0016235 A1 | 1/2013 | Silverbrook |
| 2013/0016236 A1 | 1/2013 | Silverbrook |
| 2013/0016247 A1 | 1/2013 | Silverbrook |
| 2013/0016248 A1 | 1/2013 | Silverbrook |
| 2013/0016266 A1 | 1/2013 | Silverbrook |
| 2013/0019091 A1 | 1/2013 | Munger et al. |
| 2013/0019243 A1 | 1/2013 | Schmidt et al. |
| 2013/0019280 A1 | 1/2013 | Larson et al. |
| 2013/0021443 A1 | 1/2013 | Silverbrook |
| 2013/0021444 A1 | 1/2013 | Silverbrook |
| 2013/0021482 A1 | 1/2013 | Silverbrook |
| 2013/0024645 A1 | 1/2013 | Cheriton et al. |
| 2013/0024660 A1 | 1/2013 | Silverbrook |
| 2013/0024855 A1 | 1/2013 | North |
| 2013/0024937 A1 | 1/2013 | Glew et al. |
| 2013/0024939 A1 | 1/2013 | Glew et al. |
| 2013/0024940 A1 | 1/2013 | Hutchins et al. |
| 2013/0031331 A1 | 1/2013 | Cheriton et al. |
| 2013/0036192 A1 | 2/2013 | Fausak |
| 2013/0036403 A1 | 2/2013 | Geist |
| 2013/0036451 A1 | 2/2013 | Fausak |
| 2013/0042150 A1 | 2/2013 | McNeeney |
| 2013/0042153 A1 | 2/2013 | McNeeney |
| 2013/0046598 A1 | 2/2013 | Roberts |
| 2013/0046722 A1 | 2/2013 | Hanson |
| 2013/0046948 A1 | 2/2013 | Vaghani et al. |
| 2013/0047154 A1 | 2/2013 | Mehta |
| 2013/0054807 A1 | 2/2013 | Sherwood et al. |
| 2013/0054820 A1 | 2/2013 | Reisman |
| 2013/0055009 A1 | 2/2013 | Patterson et al. |
| 2013/0055315 A1 | 2/2013 | Reisman |
| 2013/0060612 A1 | 3/2013 | Hurd |
| 2013/0060947 A1 | 3/2013 | Nelson |
| 2013/0060963 A1 | 3/2013 | Barkey et al. |
| 2013/0061264 A1 | 3/2013 | Reisman |
| 2013/0061273 A1 | 3/2013 | Reisman |
| 2013/0061322 A1 | 3/2013 | Sethumadhavan et al. |
| 2013/0063568 A1 | 3/2013 | Silverbrook |
| 2013/0064241 A1 | 3/2013 | Larson et al. |
| 2013/0067103 A1 | 3/2013 | Larson et al. |
| 2013/0067224 A1 | 3/2013 | Larson et al. |
| 2013/0067277 A1 | 3/2013 | Mummidi |
| 2013/0067526 A1 | 3/2013 | Reisman |
| 2013/0073072 A1 | 3/2013 | Popp |
| 2013/0073738 A1 | 3/2013 | Reisman |
| 2013/0073778 A1 | 3/2013 | Hunter et al. |
| 2013/0073823 A1 | 3/2013 | Hunter et al. |
| 2013/0073905 A1 | 3/2013 | Van Der Merwe et al. |
| 2013/0074065 A1 | 3/2013 | McNeeney et al. |
| 2013/0074129 A1 | 3/2013 | Reisman |
| 2013/0080732 A1 | 3/2013 | Nellans et al. |
| 2013/0081134 A1 | 3/2013 | Glew et al. |
| 2013/0086147 A1 | 4/2013 | Kashyap |
| 2013/0086347 A1 | 4/2013 | Liu et al. |
| 2013/0086367 A1 | 4/2013 | Gschwind et al. |
| 2013/0091275 A1 | 4/2013 | Safari et al. |
| 2013/0091335 A1 | 4/2013 | Mulcahy et al. |
| 2013/0097120 A1 | 4/2013 | Mummidi |
| 2013/0097369 A1 | 4/2013 | Talagala et al. |
| 2013/0097398 A1 | 4/2013 | Waldspurger et al. |
| 2013/0097706 A1 | 4/2013 | Titonis et al. |
| 2013/0103817 A1 | 4/2013 | Koponen et al. |
| 2013/0103818 A1 | 4/2013 | Koponen et al. |
| 2013/0104199 A1 | 4/2013 | Sprunk |
| 2013/0110490 A1 | 5/2013 | Letz et al. |
| 2013/0111018 A1 | 5/2013 | Ammons et al. |
| 2013/0111473 A1 | 5/2013 | Ammons et al. |
| 2013/0117337 A1 | 5/2013 | Dunham |
| 2013/0117359 A1 | 5/2013 | Husain et al. |
| 2013/0121154 A1 | 5/2013 | Guay et al. |
| 2013/0124479 A1 | 5/2013 | Namjoshi et al. |
| 2013/0137430 A1 | 5/2013 | Coppinger et al. |

(56) References Cited

U.S. PATENT DOCUMENTS

| | | |
|---|---|---|
| 2013/0138695 A1 | 5/2013 | Stanev |
| 2013/0139262 A1 | 5/2013 | Glew et al. |
| 2013/0145002 A1 | 6/2013 | Kannan et al. |
| 2013/0145008 A1 | 6/2013 | Kannan et al. |
| 2013/0151494 A1 | 6/2013 | Dhamankar et al. |
| 2013/0151846 A1 | 6/2013 | Baumann et al. |
| 2013/0151848 A1 | 6/2013 | Baumann et al. |
| 2013/0152199 A1 | 6/2013 | Capalik |
| 2013/0159649 A1 | 6/2013 | Sherwood et al. |
| 2013/0159712 A1 | 6/2013 | Sigworth et al. |
| 2013/0166716 A1 | 6/2013 | Safari et al. |
| 2013/0166886 A1 | 6/2013 | Sasanka et al. |
| 2013/0166951 A1 | 6/2013 | Burn et al. |
| 2013/0169830 A1 | 7/2013 | Silverbrook |
| 2013/0170334 A1 | 7/2013 | Koinuma et al. |
| 2013/0179289 A1 | 7/2013 | Calder et al. |
| 2013/0179371 A1 | 7/2013 | Jain et al. |
| 2013/0179574 A1 | 7/2013 | Calder et al. |
| 2013/0179673 A1 | 7/2013 | Innes et al. |
| 2013/0179729 A1 | 7/2013 | Chiu et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0185480 A1 | 7/2013 | Newell et al. |
| 2013/0185530 A1 | 7/2013 | Puttaswamy Naga et al. |
| 2013/0185667 A1 | 7/2013 | Harper et al. |
| 2013/0185716 A1 | 7/2013 | Yin et al. |
| 2013/0186953 A1 | 7/2013 | Silverbrook et al. |
| 2013/0198334 A1 | 8/2013 | Ikenaga et al. |
| 2013/0198459 A1 | 8/2013 | Joshi et al. |
| 2013/0198740 A1 | 8/2013 | Arroyo et al. |
| 2013/0198742 A1 | 8/2013 | Kumar et al. |
| 2013/0204917 A1 | 8/2013 | Wang et al. |
| 2013/0204990 A1 | 8/2013 | Skjolsvold et al. |
| 2013/0204991 A1 | 8/2013 | Skjolsvold et al. |
| 2013/0208623 A1 | 8/2013 | Koponen et al. |
| 2013/0211549 A1 | 8/2013 | Thakkar et al. |
| 2013/0212068 A1 | 8/2013 | Talius et al. |
| 2013/0212148 A1 | 8/2013 | Koponen et al. |
| 2013/0212162 A1 | 8/2013 | Somadder |
| 2013/0212205 A1 | 8/2013 | Flockhart et al. |
| 2013/0212235 A1 | 8/2013 | Fulton et al. |
| 2013/0212243 A1 | 8/2013 | Thakkar et al. |
| 2013/0212244 A1 | 8/2013 | Koponen et al. |
| 2013/0212245 A1 | 8/2013 | Koponen et al. |
| 2013/0212246 A1 | 8/2013 | Koponen et al. |
| 2013/0212321 A1 | 8/2013 | Talagala et al. |
| 2013/0212592 A1 | 8/2013 | Strom et al. |
| 2013/0218915 A1 | 8/2013 | Billau et al. |
| 2013/0219037 A1 | 8/2013 | Thakkar et al. |
| 2013/0219078 A1 | 8/2013 | Padmanabhan et al. |
| 2013/0219183 A1 | 8/2013 | Billau et al. |
| 2013/0219280 A1 | 8/2013 | Weinstein et al. |
| 2013/0227236 A1 | 8/2013 | Flynn et al. |
| 2013/0232343 A1 | 9/2013 | Horning et al. |
| 2013/0238559 A1 | 9/2013 | Bushman |
| 2013/0238690 A1 | 9/2013 | Kashyap |
| 2013/0246355 A1 | 9/2013 | Nelson et al. |
| 2013/0246511 A1 | 9/2013 | Brown et al. |
| 2013/0246843 A1 | 9/2013 | Havemose et al. |
| 2013/0247070 A1 | 9/2013 | Larimore et al. |
| 2013/0254369 A1 | 9/2013 | Rogel et al. |
| 2013/0254459 A1 | 9/2013 | Laplace et al. |
| 2013/0262587 A1 | 10/2013 | Munger et al. |
| 2013/0263132 A1 | 10/2013 | Colbert et al. |
| 2013/0263220 A1 | 10/2013 | Larson et al. |
| 2013/0263247 A1 | 10/2013 | Jungck et al. |
| 2013/0268357 A1 | 10/2013 | Heath |
| 2013/0268683 A1 | 10/2013 | Larson et al. |
| 2013/0268932 A1 | 10/2013 | Park et al. |
| 2013/0275391 A1 | 10/2013 | Batwara et al. |
| 2013/0275534 A1 | 10/2013 | Larson et al. |
| 2013/0275612 A1 | 10/2013 | Voss et al. |
| 2013/0275808 A1 | 10/2013 | McNeeney et al. |
| 2013/0275973 A1 | 10/2013 | Greenfield et al. |
| 2013/0276056 A1 | 10/2013 | Epstein |
| 2013/0282994 A1 | 10/2013 | Wires et al. |
| 2013/0290506 A1 | 10/2013 | Astete et al. |
| 2013/0290671 A1 | 10/2013 | Greiner et al. |
| 2013/0290781 A1 | 10/2013 | Chen et al. |
| 2013/0290782 A1 | 10/2013 | Chen et al. |
| 2013/0290960 A1 | 10/2013 | Astete et al. |
| 2013/0297854 A1 | 11/2013 | Gupta et al. |
| 2013/0297855 A1 | 11/2013 | Gupta et al. |
| 2013/0297894 A1 | 11/2013 | Cohen et al. |
| 2013/0298135 A1 | 11/2013 | Hiltunen et al. |
| 2013/0298251 A1 | 11/2013 | Mittal |
| 2013/0304742 A1 | 11/2013 | Roman et al. |
| 2013/0305023 A1 | 11/2013 | Gainey, Jr. et al. |
| 2013/0305242 A1 | 11/2013 | Wang et al. |
| 2013/0305246 A1 | 11/2013 | Goggin et al. |
| 2013/0305247 A1 | 11/2013 | Easton et al. |
| 2013/0306276 A1 | 11/2013 | Duchesneau |
| 2013/0311607 A1 | 11/2013 | Larson et al. |
| 2013/0311767 A1 | 11/2013 | Larson et al. |
| 2013/0311774 A1 | 11/2013 | Larson et al. |
| 2013/0311910 A1 | 11/2013 | Stambaugh |
| 2013/0311992 A1 | 11/2013 | Fuente et al. |
| 2013/0318341 A1 | 11/2013 | Bagepalli et al. |
| 2013/0318521 A1 | 11/2013 | Monaghan et al. |
| 2013/0322335 A1 | 12/2013 | Smith |
| 2013/0325450 A1 | 12/2013 | Levien et al. |
| 2013/0325451 A1 | 12/2013 | Levien et al. |
| 2013/0325452 A1 | 12/2013 | Levien et al. |
| 2013/0325453 A1 | 12/2013 | Levien et al. |
| 2013/0325704 A1 | 12/2013 | Gorman et al. |
| 2013/0325934 A1 | 12/2013 | Fausak et al. |
| 2013/0325998 A1 | 12/2013 | Hormuth et al. |
| 2013/0332610 A1 | 12/2013 | Beveridge |
| 2013/0332660 A1 | 12/2013 | Talagala et al. |
| 2013/0332686 A1 | 12/2013 | Ishizawa et al. |
| 2013/0332719 A1 | 12/2013 | Hormuth et al. |
| 2013/0339479 A1 | 12/2013 | Hormuth et al. |
| 2013/0339714 A1 | 12/2013 | Hormuth et al. |
| 2013/0345971 A1 | 12/2013 | Stamm et al. |
| 2013/0346988 A1 | 12/2013 | Bruno et al. |
| 2014/0006482 A1 | 1/2014 | Raghu et al. |
| 2014/0006580 A1 | 1/2014 | Raghu |
| 2014/0006581 A1 | 1/2014 | Raghu |
| 2014/0007089 A1 | 1/2014 | Bosch et al. |
| 2014/0007178 A1 | 1/2014 | Gillum et al. |
| 2014/0013059 A1 | 1/2014 | Joshi et al. |
| 2014/0013311 A1 | 1/2014 | Garrett et al. |
| 2014/0032767 A1 | 1/2014 | Nelson |
| 2014/0053269 A1 | 2/2014 | Ghosh et al. |
| 2014/0056577 A1 | 2/2014 | Ogawa et al. |
| 2014/0059333 A1 | 2/2014 | Dixon et al. |
| 2014/0059362 A1 | 2/2014 | Huang et al. |
| 2014/0082327 A1 | 3/2014 | Ghose |
| 2014/0082329 A1 | 3/2014 | Ghose |
| 2014/0095821 A1 | 4/2014 | Yang et al. |
| 2014/0108726 A1 | 4/2014 | Laurich et al. |
| 2014/0108786 A1 | 4/2014 | Kreft |
| 2014/0108864 A1 | 4/2014 | Madampath |
| 2014/0115596 A1 | 4/2014 | Khan et al. |
| 2014/0142904 A1 | 5/2014 | Drees et al. |
| 2014/0142905 A1 | 5/2014 | Drees et al. |
| 2014/0146055 A1 | 5/2014 | Bala et al. |
| 2014/0149492 A1 | 5/2014 | Ananthanarayanan et al. |
| 2014/0149494 A1 | 5/2014 | Markley et al. |
| 2014/0149591 A1 | 5/2014 | Bhattacharya et al. |
| 2014/0149983 A1 | 5/2014 | Bonilla et al. |
| 2014/0172728 A1 | 6/2014 | Lenkov et al. |
| 2014/0172944 A1 | 6/2014 | Newton et al. |
| 2014/0172951 A1 | 6/2014 | Varney et al. |
| 2014/0172952 A1 | 6/2014 | Varney et al. |
| 2014/0172956 A1 | 6/2014 | Varney et al. |
| 2014/0172970 A1 | 6/2014 | Newton et al. |
| 2014/0173023 A1 | 6/2014 | Varney et al. |
| 2014/0173029 A1 | 6/2014 | Varney et al. |
| 2014/0173030 A1 | 6/2014 | Varney et al. |
| 2014/0173038 A1 | 6/2014 | Newton et al. |
| 2014/0173039 A1 | 6/2014 | Newton et al. |
| 2014/0173040 A1 | 6/2014 | Newton et al. |

(56) References Cited

U.S. PATENT DOCUMENTS

| | | |
|---|---|---|
| 2014/0173041 A1 | 6/2014 | Newton et al. |
| 2014/0173042 A1 | 6/2014 | Newton et al. |
| 2014/0173043 A1 | 6/2014 | Varney et al. |
| 2014/0173044 A1 | 6/2014 | Varney et al. |
| 2014/0173045 A1 | 6/2014 | Crowder et al. |
| 2014/0173046 A1 | 6/2014 | Crowder et al. |
| 2014/0173047 A1 | 6/2014 | Crowder et al. |
| 2014/0173048 A1 | 6/2014 | Crowder et al. |
| 2014/0173052 A1 | 6/2014 | Newton et al. |
| 2014/0173053 A1 | 6/2014 | Varney et al. |
| 2014/0173054 A1 | 6/2014 | Varney et al. |
| 2014/0173061 A1 | 6/2014 | Lipstone et al. |
| 2014/0173062 A1 | 6/2014 | Lipstone et al. |
| 2014/0173064 A1 | 6/2014 | Newton et al. |
| 2014/0173066 A1 | 6/2014 | Newton et al. |
| 2014/0173067 A1 | 6/2014 | Newton et al. |
| 2014/0173077 A1 | 6/2014 | Newton et al. |
| 2014/0173079 A1 | 6/2014 | Newton et al. |
| 2014/0173087 A1 | 6/2014 | Varney et al. |
| 2014/0173088 A1 | 6/2014 | Varney et al. |
| 2014/0173091 A1 | 6/2014 | Lipstone et al. |
| 2014/0173097 A1 | 6/2014 | Newton et al. |
| 2014/0173115 A1 | 6/2014 | Varney et al. |
| 2014/0173131 A1 | 6/2014 | Newton et al. |
| 2014/0173132 A1 | 6/2014 | Varney et al. |
| 2014/0173135 A1 | 6/2014 | Varney et al. |
| 2014/0181833 A1 | 6/2014 | Bird et al. |
| 2014/0195480 A1 | 7/2014 | Talagala et al. |
| 2014/0195564 A1 | 7/2014 | Talagala et al. |
| 2014/0201503 A1 | 7/2014 | Tashiro et al. |
| 2014/0201757 A1 | 7/2014 | Bird et al. |
| 2014/0201838 A1 | 7/2014 | Varsanyi et al. |
| 2014/0207871 A1 | 7/2014 | Miloushev et al. |
| 2014/0208153 A1 | 7/2014 | Havemose |
| 2014/0222610 A1 | 8/2014 | Mikurak |
| 2014/0222946 A1 | 8/2014 | Lipstone et al. |
| 2014/0222977 A1 | 8/2014 | Varney et al. |
| 2014/0222984 A1 | 8/2014 | Varney et al. |
| 2014/0223002 A1 | 8/2014 | Varney et al. |
| 2014/0223003 A1 | 8/2014 | Varney et al. |
| 2014/0223015 A1 | 8/2014 | Varney et al. |
| 2014/0223016 A1 | 8/2014 | Varney et al. |
| 2014/0223017 A1 | 8/2014 | Lipstone et al. |
| 2014/0223018 A1 | 8/2014 | Varney et al. |
| 2014/0240322 A1 | 8/2014 | Brumer et al. |
| 2014/0245318 A1 | 8/2014 | Adams et al. |
| 2014/0279941 A1 | 9/2014 | Atkisson |
| 2014/0281131 A1 | 9/2014 | Joshi et al. |
| 2014/0304698 A1 | 10/2014 | Chigurapati et al. |
| 2014/0310473 A1 | 10/2014 | Bilas et al. |
| 2014/0310708 A1 | 10/2014 | Lim et al. |
| 2014/0310810 A1 | 10/2014 | Brueckner et al. |
| 2014/0325238 A1 | 10/2014 | Ghose |
| 2014/0325239 A1 | 10/2014 | Ghose |
| 2014/0325267 A1 | 10/2014 | Liu et al. |
| 2014/0331220 A1 | 11/2014 | Barrat et al. |
| 2014/0331228 A1 | 11/2014 | Barrat et al. |
| 2014/0337461 A1 | 11/2014 | Lipstone et al. |
| 2014/0337472 A1 | 11/2014 | Newton et al. |
| 2014/0344315 A1 | 11/2014 | Larimore et al. |
| 2014/0344391 A1 | 11/2014 | Varney et al. |
| 2014/0344399 A1 | 11/2014 | Lipstone et al. |
| 2014/0344400 A1 | 11/2014 | Varney et al. |
| 2014/0344401 A1 | 11/2014 | Varney et al. |
| 2014/0344413 A1 | 11/2014 | Lipstone et al. |
| 2014/0344425 A1 | 11/2014 | Varney et al. |
| 2014/0344452 A1 | 11/2014 | Lipstone et al. |
| 2014/0344453 A1 | 11/2014 | Varney et al. |
| 2014/0351516 A1 | 11/2014 | Larimore et al. |
| 2014/0372717 A1 | 12/2014 | Ciu et al. |
| 2014/0380039 A1 | 12/2014 | Larson et al. |
| 2014/0380405 A1 | 12/2014 | Forsberg et al. |
| 2014/0380425 A1 | 12/2014 | Lockett et al. |
| 2015/0012570 A1 | 1/2015 | Le et al. |
| 2015/0012776 A1 | 1/2015 | Banikazemi et al. |
| 2015/0019827 A1 | 1/2015 | Waldspurger et al. |
| 2015/0026451 A1 | 1/2015 | Doerr et al. |
| 2015/0052517 A1 | 2/2015 | Raghu et al. |
| 2015/0052521 A1 | 2/2015 | Raghu |
| 2015/0052523 A1 | 2/2015 | Raghu |
| 2015/0052524 A1 | 2/2015 | Raghu |
| 2015/0052525 A1 | 2/2015 | Raghu |
| 2015/0058298 A1 | 2/2015 | Earl et al. |
| 2015/0058933 A1 | 2/2015 | Larson et al. |
| 2015/0066844 A1 | 3/2015 | Yin et al. |
| 2015/0074058 A1 | 3/2015 | Zhao et al. |
| 2015/0074670 A1 | 3/2015 | Gerganov |
| 2015/0074743 A1 | 3/2015 | Ilieva et al. |
| 2015/0095648 A1 | 4/2015 | Nix |
| 2015/0113288 A1 | 4/2015 | Mittal |
| 2015/0113289 A1 | 4/2015 | Mittal |
| 2015/0121087 A1 | 4/2015 | Mittal |
| 2015/0121090 A1 | 4/2015 | Mittal |
| 2015/0128262 A1 | 5/2015 | Glew et al. |
| 2015/0149999 A1 | 5/2015 | Ramanathan et al. |
| 2015/0154423 A1 | 6/2015 | Mittal |
| 2015/0154424 A1 | 6/2015 | Mittal |
| 2015/0160964 A1 | 6/2015 | Nelson |
| 2015/0163088 A1 | 6/2015 | Anschutz |
| 2015/0163097 A1 | 6/2015 | Lipstone et al. |
| 2015/0178097 A1 | 6/2015 | Russinovich |
| 2015/0178114 A1 | 6/2015 | Chambers et al. |
| 2015/0180724 A1 | 6/2015 | Varney et al. |
| 2015/0180725 A1 | 6/2015 | Varney et al. |
| 2015/0180971 A1 | 6/2015 | Varney et al. |
| 2015/0207695 A1 | 7/2015 | Varney et al. |
| 2015/0222604 A1 | 8/2015 | Ylonen |
| 2015/0222706 A1 | 8/2015 | Pandya |
| 2015/0237022 A1 | 8/2015 | Larson et al. |
| 2015/0242626 A1 | 8/2015 | Wang et al. |
| 2015/0242648 A1 | 8/2015 | Lemmey et al. |
| 2015/0242972 A1 | 8/2015 | Lemmey et al. |
| 2015/0244680 A1 | 8/2015 | Larson et al. |
| 2015/0269617 A1 | 9/2015 | Mikurak |
| 2015/0278034 A1 | 10/2015 | Barnes et al. |
| 2015/0278126 A1 | 10/2015 | Maniatis et al. |
| 2015/0278491 A1 | 10/2015 | Horning et al. |
| 2015/0286821 A1 | 10/2015 | Ghose |
| 2015/0293791 A1 | 10/2015 | Adams et al. |
| 2015/0309883 A1 | 10/2015 | North |
| 2015/0310210 A1 | 10/2015 | Sia et al. |
| 2015/0317491 A1 | 11/2015 | Yang et al. |
| 2015/0331708 A1 | 11/2015 | Bala et al. |
| 2015/0331720 A1 | 11/2015 | Huetter et al. |
| 2015/0334130 A1 | 11/2015 | Brueckner et al. |
| 2015/0341319 A1 | 11/2015 | Larson et al. |
| 2015/0356207 A1 | 12/2015 | Reitman et al. |
| 2015/0363324 A1 | 12/2015 | Joshi et al. |
| 2015/0378766 A1 | 12/2015 | Beveridge et al. |
| 2015/0378771 A1 | 12/2015 | Tarasuk-Levin et al. |
| 2015/0378785 A1 | 12/2015 | Tarasuk-Levin et al. |
| 2015/0378831 A1 | 12/2015 | Tarasuk-Levin et al. |
| 2015/0378847 A1 | 12/2015 | Tarasuk-Levin et al. |
| 2015/0378940 A1 | 12/2015 | Bradbury et al. |
| 2015/0378942 A1 | 12/2015 | Bradbury et al. |
| 2015/0381589 A1 | 12/2015 | Tarasuk-Levin et al. |
| 2016/0004805 A1 | 1/2016 | Drees et al. |
| 2016/0004869 A1 | 1/2016 | Ismael et al. |
| 2016/0006756 A1 | 1/2016 | Ismael et al. |
| 2016/0012009 A1 | 1/2016 | Banikazemi et al. |
| 2016/0019107 A1 | 1/2016 | North |
| 2016/0021077 A1 | 1/2016 | Larson et al. |
| 2016/0036862 A1 | 2/2016 | Bagepalli et al. |
| 2016/0062789 A1 | 3/2016 | Hiltgen et al. |
| 2016/0077761 A1 | 3/2016 | Stabrawa et al. |
| 2016/0077857 A1 | 3/2016 | Dong et al. |
| 2016/0077966 A1 | 3/2016 | Stabrawa et al. |
| 2016/0077975 A1 | 3/2016 | Stabrawa et al. |
| 2016/0078342 A1 | 3/2016 | Tang |
| 2016/0078585 A1 | 3/2016 | Sheldon et al. |
| 2016/0092251 A1 | 3/2016 | Wagner |
| 2016/0110215 A1 | 4/2016 | Bonilla et al. |
| 2016/0110657 A1 | 4/2016 | Gibiansky et al. |
| 2016/0117501 A1 | 4/2016 | Ghose |

(56) References Cited

U.S. PATENT DOCUMENTS

| | | | |
|---|---|---|---|
| 2016/0119148 | A1 | 4/2016 | Ghose |
| 2016/0132333 | A1 | 5/2016 | Dixon et al. |
| 2016/0132334 | A1 | 5/2016 | Dixon et al. |
| 2016/0132335 | A1 | 5/2016 | Dixon et al. |
| 2016/0132336 | A1 | 5/2016 | Dixon et al. |
| 2016/0132337 | A1 | 5/2016 | Dixon et al. |
| 2016/0134584 | A1 | 5/2016 | Lang et al. |
| 2016/0140052 | A1 | 5/2016 | Waldspurger et al. |
| 2016/0147631 | A1 | 5/2016 | Magdon-Ismail et al. |
| 2016/0147649 | A1 | 5/2016 | Magdon-Ismail et al. |
| 2016/0147665 | A1 | 5/2016 | Magdon-Ismail et al. |
| 2016/0148403 | A1 | 5/2016 | Brumer et al. |
| 2016/0149950 | A1 | 5/2016 | Ashley et al. |
| 2016/0150003 | A1 | 5/2016 | Magdon-Ismail et al. |
| 2016/0154648 | A1 | 6/2016 | Dixon et al. |
| 2016/0170849 | A1 | 6/2016 | Cheng et al. |
| 2016/0179721 | A1 | 6/2016 | Neiger et al. |
| 2016/0188181 | A1 | 6/2016 | Smith |
| 2016/0191298 | A1 | 6/2016 | Markley et al. |
| 2016/0191332 | A1 | 6/2016 | Markley et al. |
| 2016/0196158 | A1 | 7/2016 | Nipane et al. |
| 2016/0196426 | A1 | 7/2016 | Hunt et al. |
| 2016/0210177 | A1 | 7/2016 | Dixon et al. |
| 2016/0217253 | A1 | 7/2016 | Newman et al. |
| 2016/0219115 | A1 | 7/2016 | Dong et al. |

OTHER PUBLICATIONS

S. T. King, G. W. Dunlap, and P. M. Chen. Debugging operating systems with time-traveling virtual machines. pp. 1-15, 2005.
S. W. Smith and J. D. Tygar, "Security and Privacy for Partial Order Time", ISCA Seventh International Conference on Parallel and Distributed Computing Systems, (1994), pp. 70-79.
S. Weingart. Physical security for the µABYSS system. In Proceedings of the IEEE Computer Society Conference on Security and Privacy, pp. 38-51, 1987.
S. White, S. Weingart, W Arnold, and E. Palmer. Introduction to the Citadel architecture: security in physically exposed environments. Technical Report RC16672, IBM Thomas J. Watson Research Center, Mar. 1991.
Sean W. Smith , Elaine R. Palmer , Steve Weingart, "Building a high-performance, programmable secure coprocessor", Computer Networks (1999).
Sean W. Smith, Vernon Austel, "Trusting Trusted Hardware: Towards a Formal Model for Programmable Secure Coprocessors" USENIX (1998).
Sean W. Smith et al., "Using a High Performance, Programmable Secure Coprocessor," 2nd International Conference on Financial Cryptography, Feb. 1998.
SETI@home. http://setiathome.ssl.berkeley.edu/, 2014.
slock. tools.suckless.org/slock, 2006-2013.
T. Garfinkel and M. Rosenblum. When virtual is harder than real: security challenges in virtual machine based computing environments. In Proceedings of the 10th conference on Hot Topics in Operating Systems, pp. 20-20, 2005.
T. Garfinkel, B. Pfaff, J. Chow, and M. Rosenblum. Data lifetime is a systems problem. In Proc. of ACM SIGOPS European workshop. ACM, 2004.
Tal Garfinkel , Mendel Rosenblum, "A Virtual Machine Introspection Based Architecture for Intrusion Detection" (2003), Proc. Network and Distributed Systems Security Symposium.
Tal Garfinkel and Ben Pfaff and Jim Chow and Mendel Rosenblum and Dan Boneh, "Terra: a virtual machine-based platform for trusted computing", ACM Press 2003, pp. 193-206.
TCPA. http://www.trustedcomputing.org/, 2014.
TPM Part 1 Design Principles Version 1.2 Revision 103, published Jul. 9, 2007.
TPM part 2 specification 1.2 Revision 103, published on Jul. 9, 2007.
TPM Part 3 Commands Version 1.2 Revision 116, published Feb. 2011.
U. Maheshwari, R. Vingralek, and W. Shapiro. How to build a trusted database system on untrusted storage. In Proceedings of the 4th USENIX Symposium on Operating Systems Design and Implementation, pp. 135-150, Oct. 2000.
Vivek Haldar, Deepak Chandra and Michael Franz, "Semantic Remote Attestation—A Virtual Machine directed approach to Trusted Computing", USENIX Virtual Machine Research and Technology Symposium, May 2004.
Vmware ace virtualization suite. www.vmware.com/products/ace, 2013.
VMware Inc. Vmware infrastructure. www.vmware.com/landing.sub.-pages/ discover.html, 2013.
VMware Inc. www.vmware.com, 2013.
VMware.Cloud computing.www.vmware.com/solutions/cloud-computing, Sep. 27, 2013.
William A. Arbaugh , David J. Farbert , Jonathan M. Smith, "A Secure and Reliable Bootstrap Architecture" (1997). Proceedings of the 1997 IEEE Symposium on Security and Privacy.
Xen. Xen cloud platform—advanced virtualization infrastructure for the clouds. www.xen.org/products/cloudxen.html, 2013.
Xfree86. www.xfree86.org/4.2.0/xwininfo.1.html, Aug. 12, 2016.
Xfree86. www.xfree86.org/current/xprop.1.html, Apr. 24, 2011.
A. Dinaburg, P. Royal, M. Sharif, and W. Lee. Ether: malware analysis via hardware virtualization extensions. In 15th ACM conference on Computer and communications security, pp. 51-62, 2008.
A. Joshi, S. T. King, G. W. Dunlap, and P. M. Chen. Detecting past and present intrusions through vulnerability-specific predicates. In Proceedings of the twentieth ACM symposium on Operating systems principles, pp. 91-104, 2005.
A. Kivity, Y. Kamay, D. Laor, U. Lublin, and A. Liguori. kvm: the linux virtual machine monitor. In Proc. of the Linux Symposium, pp. 225-230, Jun. 2007.
A. M. Nguyen, N. Schear, H. Jung, A. Godiyal, S. T. King, and H. D. Nguyen. Mavmm: Lightweight and purpose built vmm for malware analysis. In Annual Computer Security Applications Conference, pp. 441-450, 2009.
A. Seshadri, M. Luk, N. Qu, and A. Perrig. Secvisor: a tiny hypervisor to provide lifetime kernel code integrity for commodity oses. In Proceedings of Twenty-First ACM SIGOPS symposium on Operating Systems Principles, pp. 335-350, 2007.
Arora et al., Hardware-Assisted Run-Time Monitoring for Secure Program Execution on Embedded Processors, IEEE, 2006.
B. D. Payne, M. Carbone, M. Sharif, and W. Lee. Lares: An architecture for secure active monitoring using virtualization. In IEEE Symposium on Security and Privacy, pp. 233-247, 2008.
B. Gassend, D. Clarke, M. Van Dijk, and S. Devadas. Controlled physical random functions. In Proceedings of the 18th Annual Computer Security Applications Conference, Dec. 2002.
B. Yee. Using secure coprocessors. PhD thesis, Carnegie Mellon University, May 1994.
Bryan Parno Jonathan M. McCune Adrian Perrig, "Bootstrapping Trust in Commodity Computers", IEEE Symposium on Security and Privacy, May 2010.
Chen and Morris, "Certifying Program Execution with Secure Processors", Proceedings of the 9th conference on Hot Topics in Operating Systems, USENIX, vol. 9, pp. 133-138, 2003.
D.A. S. d. Oliveira and S. F. Wu. Protecting kernel code and data with a virtualization-aware collaborative operating system. In Annual Computer Security Applications Conference, pp. 451-460, 2009.
D. Lezcano. Linux containers. lxc.sourceforge.net/lxc.html, Feb. 27, 2010.
D. Lie, C. A. Thekkath, M. Mitchell, P. Lincoln, D. Boneh, J. C. Mitchell, and M. Horowitz. Architectural support for copy and tamper resistant software. In Proceedings of Conference on Architectural Support for Programming Languages and Operating Systems (ASPLOS), pp. 168-177, 2000.

(56) References Cited

OTHER PUBLICATIONS

D. Lie, "Architectural Support For Copy and Tamper Resistant Software," Dissertation, Department of Electrical Engineering and the Committee for Graduate Studies of Stanford University, Oct. 2003.
D. Nurmi, R. Wolski, C. Grzegorczyk, G. Obertelli, S. Soman, L. Youseff, and D. Zagorodnov. The eucalyptus open-source cloud-computing system. In Proceedings of the 9th IEEE/ACM International Symposium on Cluster Computing and the Grid, pp. 124-131, 2009.
D. P. Bovet and M. C. Ph. Understanding the Linux Kernel, Third Edition. O'Reilly Media, 3 edition, Nov. 2005.
Dan Williams and Emin Gun Sirer, "Optimal Parameter Selection for Efficient Memory Integrity Verification Using Merkle Hash trees", Proceedings. Third IEEE International Symposium on Network Computing and Applications, 2004. (NCA 2004).
Edward Suh, Dwaine Clarke, Blaise Gassend, Marten van Dijk, Srini Devadas, "AEGIS: Architecture for Tamper-Evident and Tamper-Resistant Processing", Submission to the Proceedings of the 17th International Conference on Supercomputing, Computation Structures Group Memo 461 2003).
Edward Suh, Dwaine Clarke, Blaise Gassend, Marten van Dijk, Srini Devadas, "AEGIS: Architecture for Tamper-Evident and Tamper-Resistant Processing", Submission to the Proceedings of the 17th International Conference on Supercomputing, Computation Structures Group Memo 474 2004).
Elaine Shi, Adrian Perrig , Leendert Van Doorn, "BIND: A Fine-grained Attestation Service for Secure Distributed Systems" (2005), IEEE Symposium on Security and Privacy.
G. Edward Suh and Dwaine Clarke and Blaise Gassend and Marten Van Dijk and Srinivas Devadas, "Efficient Memory Integrity Verification and Encryption for Secure Processors", Proceedings of the 36th Annual International Symposium on Microarchitecture (2003), pp. 339-350.
G. Edward Suh and Dwaine Clarke and Blaise Gassend and Marten van Dijk and Srinivas Devadas, "Hardware Mechanisms for Memory Integrity Checking" (2002).
G. W. Dunlap, S. T. King, S. Cinar, M. A. Basrai, and P. M. Chen. Revirt: Enabling intrusion analysis through virtual-machine logging and replay. In in Proceedings of the 2002 Symposium on Operating Systems Design and Implementation (OSDI), pp. 211-224, 2002.
Gang Xu and Cristian Borcea and Liviu Iftode, "Satem: Trusted service code execution across transactions", Proc. IEEE Int. Symp. Reliable Distributed Systems (2006).
Google Corp. Inter-process communication. dev.chromium.org/developers/ design-documents/inter-process-communication, Sep. 27, 2013.
Healey et al., Dynamic Tracking of Information Flow Signatures for Security Checking, University of Illinois—Center for Reliable and High-Performance Computing, 2007.
J. Chow, B. Pfaff, T. Garfinkel, and M. Rosenblum. Shredding your garbage: reducing data lifetime through secure deallocation. In Proceedings of the USENIX Security Symposium, pp. 22-22, 2005.
J. Chow, B. Pfaff, T. Garfinkel, K. Christopher, and M. Rosenblum. Understanding data lifetime via whole system simulation. In Proceedings of USENIX Security Symposium, pp. 22-22, 2004.
J. Corbet, A. Rubini, and G. Kroah-Hartman. Linux Device Drivers, 3rd Edition. O'Reilly Media, Inc., 2005.
Jonathan M. McCune and Bryan Parno and Adrian Perrig and Michael K. Reiter and Hiroshi Isozaki, "Flicker: An Execution Infrastructure for TCB Minimization", (2008).
Joseph Zambreno and Alok Choudhary, "SAFE-OPS: An approach to embedded software security", ACM Transactions on Embedded Computing Systems (TECS), vol. 4, Issue 1 (2005).
Joshua N. Edmison, "Hardware Architectures for Software Security", Ph.D Thesis, Virginia Polytechnic Institute and State University (2006).
K. Kourai and S. Chiba. Hyperspector: Virtual distributed monitoring environments for secure intrusion detection. In ACM/USENIX International Conference on Virtual Execution Environments, pp. 197-207, 2005.
M. Balduzzi, J. Zaddach, D. Balzarotti, E. Kirda, and S. Loureiro. A security analysis of amazon's elastic compute cloud service. In ACM Symposium on Applied Computing, pp. 1427-1434, 2012.
M. I. Gofman, R. Luo, P. Yang, and K. Gopalan. SPARC: A security and privacy aware virtual machine checkpointing mechanism. In Proceedings of the 10th annual ACM Workshop on Privacy in the Electronic Society (WPES), in conjunction with the ACM Conference on Computer and Communications Security (CCS), pp. 115-124, 2011.
Marten Van Dijk and Luis F. G. Sarmenta and Charles W. O'donnell and Srinivas Devadas, "Proof of Freshness: Flow to efficiently use on online single secure clock to secure shared untrusted memory", (2006).
Marten Van Dijk and Luis F. G. Sarmenta and Jonathan Rhodes and Srinivas Devadas, "Securing Shared Untrusted Storage by using TPM 1.2 Without Requiring a Trusted OS", (2007).
Michael E. Locasto and Stelios Sidiroglou and Angelos D. Keromytis, "Speculative Virtual Verification: PolicyConstrained Speculative Execution", Proceedings of the 14th New Security Paradigms Workshop (NSPW 2005), pp. 1-19.
Michael E. Locasto, "Micro-speculation, Micro-sandboxing, and Self-Correcting Assertions: Support for Self-Healing Software and Application Communities", PhD Thesis Proposal, Department of Computer Science, Columbia University, Dec. 5, 2005.
Microsoft Corp. Hyper-v server 2012 r2.www.microsoft.com/hyper-v-server/ en/us/overview.aspx, 2013.
N. Santos, K. P. Gummadi, and R. Rodrigues. Towards trusted cloud computing. In HOTCLOUD, 2009.
Nick L. Petroni and Jr. Timothy and Fraser Aaron and Walters William and A. Arbaugh, "An architecture for specification-based detection of semantic integrity violations in kernel dynamic data", Proceedings of the USENIX Security Symposium (2006), pp. 289-304.
Nick L. Petroni and Jr. Timothy and Fraser Jesus and Molina William and A. Arbaugh, "Copilot—a coprocessor-based kernel runtime integrity monitor", Proceedings of the 13th USENIX Security Symposium, 2004, pp. 179-194.
Oh et al., Control-Flow Checking by Software Signatures, IEEE, 2002.
OpenVZ. Container-based Virtualization for Linux, www.openvz.com, 2013.
Oracle Corp. Virtualbox. www.VirtualBox.org, Sep. 27, 2013.
R. Riley, X. Jiang, and D. Xu. Guest-transparent prevention of kernel rootkits with vmm-based memory shadowing. In the 11th international symposium on Recent Advances in Intrusion Detection, pp. 1-20, 2008.

\* cited by examiner

SYSTEM AND METHOD FOR VALIDATING PROGRAM EXECUTION AT RUN-TIME

CROSS REFERENCE TO RELATED APPLICATIONS

The present application is a Continuation of U.S. patent application Ser. No. 14/330,441, filed Jul. 14, 2014, issued Dec. 29, 2015 as U.S. Pat. No. 9,223,967, which is a Continuation of U.S. patent application Ser. No. 13/183,857, filed Jul. 15, 2011, issued Jul. 15, 2014 as U.S. Pat. No. 8,782,434, which is a non-provisional application of, and claims benefit of priority from, U.S. Provisional Patent Application Ser. No. 61/364,795, filed Jul. 15, 2010, the entirety of which are expressly incorporated herein by reference in their entirety.

FIELD OF THE INVENTION

The present invention relates to systems and methods for secure computing.

BACKGROUND OF THE INVENTION

Current computer systems are highly vulnerable to cyber attack. The number of attacks and the financial losses due to those attacks have risen exponentially. Despite significant investments, the situation continues to worsen; novel attacks appear with high frequency and employ increasingly sophisticated techniques. There are very few fundamental sources of the vulnerabilities exploited by cyber attackers. These attacks stem from the fact that current computer systems cannot enforce the intended semantics of their computations. In particular, they fail to systematically enforce: Memory safety, Type safety, The distinction between code and data, and Constraints on information flow and access. These properties are not systematically enforced today because they are not: Systematically captured during the design process; Formally analyzed or verified during design and implementation; Captured or enforced by common system programming languages (e.g., the C programming language); and Represented explicitly within the runtime environment of the system and therefore cannot be enforced dynamically by either hardware or software techniques.

DARPA (DARPA-BAA-10-70, Jun. 1, 2010) has therefore initiated the Clean-Slate Design of Resilient, Adaptive, Secure Hosts (CRASH) program. This program seeks designs for computing systems which are highly resistant to cyber-attack; can adapt after a successful attack in order to continue rendering useful services; can learn from previous attacks how to guard against and cope with future attacks; and can repair themselves after attacks have succeeded.

Current system software is large and complex. Hardware architectures provide mechanisms to protect the kernel from user code, but at the same time grant to the kernel unlimited privileges (at best, a few levels of increased privilege). Consequently, a single penetration into the kernel gives the attacker unlimited access. Since the cost of switching into kernel mode is high, there is a tendency for system programmers to move increasing amounts of functionality into the kernel, making it even less trustworthy and exposing an even larger attack surface. Likewise, programming flaws can result in unintended access to kernel or increased privilege level system access.

Current computer systems are not resilient to attacks. They lack the means to recover from attacks either by finding alternative methods for achieving their goals or by repairing the resources corrupted by the attack. They also typically lack the ability to diagnose the underlying problem and to fix the vulnerabilities that enabled the attack. Once a machine is corrupted, manual repairs by specialized personnel are required while the forensic information necessary to affect the repair is typically lacking. Finally, today's computer systems are nearly identical to one another, do not change appreciably over time, and share common vulnerabilities. A single network-based attack can therefore spread rapidly and affect a very large number of computers.

"Trusted Platform Module" is the name of a published specification detailing a secure cryptoprocessor that can store cryptographic keys that protect information, as well as the general name of implementations of that specification, often called the "TPM chip". The TPM specification is the work of the Trusted Computing Group. The current version of the TPM specification is 1.2 Revision 103, published on Jul. 9, 2007.

The Trusted Platform Module offers facilities for the secure generation of cryptographic keys, and limitation of their use, in addition to a hardware pseudo-random number generator. It also includes capabilities such as remote attestation and sealed storage. "Remote attestation" creates a nearly unforgeable hash key summary of the hardware and software configuration. The extent of the summary of the software is decided by the program encrypting the data. This allows a third party to verify that the software has not been changed. "Binding" encrypts data using the TPM endorsement key, a unique RSA key burned into the chip during its production, or another trusted key descended from it. [3] "Sealing" encrypts data similar to binding, but in addition specifies a state in which the TPM must be in order for the data to be decrypted (unsealed).

A Trusted Platform Module can be used to authenticate hardware devices. Since each TPM chip has a unique and secret RSA key burned in as it is produced, it is capable of performing platform authentication. For example, it can be used to verify that a system seeking access is the expected system.

The Trusted Platform Module is typically part of the supporting chipset for a processor system, and thus its use typically delays execution of instructions by the processor until verification is completed. Likewise, verification occurs with respect to instructions before they are cached by the processor. Thus, while the TMP provides secure data processing, it does not address insecurities in moving instructions to the processor, and is susceptible to instruction injection type attaches, and likewise introduces significant latencies.

Generally, pushing the security down to the hardware level in conjunction with software provides more protection than a software-only solution that is more easily compromised by an attacker. However even where a TPM is used, a key is still vulnerable while a software application that has obtained it from the TPM is using it to perform encryption/decryption operations, as has been illustrated in the case of a cold boot attack.

The "Cerium" technology (Chen and Morris, "Certifying Program Execution with Secure Processors", Proceedings of the 9th conference on Hot Topics in Operating Systems, USENIX, Volume 9, Pages: 133-138, 2003), expressly incorporated herein by reference, proposes a secure processor technology which validates cache line signature before commencement of processing. It provides a separate security co-processor, which is not integrated into main processing pipeline. Cerium computes signatures of the system software as it boots up, and uses these signatures to enforce copy protection. The software at each stage self checks its integrity against a reference signature stored in the co-processor's non-volatile memory. Each stage also authenticates the software for the next stage. Cerium assumes the existence and use of a cache where operating system and trusted code can be kept. See, also, Cliff Wang, *Malware Detection*, Advances in information security, Mihai Christodorescu, Somesh Jha, Douglas Maughan, Dawn Song, Cliff Wang, Editors, Springer, 2006.

Boneh et al., "Hardware Support for Tamper-Resistant and Copy-Resistant Software", Technical Report: CS-TN-00-97, (Stanford University, 2000), expressly incorporated herein by reference, provides a description of a hardware prototype which supports software-only taper resistant computing, with an atomic decrypt-and-execute operation.

U.S. Pat. No. 7,730,312, expressly incorporated herein by reference, provides a tamper resistant module certification authority. Software applications may be securely loaded onto a tamper resistant module (TRM) and securely deleted from the TRM. A method for determining, based at least upon an encrypted personalization data block, whether a TRM is part of a qualified set of TRM's to accept loading of an application is also provided. Thereafter, the method provides for loading the application onto the TRM only after the first step determines that the TRM is qualified to accept the loading of the application. A method is also provided for determining, based at least upon an encrypted personalization data block, whether a TRM is part of a qualified set of TRM's to accept deleting of an application. Thereafter, the method provides for deleting the application from the TRM only when the first step determines that the TRM is qualified to accept the deleting of the application.

U.S. Pat. No. 7,590,869, expressly incorporated herein by reference, provides an on-chip multicore type tamper resistant microprocessor, which has a feature that, on the microprocessor package which has a plurality of instruction execution cores on an identical package and an ciphering processing function that can use a plurality of ciphering keys in correspondence to programs under a multi-task program execution environment, a key table for storing ciphering keys and the ciphering processing function are concentrated on a single location on the package, such that it is possible to provide a tamper resistant microprocessor in the multiprocessor configuration that can realize the improved processing performance by hardware of a given size compared with the case of providing the key table and the ciphering processing function distributedly.

U.S. Pat. No. 7,739,517, expressly incorporated herein by reference, provides a secure hardware device which compares code image with a known good code image, using a co-processor separate from the processor, which halts execution of code until it is verified. Reference code or its signature is stored in secure, separate storage, but is not itself encrypted. The separate co-processor is not integrated into main processing pipeline to avoid significant delays.

U.S. Pat. No. 7,734,921, expressly incorporated herein by reference, provides a system and method for guaranteeing software integrity via combined hardware and software authentication. The system enables individual user devices to authenticate and validate a digital message sent by a distribution center, without requiring transmissions to the distribution center. The center transmits the message with an appended modulus that is the product of two specially selected primes. The transmission also includes an appended authentication value that is based on an original message hash value, a new message hash value, and the modulus. The new message hash value is designed to be the center's public RSA key; a corresponding private RSA key is also computed. Individual user devices combine a digital signet, a public modulus, preferably unique hardware-based numbers, and an original message hash to compute a unique integrity value K. Subsequent messages are similarly processed to determine new integrity values K', which equal K if and only if new messages originated from the center and have not been corrupted.

U.S. Pat. No. 7,725,703, expressly incorporated herein by reference, provides Systems and methods for securely booting a computer with a trusted processing module (TPM). In a computer with a TPM, an expected hash value of a boot component may be placed into a platform configuration register (PCR), which allows a TPM to unseal a secret. The secret may then be used to decrypt the boot component. The hash of the decrypted boot component may then be calculated and the result can be placed in a PCR. The PCRs may then be compared. If they do not, access to the an important secret for system operation can be revoked. Also, a first secret may be accessible only when a first plurality of PCR values are extant, while a second secret is accessible only after one or more of the first plurality of PCR values has been replaced with a new value, thereby necessarily revoking further access to the first secret in order to grant access to the second secret.

U.S. Pat. No. 7,694,139, expressly incorporated herein by reference, provides a TPM for securing executable content. A software development system (SDS) executes on a computer having a TPM, and digitally signs software. The platform includes protected areas that store data and cannot be accessed by unauthorized modules. A code signing module executing in a protected area obtains a private/public key pair and a corresponding digital certificate. The SDS is configured to automatically and transparently utilize the code signing module to sign software produced by the system. End-user systems receive the certificate with the software and can use it to verify the signature. This verification will fail if a parasitic virus or other malicious code has altered the software.

U.S. Pat. No. 7,603,707, expressly incorporated herein by reference, provides a Tamper-aware virtual TPM, in which respective threads comprising a virtual TPM thread and a security-patrol threads are executed on a host processor. The host processor may be a multi-threaded processor having multiple logical processors, and the respective threads are executed on different logical processors. While the virtual TPM thread is used to perform various TPM functions, the security-patrol thread monitors for physical attacks on the processor by implementing various numerical calculation loops, wherein an erroneous calculation is indicative of a physical attack. In response to detection of such an attack, various actions can be taken in view of one or more predefined security policies, such as logging the event, shutting down the platform and/or informing a remote management entity.

U.S. Pat. No. 7,571,312, expressly incorporated herein by reference, provides methods and apparatus for generating endorsement credentials for software-based security coprocessors. A virtual manufacturer authority is launched in a protected portion of a processing system. A key for the virtual manufacturer authority is created. The key is protected by a security coprocessor of the processing system, such as a TPM. Also, the key is bound to a current state of the virtual manufacturer authority. A virtual security coprocessor is created in the processing system. A delegation request is transmitted from the processing system to an external processing system, such as a certificate authority (CA). After transmission of the delegation request, the key is used to attest to trustworthiness of the virtual security coprocessor.

U.S. Pat. No. 7,490,352, expressly incorporated herein by reference, provides systems and methods for verifying trust or integrity of executable files. The system determines that an executable file is being introduced into a path of execution, and then automatically evaluates it in view of multiple malware checks to detect if the executable file represents a type of malware. The multiple malware checks are integrated into an operating system trust verification process along the path of execution.

U.S. Pat. No. 7,490,250, expressly incorporated herein by reference, provides a system and method for detecting a tamper event in a trusted computing environment. The computer system has an embedded security system (ESS), a trusted operating system. A tamper signal is received and locked in the ESS. The trusted operating system is capable of detecting the tamper signal in the ESS.

U.S. Pat. No. 7,444,601, expressly incorporated herein by reference, provides a trusted computing platform, in which a trusted hardware device is added to the motherboard, and is configured to acquire an integrity metric, for example a hash of the BIOS memory of the computing platform. The trusted hardware device is tamper-resistant, difficult to forge and inaccessible to other functions of the platform. The hash can be used to convince users that that the operation of the platform (hardware or software) has not been subverted in some way, and is safe to interact with in local or remote applications. The main processing unit of the computing platform is directed to address the trusted hardware device, in advance of the BIOS memory, after release from 'reset'. The trusted hardware device is configured to receive memory read signals from the main processing unit and, in response, return instructions, in the native language of the main processing unit, that instruct the main processing unit to establish the hash and return the value to be stored by the trusted hardware device. Since the hash is calculated in advance of any other system operations, this is a relatively strong method of verifying the integrity of the system. Once the hash has been returned, the final instruction calls the BIOS program and the system boot procedure continues as normal. Whenever a user wishes to interact with the computing platform, he first requests the integrity metric, which he compares with an authentic integrity metric that was measured by a trusted party. If the metrics are the same, the platform is verified and interactions can continue. Otherwise, interaction halts on the basis that the operation of the platform may have been subverted.

U.S. Pat. No. 6,938,164, expressly incorporated herein by reference, provides a system and method for allowing code to be securely initialized in a computer. A memory controller prevents CPUs and other I/O bus masters from accessing memory during a code (for example, trusted core) initialization process. The memory controller resets CPUs in the computer and allows a CPU to begin accessing memory at a particular location (identified to the CPU by the memory controller). Once an initialization process has been executed by that CPU, the code is operational and any other CPUs are allowed to access memory (after being reset), as are any other bus masters (subject to any controls imposed by the initiated code).

U.S. Pat. No. 6,070,239, expressly incorporated herein by reference, provides a system and method for executing verifiable programs with facility for using non-verifiable programs from trusted sources. The system has a class loader that prohibits the loading and execution of non-verifiable programs unless (A) the non-verifiable program resides in a trusted repository of such programs, or (B) the non-verifiable program is indirectly verifiable by way of a digital signature on the non-verifiable program that proves the program was produced by a trusted source. Verifiable architecture neutral programs are Java bytecode programs whose integrity is verified using a Java bytecode program verifier. The non-verifiable programs are generally architecture specific compiled programs generated with the assistance of a compiler. Each architecture specific program typically includes two signatures, including one by the compiling party and one by the compiler. Each digital signature includes a signing party identifier and an encrypted message. The encrypted message includes a message generated by a predefined procedure, and is encrypted using a private encryption key associated with the signing party. A digital signature verifier used by the class loader includes logic for processing each digital signature by obtaining a public key associated with the signing party, decrypting the encrypted message of the digital signature with that public key so as generate a decrypted message, generating a test message by executing the predefined procedure on the architecture specific program associated with the digital signature, comparing the test message with the decrypted message, and issuing a failure signal if the decrypted message digest and test message digest do not match.

U.S. Pat. No. 5,944,821, expressly incorporated herein by reference, provides a secure software registration and integrity assessment in a computer system. The method provides secure registration and integrity assessment of software in a computer system. A secure hash table is created containing a list of secure programs that the user wants to validate prior to execution. The table contains a secure hash value (i.e., a value generated by modification detection code) for each of these programs as originally installed on the computer system. This hash table is stored in protected memory that can only be accessed when the computer system is in system management mode. Following an attempt to execute a secured program, a system management interrupt is generated. An SMI handler then generates a current hash value for the program to be executed. In the event that the current hash value matches the stored hash value, the integrity of the program is guaranteed and it is loaded into memory and executed. If the two values do not match, the user is alerted to the discrepancy and may be given the option to update or override the stored hash value by entering an administrative password.

U.S. 2008/0215920, expressly incorporated herein by reference, provides a processor which generates a signature value indicating a sequence of executed instructions, and the signature value is compared to signature values calculated for two or more possible sequences of executed instructions to determine which instruction sequence was executed. The signature is generated via a signature generator during program execution, and is provided external to the processor via a signature message. There is, in this system, no encryption of a stored signature, nor use of a secret key. The trace message storage unit is operable to store instruction pointer trace messages and executed instruction signature messages. The trace message storage unit is also operable to store messages in at least one of an on-chip or an off-chip trace memory. The executed instruction signature unit is operable to generate a cache line content signature. The signature may be generated via a signature generator during program execution, and provided external to the processor via a signature message such as by using a trace memory or buffer and a tool scan port.

FIG. 1 (of U.S. Patent Application 2008/0215920) (prior art) is a block diagram of a computer system, as may be used to practice various embodiments of the invention. A computer system 100 is in some embodiments a general-purpose computer, such as the personal computer that has become a common tool in business and in homes. In other embodiments, the computer 100 is a special purpose computer system, such as an industrial process control computer, a car computer, a communication device, or a home entertainment device. The computer comprises a processor 101, which is operable to execute software instructions to perform various functions. The memory 102 and processor 101 in further embodiments include a smaller, faster cache memory which is used to store data that is recently used, or that is believed likely to be used in the near future. The software instructions and other data are stored in a memory 102 when the computer is in operation, and the memory is coupled to the processor by a bus 103. When the computer starts, data stored in nonvolatile storage such as a hard disk drive 104 or in other nonvolatile storage such as flash memory is loaded into the memory 102 for the processor's use.

In many general purpose computers, an operating system is loaded from the hard disk drive 104 into memory and is executed in the processor when the computer first starts, providing a computer user with an interface to the computer so that other programs can be run and other tasks performed. The operating system and other executing software are typically stored in nonvolatile storage when the computer is turned off, but are loaded into memory before the program instructions can be executed. Because memory 102 is significantly more expensive than most practical forms of nonvolatile storage, the hard disk drive or other nonvolatile storage in a computerized system often stores much more program data than can be loaded into the memory 102 at any given time. The result is that only some of the program data stored in nonvolatile memory for an executing program, operating system, or for other programs stored in nonvolatile memory can be loaded into memory at any one time. This often results in swapping pieces of program code into and out of memory 102 from the nonvolatile storage 104 during program execution, to make efficient use of the limited memory that is available.

Many modern computer systems use methods such as virtual memory addresses that are mapped to physical memory addresses and paged memory to manage the limited available physical memory 102. Virtual memory allows use of a larger number of memory address locations than are actually available in a physical memory 102, and relies on a memory management method to map virtual addresses to physical memory addresses as well as to ensure that the needed data is loaded into the physical memory. Needed data is swapped into and out of physical memory as needed by loading memory in pages, which are simply large segments of addressable memory that are moved together as a group. Memory management units within the processor or chipset architecture can also change the contents of memory or cache during program execution, such as where new data is needed in memory or is predicted to be needed and the memory or cache is already full.

An executing program may complete execution of all the needed program instructions in a particular page loaded into memory, and proceed to execute more instructions stored in another page. In a typical example, the previously executing page is swapped out of memory and the page containing the newly needed program code is loaded into memory in its place, enabling the processor to continue to execute program instructions from memory. This not only complicates memory management, but complicates debugging executing software as the program code stored in any particular physical memory location might be from any number of different pages with different virtual addresses. Further, program code loaded into memory need not be stored in the same physical memory location every time, and the actual physical address into which a program instruction is stored is not necessarily unique.

When tracing a program, the instruction flow is typically recorded according to the virtual addresses of the executed instructions. An example computer system block diagram is shown in FIG. 2 (of U.S. Patent Application 2008/0215920) (prior art), as may be used to practice some embodiments of the invention. Program code and other data is stored in storage 201, and are not directly associated with specific locations in system memory. The program code is loaded as needed by dynamic memory controller 202, which in various embodiments is an operating system task, a hardware memory controller, or another memory controller. Instructions are loaded as needed into instruction memory 203, which is in various embodiments any volatile or nonvolatile memory that is directly addressable by the processor. The instructions are provided to the processor for execution as shown at 204, and an instruction pointer referencing the currently executed program opcode is incremented at 205. If a branch or jump instruction is executed, the instruction pointer is not simply incremented but is changed to reflect the address of the branch or jump destination instruction. The instruction pointer address data is used to fetch the next instruction from memory as shown at 206, using physical or virtual addressing in various embodiments.

When using physical addresses, the memory management unit 207 need not be present, and the physical address referenced in the instruction pointer can be directly used to retrieve the next instruction from memory. When using virtual addressing, the MMU shown at 207 includes lookup tables built in communication with the dynamic memory controller 202 to convert the virtual address into a physical address. If the virtually addressed data is not physically stored in memory 203, it is loaded into physical memory and its physical memory location is associated with its virtual address in a process known as virtual memory management. In examples where the instruction pointer uses physical addresses, the execution unit 208 passes physical addresses for the executed instructions to a program trace module 209. When virtual addresses are used, the program trace unit receives the virtual address data. In either case, it can be difficult to later determine which program instructions from storage 201 were present in the virtual or physical address locations recorded, such as when a program has completed execution or has reached a breakpoint in the debugging process.

Breakpoints are often used to interrupt program execution at a predetermined point, at which the state of various data can be observed to determine what has happened up to that point in the program. Breakpoints are sometimes set by including them in the high-level language program, and are sometimes implemented as a comparator that looks for a specific instruction at a specific address that stops execution as a result of an address match. But, because the address is not necessarily unique to a particular program instruction, false breaks in program execution can occur before the desired breakpoint is reached when using such methods. Simply detecting false address matches can be performed by halting program execution and comparing the program content from memory to the various pages or memory contents that might possibly be located in that physical memory space. If the last instruction address's content matches the expected program code, the correct program code has been found. If the contents of the last executed address do not match the expected program code, then an exception (or false breakpoint) has been found. This solution is inconvenient if the program is relatively long, as several false program halts can occur before the desired breakpoint is reached. It remains problematic in applications where the program can't be stopped in certain points, such as in the engine control and industrial process control examples discussed earlier.

Another solution is to track loading various blocks of data into the memory, such as by tracing or recording the content of a specific marker location within the various pages or blocks that are swapped into and out of physical memory. This approach becomes impractical when relatively large numbers of pages are swapped in and out of memory, or when the size of data blocks swapped in and out of memory is relatively small. It is also problematic in that it requires additional logic and synchronization to track loading data into memory, particularly if the data is not loaded by the processor but is loaded by a direct memory access (DMA) controller or another such component.

U.S. Patent Application 2008/0215920 proposes identify the code actually executed during program execution. Although simply recording all instructions executed in order would reveal what code is actually executing, recording all executed instructions would require an undesirably large amount of storage space and is not a practical solution. The code is identified instead by use of a signature derived from the code, such as a hash value, a cyclic redundancy code (CRC), or an exclusive-or signature of the sequence of instructions that are actually executed. The length of the signature is selected to be sufficiently large that the odds of two different possible sequences of program instructions having the same signature is sufficiently low that it is not problematic. For example, a register in a processor is set to a zero value before the first instruction in a sequence of code is executed, and each executed instruction is XORed with the value of the register. The resulting value of the register when program execution is halted is therefore very likely unique to the particular sequence of instructions that were executed, enabling the programmer to calculate the signature of various possible code sequences and compare the signatures of the possible code sequences to the signature stored in the register to confirm a specific sequence of instructions. The programmer can therefore confirm the instruction sequence executed up to the point at which the break occurred.

The signature calculation may be restarted whenever a branch is taken, and the running value of the XOR signature value is recorded in a trace file after a certain number of instructions have been executed, such as every 16 instructions. The signature calculation may also be restarted on jump or branch instructions, such that the signature reflects the code sequence since the last jump or branch. In another example, crossing an address boundary triggers a restart in signature calculation, such that when the executed program code address changes from one block or page of memory to another, the signature counting restarts. The signature can also be calculated at any time, even after program halted. The program instructions may execute continuously, with a buffer holding the last four instructions, or a compressed version of the last four instructions executed, such as an 8-bit value derived from each of the last four instructions executed. These instructions are made available to the programmer such as by storing them in a special trace hardware register or by making the instructions available externally so that they can be buffered outside the processor. The signature identifying the program code then comprises the last four instructions executed, or some value derived from the last four instructions such as a signature value derived from XORing the last four instructions or their 8-bit derived values together. This signature can then be compared with the signatures of the possible code sequences that may have been stored in the memory and executed just before program halt.

FIG. 3 (of U.S. Patent Application 2008/0215920) (prior art), is a block diagram of a processor architecture supporting program trace functionality including executed program code signatures. A processor core 301 is operable to execute software instructions, such as are retrieved from memory 102 of FIG. 1 or from cache memory. The presently executing instruction is referenced by an instruction pointer or a program counter, which indicates the address of the currently pending instruction and is incremented as instructions are executed. The instruction pointer is also changed to reflect branch or jump points in the instruction flow. The instruction pointer's indicated address is traced and compressed for storage as part of a program trace record at 302, and the instruction pointer information is formed into a message via a message generator 303. The messages contain the instruction pointer information compressed at 302, and are eventually stored in a log that can be examined after program execution to determine which instructions have executed during the program execution. Compression of the instruction flow is often very beneficial, as the volume of instructions executed can be much larger than the memory available for storing trace information. In one example, instruction pointer messages are compressed by identifying starting instruction addresses and the addresses of the instructions taken at branches or jumps, but not necessarily every intermediate instruction if no branches or jumps are present in the code. In another example, the trace messages are compressed by compressing the address values of the instructions.

A signature generator 304 receives the processor instructions being executed and generates a signature, such as by starting with a zero value and exclusive-ORing the executed instructions to a running signature value. In other embodiments, the signature is derived from a portion of the executing instruction, such as the last eight bits of each instruction, or comprises some other signature calculation method. A variety of hash functions, error correction and checksum functions, and other mathematical or logical functions will be suitable for signature generation, and will allow a debugger to determine which instructions have been executed. The signature data is sent to a signature message generator 305, which takes the signature data from the signature generator logic 304 and periodically formats it into a message that is suitable for storage as part of a program execution trace record. The signature message generator in some embodiments generates a message periodically, such as every 16 instructions, or uses other message generation criteria in other embodiments to trigger generation of a message. The signature message generator may also wait for a specified number of instructions before creating a first signature message, so that the signature value is very likely unique.

Both the signature messages from the signature message generator 305 and the instruction pointer trace unit messages from message generator 303 are forwarded to the message sorter 306, which organizes the message in a standardized readable format. Once the messages are sorted and organized, they are stored in the on-chip trace memory at 307, or are exported via a trace pin interface for storage external to the processor. The stored messages therefore contain instruction address data as well as signature data, so that the addresses of executed instructions can be seen via the instruction address messages and the actual instruction flow can be confirmed via the signature message data. The signature generator 304 may include additional data, such as a separate signature indicating the cache line from which the current instructions are executed. This signature in some embodiments is formed via a similar method such as a hash value calculation or exclusive OR logical function, or in alternate embodiments is formed using other methods such as by using an error correction code word (ECC) of the cache line, and is the result of the cache line from which executing instructions have been retrieved. The signature stays the same as long as execution continues from within the same cache line, but changes when a new cache line is used. The cache line signature in further embodiments is reset periodically, such as at jumps or braches in program flow, similar to the processor instruction signature.

US 2009/0217050, expressly incorporated herein by reference, provides systems and methods to optimize signature verification time for a cryptographic cache. Time is reduced by eliminating at least some of the duplicative application of cryptographic primitives. In some embodiments, systems and methods for signature verification comprise obtaining a signature which was previously generated using an asymmetrical cryptographic scheme, and determining whether an identical signature has previously been stored in a signature cache. If an identical signature has been previously stored in the signature cache, retrieving previously generated results corresponding to the previously stored identical signature, the results a consequence of application of cryptographic primitives of the asymmetrical cryptographic scheme corresponding to the identical signature. The results are forwarded to a signature verifier. In at least some embodiments, at least one of these functions occurs in a secure execution environment. Examples of a secure execution environment, without limitation, include an ARM TRUSTZONE® architecture, a trusted platform module (TPM), Texas Instruments' M-SHIELD™ security technology, etc. Secure execution environment comprises signature cache and at least a portion of security logic. Security logic in turn comprises signature look-up, calculator, hash function and signature verifier, although it should be readily apparent that more or different functions and modules may form part of security for some embodiments. The device obtains the signature (and message) from unsecure environment and promptly presents them to security logic for vetting. Embodiments employ signature look-up to check signature cache to determine whether the specific signature has been presented before. If the specific signature has indeed been previously presented, signature look-up retrieves the corresponding results of the previous utilization of cryptographic primitives corresponding to the relevant digital signature scheme being employed, which results were previously stored at the identified location in signature cache, and forwards the results to signature verifier. Among those results is the hash value of the previous message that is part of the previous signature. Signature verifier calls hash function to perform a hash on newly obtained message, and compares the hash value of the newly obtained message with the hash value retrieved from signature cache. If there is a match, the signature is verified and the message is forwarded for further processing, e.g., uploading into NVM or RAM as the case may be, etc. Thus, execution is commenced after verification.

Vivek Haldar, Deepak Chandra and Michael Franz, "Semantic Remote Attestation—A Virtual Machine directed approach to Trusted Computing", USENIX Virtual Machine Research and Technology Symposium, May 2004, provides a method for using language-based virtual machines which enables the remote attestation of complex, dynamic, and high-level program properties, in a platform-independent way.

Joshua N. Edmison, "Hardware Architectures for Software Security", Ph.D Thesis, Virginia Polytechnic Institute and State University (2006), proposes that substantial, hardware-based software protection can be achieved, without trusting software or redesigning the processor, by augmenting existing processors with security management hardware placed outside of the processor boundary. Benefits of this approach include the ability to add security features to nearly any processor, update security features without redesigning the processor, and provide maximum transparency to the software development and distribution processes.

Bryan Parno Jonathan M. McCune Adrian Perrig, "Bootstrapping Trust in Commodity Computers", IEEE Symposium on Security and Privacy, May 2010, provides a method for providing information about a computer's state, as part of an investigation of trustworthy computing.

SUMMARY OF THE INVENTION

According to a preferred embodiment of invention, the authenticity of instructions in a processor cache is verified within the processor, concurrent with initial execution of the instructions, and instruction processing is not delayed while a reference signature is accessed and is being verified. Thus, the verification proceeds in parallel with instruction execution. Advantageously, the execution pipeline for instructions is longer than the verification latency, so that in the event of a verification exception, instruction execution can be modified or preempted.

This differs from prior systems, e.g., Cerium, which provides strictly sequential order of operations, verification followed by initiation of processing of the instructions. Cerium thus does not lend itself to modern pipelined design, while the preferred embodiment of the present invention exploits modern processor architectures, permitting initial stages of program execution to speculatively execute, with a contingent subsequent exception or flushing occurring dependent on the verification status. If the code passes the verification, there is little or no delay in processing; if the verification fails, the pipeline is purged or other exception taken, thus providing the desired security.

In some embodiments, the verification need not merely flush the instruction pipeline, but in fact can provide a modification of instruction processing (similar to a vectored interrupt), such that the signature verification process can result in alternate execution results and/or pathways, rather than a simple go/nogo option for commitment of execution of an instruction.

In accordance with one embodiment, the verification employs preexisting speculative execution logic of a pipelined processor, in which the verification flag takes the place of a more traditional branch flag. Alternately, logic generally corresponding to, but distinct from, preexisting conditional execution logic may be employed. In the former case, the cache line verification logic is provided as a separate module, which, for example, completes verification within about 8 clock cycles, while the processor instruction decode and execution pipeline executes within about 20 clock cycles. Therefore, since the verification will generally be available before the end of the instruction pipeline, the processor can be better optimized to deal with verification exceptions.

In case of a verification exception, a typical response will be a flushing of the processor instruction decode and execution pipeline, along with a flag which is handled by trusted code, such as a microkernel within the processor, or a call to secure BIOS or operating system code. This general case permits use of the verification as a means to prevent execution of untrusted or malicious code. In other cases, the verification may be used as a means to identify a trust authority for code or a set of privileges, with the verification process used to implement restrictions, which need not be limited to execution per se. For example, a processor may have a set of secure registers, accessible only by code which verifies to a predetermined secure signature. Code which does not verify in accordance with the secure signature, may be blocked from the secure registers, and for example redirected to a different set of registers. A plurality of verification processes may be available, for example, with four different keys, permitting a verification and identification of processes, and contingent execution dependent on the verification.

According to a preferred embodiment, a cache line of instructions is fetched for execution by the processor, which itself is preferably a pipelined processor with a deep pipeline of greater than 5 stages. The processor may itself support parallel execution or parallel speculative execution, with multiple pipelines. As a cache line of instructions is available for processing, an encrypted signature (or set of signatures) putatively associated with the set of instructions is stored in the processor or fetched. Processing of the instructions is commenced, in advance of any result of a verification process. The reference signature is, in parallel with instruction execution, decrypted in the processor using a private key stored in secure memory. The signature of the cache line of instructions is calculated (or precalculated) and compared against the decrypted reference signature, to determine a verification. If the verification is successful, the execution of the instructions is committed, i.e., the results made available or changes in state made to registers. If the verification is unsuccessful, an exception is made, and for example, the instruction processing pipeline flushed before the instructions are committed. Other exception processing might include altering the processor to a "safe" state in which possibly malicious code is contained or prevented from altering other processes or memory, or triggering an operating system process to provide exception handling logic. Thus, the processor might be provided with an ability to handle verified code in a secure processing mode, and unverified code in an insecure or test processing mode.

An embodiment provides a system and method that validates that a program executing on a microprocessor is indeed the intended program. This validation is performed within the microprocessor, and while (concurrently with) the code is executing. In this case, it is possible to distinguish between different routines of verified code; that is, it is not sufficient that the code being executed is "verified"; it must be verified within the context of execution, for example by an operating system or by prior executed verified code. This prevents malicious use of verified code, and permits different levels of verification; an author or source verification, and a runtime verification. In some cases, a system may determine that certain instruction execution flows are incompatible or undesired, and therefore one instruction flow can permanently or temporarily revoke verification credentials for another instruction flow. As discussed above, the result of a failed verification need not be a bar to commitment of execution, and may result in a modification of execution. Thus, an incompatibility may arise because concurrent tasks seek to modify a common register. The verification arbitration may thus result in use of different and non-conflicting sets of registers.

A particular security risk is that programs can be modified by malicious code as they execute, for example in main memory or cache memory. A proposed mechanism detects such tampering as follows: As instructions that constitute the program are fetched into the lowest level cache, a signature Sg is generated for each of these cache lines within the microprocessor, based on techniques known to the art. For example, a hardware signature generator may be provided for the cache lines such that the signature is automatically generated without programmed processor intervention, for each such cache line. The expected signatures of the cache lines are pre-generated by a trusted authority, encrypted using a secret key S and stored in the RAM, along with the normal code. Therefore, in a typical case, the signatures will be created by a software author (in the case of a mass distributed private key), or by the operating system during a secure and trusted software installation process (in the case of a processor-specific private key). Of course, other options are possible for creating and using the expected signature Se, including hybrid schemes.

As instructions from the fetched line are decoded and executed, the encrypted expected signature of the cache line is fetched and decoded internally within the microprocessor using the secret key. This decoded expected signature Se is compared against the generated signature Sg and the result of the match is stored in a table within the microprocessor.

As instructions from the fetched line are committed (e.g., the instruction execution process is complete to the extent that changes to the processor or system state outside of the instruction processing pipeline are to be made), the stored result of comparing Sg and Se are consulted.

If the result indicates a match, instructions are committed normally.

If the result indicates a mismatch, further execution is halted and appropriate measures are invoked.

If, at the time of committing an instruction, a table entry exists but the results of the comparison are pending, instruction commitment may be held up momentarily.

If a matching entry does not exist at the time of commitment, the pipeline may be flushed, or other steps taken.

It is noted that it is also possible to include within the verification a partial execution result. That is, the verification is dependent on Se, Sg, and a processor register and/or pipeline state. In this way, security against both unverified instructions and certain types of data can be obtained. Of course, separate verification of data states and/or sequences may also be implemented.

Sg and Se need not be compared prior to processing the fetched instructions. This mitigates the delays in accessing the encoded expected signature Se and the delays of generating a new signature Sg and decoding the expected signature for comparison from affecting the microprocessor's instruction processing rate.

Assuming that code is executed in an expected manner, it is possible to predictively call Se, and begin decoding, in order to avoid delay. A set of Se may be cached in the processor, in volatile or non-volatile memory. Thus, a preferred embodiment provides that instruction verification and execution can concurrently occur, but that this need not be the case in all circumstances.

This scheme can be used for a number of purposes, including:

1. Detection of malicious attempts to modify code.
2. Ensure that only certified code can run and provides detection at run-time tampering of such code.
3. Permit trustworthy code to be distributed and used.
4. Detect instruction corruption due to faults—permanent or transient.
5. Execute instructions with results dependent on a signature verification.

Likewise, the present scheme can also serve the various purposes known for other secure processing platforms, and may generally be used in conjunction with other known security technologies. Thus, the present verification process is generally transparent to existing system architectures and execution paradigms, with the exception that the expected signatures must be available at runtime, and the small amount of overhead for calling the expected signatures and any delays from the verification process are tolerable. Since most modern computing platforms employing multilevel instruction cache and deep pipelines are non-deterministic, the expected overhead from the present verification processes, about 2% of processing capacity, is generally tolerable, and indeed, since the signature verification logic is somewhat functionally overlapping with error detection logic, in some cases the overhead may be abated. Likewise, verified code may avoid certain software implemented run-time tests. The processor itself is generally modified, for example to include hardware signature generation in the cache, hardware for verifying the instruction Sg against the expected signature Se, verification result processing (e.g., the table of verification results, contingent processing logic) and secure storage for the private key (or hardware for receipt of the private key). This amounts to less than about 20% die overhead, with the bulk of the excess consumed in cache line signature generation.

This technology is easy to retrofit to current designs, in feasible implementations would show little performance loss, and can use existing TPM support to implement processor-internal storage for secret keys. The design provides concurrent commencement of instruction execution and verification of code. A processor according to the present invention can result from modification of an existing design, which is compatible with pre-existing code, including well written code which runs in real-time, near real-time, or in time critical fashion. That is, the increased processing to verify the code signature against the expected code signature is, for the most part, an inherently parallel processing path which does not significantly increase processing latency.

A preferred embodiment of the invention employs a set-associative structure called a Cache line Signature Table (CST), to hold the entry for a lowest level cache line that was fetched on a level 1 instruction cache (L1 I-cache) miss. The entry may hold, for example, either the decrypted signature fetched from random access memory (RAM) or the generated signature, whatever is available earlier.

A signature is generated for each line by simply generating a digest function D on smaller chunks of each such line, for example at 16-bit or 32-bit boundaries.

In the event of a verification failure or signature mismatch, a rollback to a previous checkpoint may be implemented. Typically, this will be a desired result if the signatures are used for detecting software errors, or for secure control systems which are relatively intolerant of unavailability. On the other hand, in systems where a continued execution or attempted continuation after a fault is not required, or is undesired, an exception may be triggered, to address the mismatch, or even take countermeasures against a presumed attack. These countermeasures may be directed from code stored within the processor, and thus presumed secure, or from outside, in which case heightened scrutiny may be implemented.

According to one embodiment, a plurality of private keys may be stored within the processor, representing different stages of security. If a "first line" key becomes compromised, the processor may revoke that key, and thereafter employ and rely on a different key, which may have a greater key length or rely on a different algorithm. The presumption of security compromise may come from a certificate revocation list, or behavioral analysis of software with respect to prohibited functionality and/or malicious activity.

In like manner, in some embodiments, it may be possible to add a new certificate to the processor memory, which may exploit a hardware lock (presuming that malicious attacks are by software only), or using an authenticated key transfer technique. Note that if the keys are changed, any signatures created whose verification is dependent on the key will be invalid, and will have to be resupplied or recalculated.

According to one embodiment, the system is responsive to codes, e.g., program instructions or other signals, to deactivate some or all of the security features, and thereby allow exceptions to the normal prohibitions and control mechanisms. Preferably, these codes are provided by the operating system or some other trusted entity, in order to provide authentication of the exception. For example, during normal booting of an operating system, files may be modified, and this exception mechanism permits such modifications. After the operating system has completed these modifications, the security features may be re-enabled. According to another embodiment, multiple alternate authentication mechanisms are provided, which are selectively applied under control of authenticated processes and instructions. Therefore, the system may employ multiple parallel or alternate instruction authentication schemes, and optionally operate for periods without an instruction authentication processes active.

It is therefore an object of the invention to provide a processor comprising: a cache memory, configured to store instructions; an instruction processing pipeline, configured to receive a stored instruction from the cache memory for processing, having a pipeline latency between commencement of instruction processing and commitment of execution of the instruction; a cache memory signature generator, configured to generate a distinctive signature of at least one cache line stored in the cache memory; a memory configured to store an encrypted reference signature corresponding to the at least one cache line stored in the cache memory; a secure storage location configured to store a key adapted to decrypt the encrypted reference signature; decryption logic configured to decrypt the encrypted reference signature in dependence on the stored key; verification logic configured to verify the decrypted reference signature against the generated distinctive signature; and authorization logic configured to selectively permit the instruction processing pipeline to contingently proceed with processing of the instruction to a stage prior to commitment, in dependence on an output of the verification logic, and only if the generated distinctive signature is verified against the reference signature, authorizing commitment of the instruction from the cache line.

It is also an object of the invention to provide a processing method, comprising: receiving a stored instruction from a cache line in a cache memory for processing into an instruction processing pipeline, having a pipeline latency between commencement of instruction processing and commitment of execution of the instruction; generating a distinctive signature of the cache line; storing an encrypted reference signature corresponding to the cache line; securely storing a key adapted to decrypt the encrypted reference signature; decrypting the encrypted reference signature in dependence on the stored key; verifying the decrypted reference signature against the generated distinctive signature; and initiating processing of an instruction, and thereafter selectively permitting the instruction processing pipeline to contingently proceed to a stage prior to commitment, in dependence on the verifying, and only if the generated distinctive signature is verified against the reference signature, authorizing commitment of the instruction from the cache line.

It is a further object of the invention to provide a system and method in which a processor commences processing of an instruction in an instruction processing pipeline and proceeds to a stage before commitment of execution, wherein the commitment of execution is contingent on a verification of a cache line that includes the instruction by a verification process that proceeds concurrently with the instruction processing, in which a unique or distinctive signature is generated for the cache line, and compared against a reference signature which is received by the processor in encrypted form, and decrypted using a secret key stored in the processor, such that the instruction processing proceeds to commitment of execution if and only if the decrypted reference signature matches the generated signature of the cache line. The verification is available for all instructions in the same cache line, reducing potential delays. The processor preferably includes hardware enhancements such that the minimum time to decrypt an encrypted reference signature stored in the cache and verify it against the generated signature is less than the minimum time for commitment of execution of an instruction. Likewise, the cache line signatures are also preferably generated by specially provided hardware in the processor. Thus, if the reference signatures are available in cache memory, a verification latency beyond the normal pipeline processing latency is avoided. If the verification is not available in time, the pipeline may be stalled. If the verification fails, various embodiments provide that the processor may revert to a state defined by a known good checkpoint, or execute a secure exception process.

The cache memory signature generator may generate a distinctive signature of at least one instruction stored in the cache memory during the pipeline latency.

The memory may be configured to store an encrypted reference signature corresponding to the at least one instruction stored in the cache memory, receives the encrypted reference signature before the commitment of the said instruction.

The decryption logic may decrypt the encrypted reference signature during a period prior to at least one of decode, dispatch, or issue of the instruction.

The authorization logic may be configured to selectively permit the instruction processing pipeline to contingently proceed in dependence on an output of the verification logic.

The verification logic may verify the decrypted reference signature against the generated distinctive signature prior to the commitment of the instruction.

An instruction is preferably allowed to commence advancement through the instruction processing pipeline before the generated distinctive signature of a cache line that contained the instruction is verified against a reference signature of the cache line.

An instruction may be advanced through the instruction processing pipeline to a stage immediately prior to at least one of a decoding, a dispatch, and a commitment, and thereafter contingently processed in dependence on the verification logic.

The verification may be optionally disabled, to selectively permit processing of instructions for which the signature does not, or is not expected to, match.

The instruction processing pipeline may be configured to selectively commit execution of an instruction independent of the output of the verification logic, and subject to alternate instruction authentication logic.

The processor may comprise an integrated circuit.

The secure storage location may be on a common integrated circuit with at least the instruction processing pipeline. The secure storage location may also be on a different integrated circuit from at least the decryption logic, the system further comprising logic configured to securely communicate information corresponding to the key to the decryption logic.

The authorization logic may selectively permit the instruction processing pipeline to contingently proceed only if the decrypted reference signature exactly matches the generated distinctive signature.

The authorization logic may selectively control the instruction processing pipeline to provide at least two alternate results in dependence on the verification logic.

A table may be provided, configured to store a plurality of outputs of the verification logic for a plurality of different reference signatures.

The authorization logic may selectively suspend (e.g., stall) processing of an instruction in the instruction pipeline, prior to contingently proceeding, in dependence on an output of the verification logic.

The processor may further comprise decryption logic configured to decrypt instructions stored in the cache memory.

The processor may further comprise: a second memory configured to store a second encrypted reference signature corresponding to at least one second instruction stored in the cache memory; and second verification logic configured to verify a decrypted second encrypted reference signature against a generated distinctive signature of the at least one second instruction stored in the cache memory, wherein the verification logic and the second verification logic are concurrently operative to verify a generated distinctive signature against a reference signature.

The processor may further comprise an interface configured to receive at least the instructions and the encrypted reference signature from a memory external to the processor.

The authorization logic may be configured to initiate processing of an instruction, and to thereafter selectively permit the instruction processing pipeline to contingently proceed in dependence on an output of the verification logic.

The processor may comprise a memory representing a defined state, and wherein in dependence on an output of the verification logic, the processor may assume the defined state, without completing execution of the instruction. That is, if the processing of the instruction does not lead to commitment of execution, the processor may revert to a checkpoint or other state not selectively dependent on the content of the instruction, to thereby block malicious or corrupted instructions from executing or controlling the processor.

If the verification logic indicates a failure of verification of the decrypted reference signature against the generated distinctive signature, the processor may roll back to a predefined checkpoint state. The processor or memory may therefore sequentially store, using hardware or software, a checkpoint or known good (verified) state. This is particularly useful to assist in correction of instruction corruption events. The checkpoint state may be defined by hardware or software logic. In the case of software, preferably the checkpoint state is defined by instruction codes whose execution has been previously verified.

The cache memory signature generator may compute a distinctive digest function of at least a portion of a cache line, a signature in dependence on a cache line virtual address and a cache line content, a distinctive signature in which an incremental change in cache line content results in a non-incremental change in the generated distinctive signature, and/or a distinctive signature in dependence on a memory content and a memory virtual address, wherein generated distinctive signatures for memory locations having identical content at sequential virtual addresses results in an a difficult to predict change in the generated distinctive signature, and wherein the generated distinctive signature has a digital size smaller than a size of the cache line from which it is derived.

The instruction processing pipeline may comprise branch prediction logic and speculative processing logic, wherein the verification logic generates a signal corresponding to a branch misprediction with a rollback to a processor state prior to commencement of processing of an instruction whose verification failed.

The instruction processing pipeline may contingently proceed in dependence on the verifying, and may support an instruction processing pipeline stall if the verifying is delayed.

The decrypting and verifying are preferably capable of completing faster that the pipeline latency.

The verifying may determine an exact match between the generated distinctive signature and the decrypted reference signature. In some cases, a mask may be applied to permit verification of portions of a cache line, while permitting runtime variation or data-dependent instructions to be verified.

The system may also be used to generate execution flow control, in which a plurality of verifications may be employed, and the processor executes in accordance with a respective verification. A plurality of verifications may proceed concurrently. A plurality of verification results may be stored in a table for a plurality of different instructions.

In event of a failure of verification, the instruction processing pipeline may be flushed, and subsequent commitment of execution of the instruction preempted.

The distinctive signature may be a cryptographic digest of the cache line, in which it is statistically unlikely that two different cache lines assume the same signature, and wherein there is low predictability, absent a secret key, on what signature might correspond with a particular cache line content. Thus, a secret key is required to generate the cryptographic digest of the cache line, and a corresponding secret key is required to decrypt the reference signatures for comparison with the generated signatures.

The hardware for implementing the processor enhancements preferably makes use of processor instruction processing pipeline logic found in modern processors, with respect to branch prediction, speculative processing, and pipeline flushing, and thus preferably does not require substantial redesign of existing processor pipelines. On the other hand, in order to avoid, to the extent reasonable, added processing latency, assistive hardware which executes concurrently with the instruction processing pipeline is provided to calculate a cache line signature, decrypt the reference signature, and determine a correspondence thereof. Further supplemental hardware might include a table for storing the verification results, a content associative memory, and fetch logic to call reference signatures as or before needed, possibly in a speculative manner.

It is a further object to provide a processor system comprising a cache line signature generator, configured to generate a dynamic signature for a cache line of an instruction cache; verification logic configured to securely verify a reference signature for a respective cache line content against the dynamic signature; and an instruction processing pipeline having a plurality of sequential stages, configured to load an instruction from the cache line, speculatively execute the instruction in the plurality of stages prior to commitment, and selectively flush the pipeline in dependence on a signal prior to instruction commitment or permit instruction commitment, in dependence on a signal from the verification logic.

It is also an object to provide a processor comprising: an instruction processing pipeline, having at least one pipeline phase between receipt of an instruction for processing and commitment of the instruction, being responsive to at least one control flow instruction; a signature generator, configured to generate a signature of at least one instruction cache line storing at least one instruction; a secure storage location configured to store a key adapted to decrypt an encrypted reference signature for the at least one instruction; verification logic configured to verify a decrypted reference signature against the signature; and authentication logic configured to permit commitment of the at least one instruction, selectively based on a signal from the verification logic.

Another object provides a processing method, comprising: generating a signature of at least one instruction cache line storing at least one instruction; storing a key adapted to decrypt an encrypted reference signature for the at least one instruction; verifying a decrypted reference signature against the signature; and selectively permit commitment of the at least one instruction in an instruction processing pipeline responsive to at least one control flow instruction and having a latency between receipt of an instruction for processing and commitment of the instruction, based on said verification.

The processor may further comprise a cache, having the cache line, configured to store instructions; the instruction processing pipeline being configured to receive a stored instruction from the cache for processing; a memory configured to store the encrypted reference signature corresponding to the at least one cache line stored; and decryption logic configured to decrypt the encrypted reference signature in dependence on the stored key, wherein the authorization logic is configured to selectively permit the instruction processing pipeline to contingently proceed with processing of the at least one instruction to a stage prior to commitment, in dependence on the signal from the verification logic, and only if the generated signature is successfully verified against the reference signature, authorizing commitment of the at least one instruction from the cache line.

The pipeline may have a latency between commencement of instruction processing and commitment of the instruction, and for at least one cache line content, the signature generator generates the signature of the at least one instruction in the cache line, the encrypted reference signature is decrypted, and the decrypted reference signature verified against the signature during the pipeline latency substantially without stalling the pipeline waiting for the signal from the verification logic. Logic may also be provided configured to, if the verification logic fails to communicate a signal indicating permitted commitment of the at least one instruction, generate a fail signal, flush the pipeline of the at least one instruction from the cache line, and prevent the at least one instruction in the pipeline from commitment. An instruction may be advanced through the instruction processing pipeline to a stage immediately prior to at least one of a decoding, a dispatch, and a commitment, and is thereafter contingently at least one of decoded, dispatched and committed, in dependence on the signal. The at least one instruction may have an execution which is dependent on associated data present in the cache line, and the signature is dependent on the at least one instruction but not the data. The authorization logic may selectively control the instruction processing pipeline to provide at least two alternate results of instruction commitment in dependence on the signal.

A table may be provided, configured to store a plurality of outputs of the verification logic for a plurality of different reference signatures.

A second memory may be provided, configured to store a second encrypted reference signature corresponding to at least one second instruction stored in the cache; and second verification logic provided configured to verify a decrypted second encrypted reference signature against a generated signature of the at least one second instruction stored in the cache, wherein the verification logic and the second verification logic are concurrently operative to verify the generated signature against the reference signature and the second generated reference signature against the second reference signature.

The processor may comprises a memory representing a defined state or checkpoint state, and wherein selectively in dependence on the signal indicating a no permission for commitment of the at least one instruction, the processor may assume the defined state or rolls back to the checkpoint state, and does not complete execution of the instruction.

The signature generator preferably computes a distinctive digest function of the cache line. Preferably, the signature generator selectively generates the signature in dependence on at least a cache line virtual address and a cache line content. The signature generator may also produce a signature in which an incremental change in a cache line content results in a non-incremental change in the generated signature. The signature generator may produce a signature in dependence on at least a cache line memory location content and an associated virtual address, wherein generated signatures for memory locations having identical content at sequential virtual addresses are generated by a secret algorithm configured to result in an a difficult to predict change in the generated signature, and wherein the generated signature has a digital size smaller than a size of the cache line from which it is derived.

The instruction processing pipeline may include at least branch prediction logic and speculative processing logic. Advantageously, the effect of a failed verification can be similar to the effect of a branch misprediction or speculative processing failure, that is, the pipeline is flushed without completion of instruction processing, e.g., commitment of the instruction. Thus the signal corresponds to a branch misprediction, the processor being configured to initiate a rollback to a processor state prior to commencement of processing of an instruction whose verification failed.

According to one embodiment, a mode is provided wherein the instruction processing pipeline is configured to selectively commit an instruction independent of the output of the verification logic. That is, the particular security may be bypassed, for example during trusted startup procedures, system upgrades, and/or testing. The instruction processing pipeline may have a mode which selectively permits commitment of an instruction independent of a relation of the decrypted reference signature and the generated signature. Likewise, the instruction processing pipeline may be configured to selectively commit an instruction independent of the output of the verification logic, and subject to alternate instruction authentication logic.

The processor may be further configured to store a state of at least one of the verification logic and the authentication logic in a storage location when a context is switched out, and to restore the state of the at least one of the verification logic and the authentication logic from the storage location when the context is resumed.

According to another embodiment, the change in state effected by an instruction subject to verification may be outside of the instruction processing pipeline. For example, in a memory write operation, the data must be transferred to the memory before changing the state of the memory based on that data. Therefore, if the operation cannot be verified before the instruction which proposes the memory write is ready for commitment in the instruction processing pipeline, the implementation of the authentication processes may be distributed from the processor core, and to memory operation processing logic. Thus, under such circumstances where a substantial, and perhaps disadvantageous permanent change in the system state does not occur formally at the time of commitment of the instruction in the instruction processing pipeline per se, then the signal may be targeted at the external logic rather than the pipeline. This permits fewer stalls in the pipeline, but may impose administrative burdens on extra-processor communications. Thus, the system may be configured to process at least one instruction to compute a proposed change in state of an external memory, and further comprise logic configured to signal a permitted change in the state of external memory selectively based on the signal from the verification logic.

The method may further comprise storing an encrypted reference signature corresponding to the cache line; decrypting the encrypted reference signature in dependence on the stored key; and initiating processing of an instruction from the cache line, and thereafter permitting the instruction processing pipeline to proceed to a stage prior to commitment, and only if the generated distinctive signature is verified against the reference signature, authorizing commitment of the instruction. For at least one cache line content, the generated signature of the at least one instruction may be generated, the encrypted reference signature decrypted, and the decrypted reference signature verified against the signature, during the pipeline latency substantially without stalling the pipeline waiting for the verification. Correspondingly, for at least one cache line content, the instruction processing pipeline may support an instruction processing pipeline stall if the verification is delayed.

The verification may permit commitment of the at least one instruction in the pipeline based on a partial match of the generated signature of the cache line with the decrypted reference signature. For example, a value in the cache line may be dynamically generated or updated during program execution, and the reference signature calculated and/or presented to be independent of the variable data component.

A second encrypted reference signature corresponding to at least one second instruction may be stored in the cache; and a decrypted second encrypted reference signature verified against a generated signature of the at least one second instruction stored in the cache memory, wherein the verifying of the instruction and the verifying of the second instruction proceed concurrently. For example, in a multicore processor, a plurality of pipelines may be present. Likewise, the values in a plurality of cache lines may be verified concurrently, for a single pipeline.

A predefined or checkpoint processor state may be stored in a memory, and the predefined processor state or the processor state rolled back to the prior checkpoint state, preempting completion of execution of the at least one instruction in the instruction processing pipeline, in dependence on a result of said verifying.

The cache line signature may be selectively generated in dependence on a cache line virtual address and a cache line content.

The instruction processing pipeline may comprise branch prediction logic and speculative processing logic, wherein the verifying generates a signal corresponding to a branch misprediction, resulting in a rollback to a state prior to commencement of processing of an instruction whose verification failed. Likewise, other synergies with existing processor technologies may be exploited. For example, the signature and verification process is a type of error detection, and therefore processor logic which implements error detection may be reduced to the extent redundant with the verification of cache line signatures against reference signatures.

The method may provide a mode in which the instruction processing pipeline selectively commits an instruction independent of the verifying. The instruction processing pipeline may selectively commits an instruction independent of the verifying, and subject to alternate instruction authentication.

A state of at least one of the verification logic and the authentication logic may be stored in a storage location when a context is switched out, and the state of the at least one of the verification logic and the authentication logic restored from the storage location when the context is resumed.

The instruction processing pipeline may process at least one instruction to compute a proposed change in state of an external memory, and selectively permit a change in the external memory based on the verification logic. Therefore, in the case of, for example, a memory write, the instruction processing pipeline may be virtually extended to encompass cooperative pipelines which also incur latencies prior to making a substantially persistent change to the system, thus avoiding a stalled pipeline in a microprocessor core.

BRIEF DESCRIPTION OF THE DRAWINGS

For a detailed description of exemplary embodiments of the invention, reference will be made to the accompanying drawings in which.

DETAILED DESCRIPTION OF THE PREFERRED EMBODIMENTS

Figure 1:
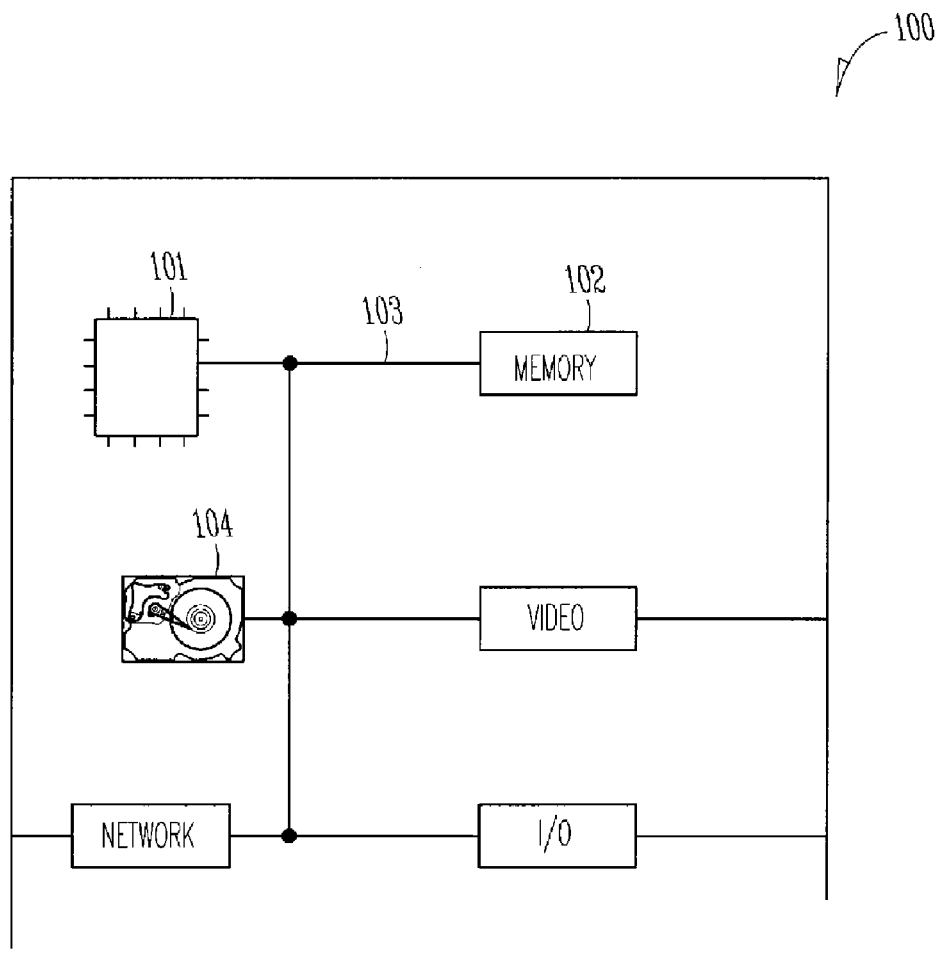
FIG. 1 illustrates a prior art network with a transmitter and a plurality of receivers.
Figure 2:
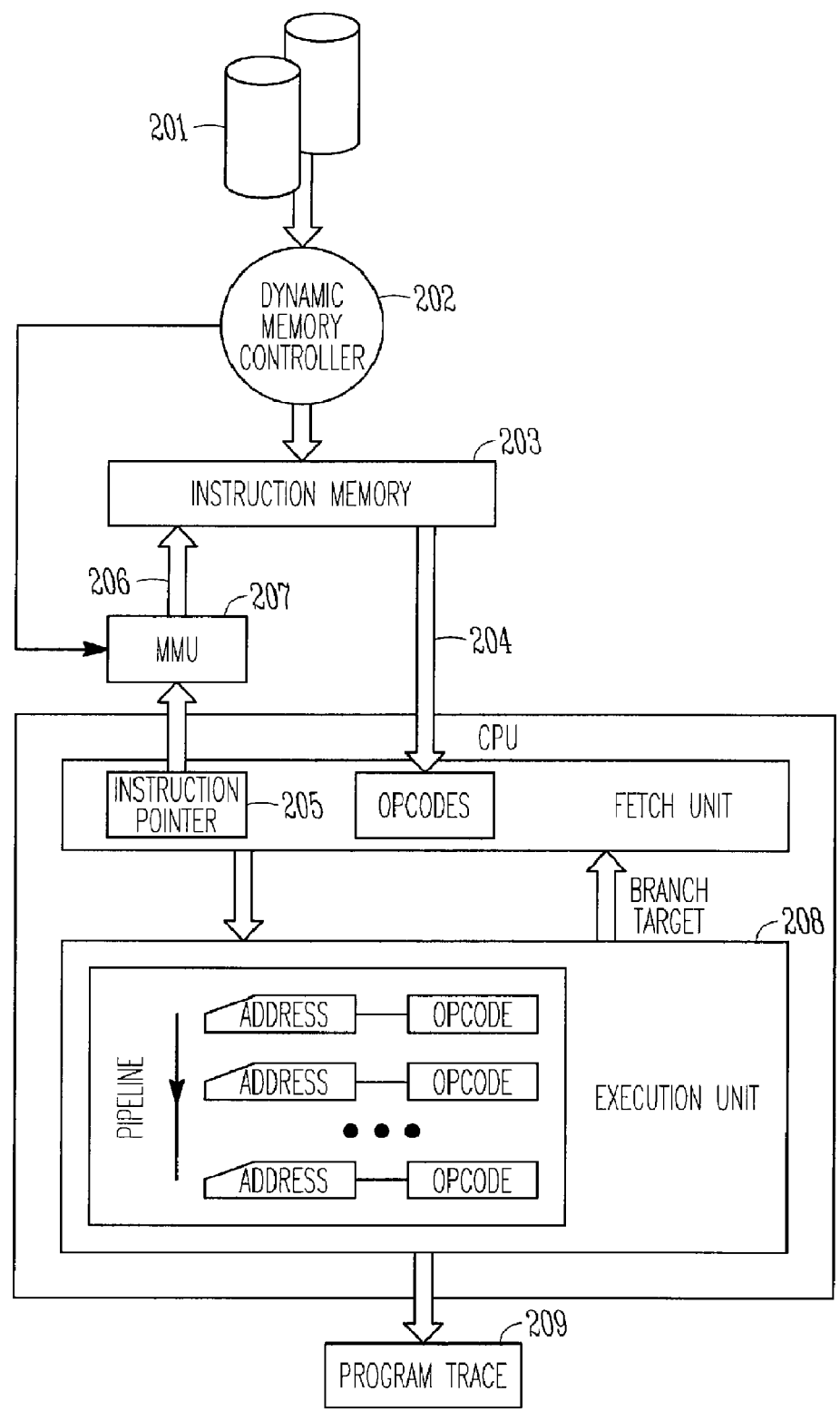
FIG. 2 illustrates a prior art device.
Figure 3:
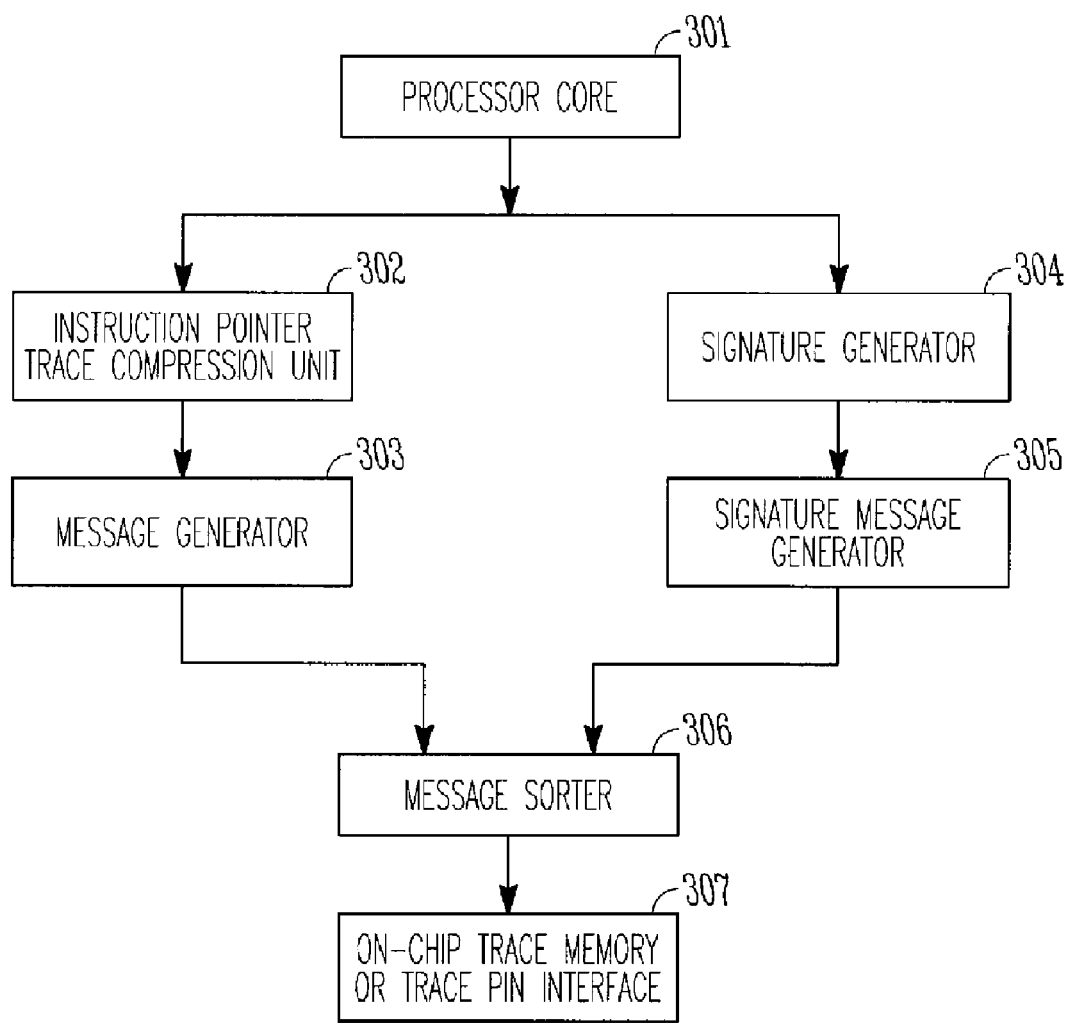
FIG. 3 illustrates is a block diagram of a processor comprising a signature generator and an instruction pointer trace unit of a prior art device.

A. Dynamic Authentication of Executions Using Cache Line Signatures

An approach for authenticating program execution dynamically is to detect if the binaries of the executables are compromised during the execution. One way to do this is to detect that the instructions that are fetched and executed, as the program is running, are indeed the same instructions that are supposed to be fetched and executed.

One way to do this is as follows:

The executable code is broken down into contiguous chunks at the boundaries of the cache lines (say, of size L) at the lowermost on-chip cache level. If necessary, padding can be used at the end of the code to round its size up to a multiple of the cache line size at the lowest level cache. A signature is generated for each such line by simply generating a digest function D on smaller chunks of each such line, for example at 16-bit or 32-bit boundaries. Thus, for each lowest level cache line's worth of code (say, Li), a specific signature (say Si, where Si=D (Li)) is generated for that line.

The signature Si for each line Li of the program's authentic binary is then encoded using a secret key and stored in a separate array. This secret key can be stored within the TPM storage or, alternatively, a secure storage for such keys can be constructed using the TPM module (which provides the root of trust).

As the program execution is started, on-chip cache misses are triggered in the course of fetching instructions. As each line holding the instruction that triggered the L1 I-cache miss is fetched into the lowest level cache, the corresponding encrypted signature is also retrieved. A digest for the line fetched, say Lf, is then generated by applying the digest function, D, that is Sf=D(Lf) is computed.

The encrypted signature of Lf is then decoded and compared with the computed signature Sf. If the decrypted signature matches Sf, then we conclude that the original binaries were not tampered with, and are thus deemed verified. If the computed signature and decrypted signatures mismatch, an exception can be triggered or actions similar to that taken with the control flow validation mechanism can be triggered. In reality, as described in the implementation details below, the validation of the contents of a line will be deferred until an instruction located within that line commits.

A.1 Assumptions

The security of this mechanism for authenticating a program execution at run-time makes the following implicit assumptions:

1. Once an instruction is fetched, it cannot be modified or replaced within the processor's caches.

2. The digest function D is sufficiently strong in generating a fairly unique signature for each lowest level cache line. Put in other words, two different cache lines, containing two different sets of instructions cannot accidentally have the same signature except in rare circumstances, and preferably in a highly unpredictable manner. One way to do this is to combine the line's virtual address with the cache line's contents in deriving the unique signature for that cache line, while taking into account the predictability of the cache line address—such as consecutive line addresses differ by one, higher order bits in a line address are going to be similar or close, etc.

3. If the contents of the cache lines are unaltered, control flow proceeds on expected paths.

4. There is a secure mechanism for storing the key used for decrypting the cache line signatures. The various existing TPM infrastructures provide this ability.

The performance overhead of the present mechanism is dependent on a number of things. First, hardware support is needed to compute the signature of a lowest level cache line as it is fetched. Using a simple one-time pad, where the one time key is XORed with the encrypted signature to decrypt it, can be a very efficient solution but the mechanism is open to all the vagaries of using a one-time pad. Alternative mechanisms, albeit with a higher overhead, can be employed. Any delay in decrypting the signatures can be avoided by fetching the signatures of a number of consecutive lower-level lines into the processor and decrypting them in advance, for example using a cryptographic or authentication coprocessor separate from the normal instruction processing flow of the main processor, but which may be integrated on the same chip. Second, the signatures have to be stored in a manner that permits them to be fetched quickly as the cache lines themselves are being fetched.

We now describe implementation details that takes into account the delays in both generating a signature from a line fetched into the lowest level cache as well as the delay involved in decrypting a precomputed encrypted signature for the cache line.

A.2 Implementation

Assume that the lowest level cache line size is B bytes and the digest to be computed over Q byte chunks of each such line, where B is an integer multiple of Q and the digest of a line is also Q bytes long. Assume further that the executable module is N bytes long, starting at virtual address A and, for the sake of simplicity, that N is an integer multiple of B. The number of encrypted digests that we need to store for the executable is thus $M=(N/B)*Q$. Assume that these encrypted digests are stored contiguously in the order of the line addresses, starting at virtual memory address Z. The virtual address of the encrypted digest for the memory line with the address X that is fetched into the lower level cache on a L1 I-cache miss is: $a=((X-A)/B)*Q+Z$. Thus, given the address of a line, the address of its encoded digest can be easily located.

Figure 4:
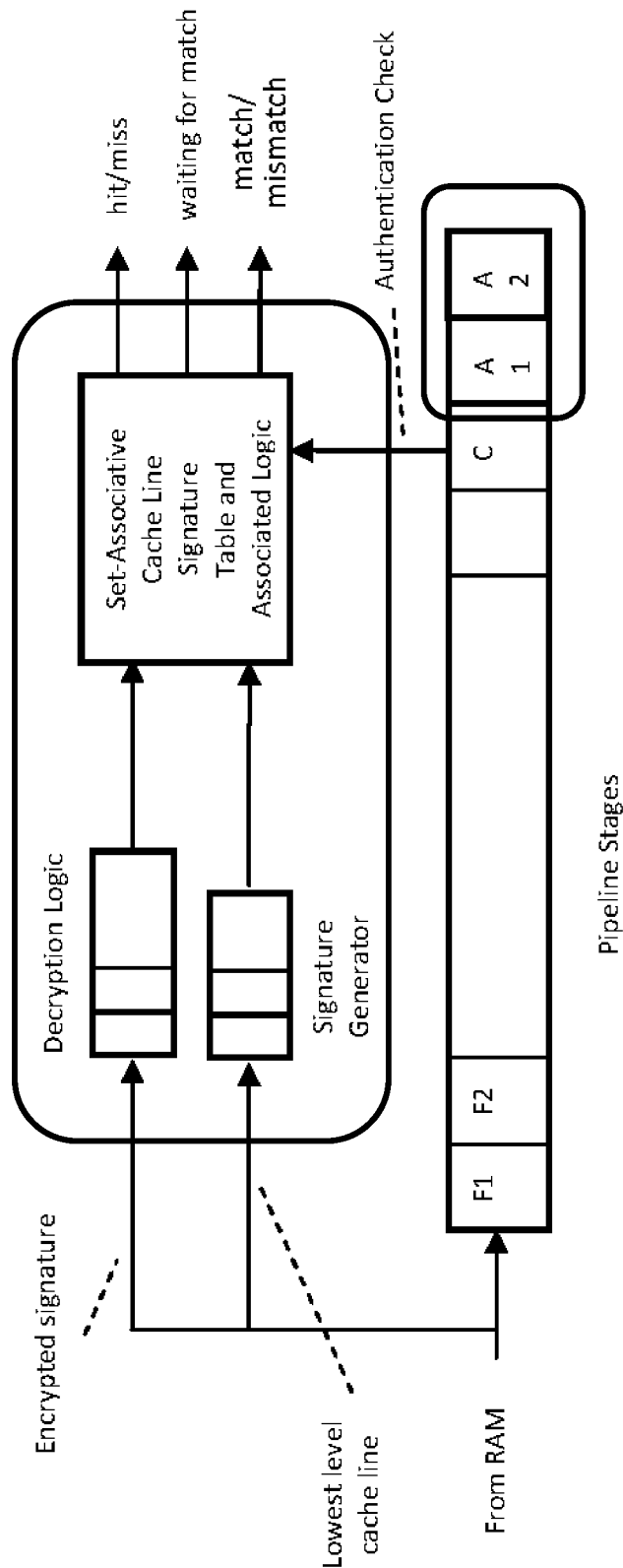
FIG. 4 illustrates a block diagram of an embodiment of the invention.

The cache based dynamic authentication mechanism is implemented as shown in FIG. 4. The implementation takes into account two constraints. First, it takes into account the fact that the both the generation of the signature of the fetched cache line and the decryption of the stored signature for comparison against the decrypted signature are potentially slow operations that take multiple pipeline cycles. Second, the signature of the line being fetched into the lowest level cache cannot be generated or generated and verified before that line is inserted into the cache and delivered to the fetch stage, as the time it takes to generate the signature or to fetch the encrypted signature from the signature table stored in the RAM and decrypt it for comparison against the signature generated of the fetched cache line will prolong the effective cache miss handling time and adversely impact the instruction fetch and decode rate.

According to an embodiment of the present technology, a set-associative structure called the Cache line Signature Table (CST) is used to hold the entry for a lowest level cache line that was fetched on an L1 I-cache miss. This entry holds either the decrypted signature fetched from the RAM or the generated signature, whatever is available earlier. Additionally, this entry holds status information that indicates:

(a) the status of the entry—allocated or de-allocated;

(b) what is currently held in the entry—a generated signature or a decrypted signature;

(c) if the stored entity is a generated signature (or a decrypted signature) was compared against the decrypted signature (or a generated signature); and (d) the outcome of a match comparing the generated signature against a stored signature.

These four states can be easily encoded using 2 bits. If the generated signature or the stored signatures are S bits long, each entry in the signature table is (S+2) bits wide.

When either a generated signature or a decrypted signature arrives at the CST, and if the other entity being compared (the decrypted signature or the generated signature, respectively) is not available in the CST entry (as seen from the status bits), the first entity targeting the CST entry is simply stored within the CST and the status bits updated appropriately. Otherwise, the comparison of the decrypted and generated signatures can be performed, and the result of the match stored in the status field.

When an instruction is being committed, the signature table is probed to look for a matching entry. If a matching entry is found (CST hit), the instruction is committed as usual only if the matching entry indicates that the comparison of the decrypted signature and the stored signature was successful. If the signature comparison was performed and the generated signature did not match the decrypted signature, an exception is generated and the instruction is not committed. For all other conditions on a CST hit, the instruction commitment is held up, and this may result in a stall elsewhere in the pipeline. If at the time of committing an instruction, a CST miss occurred, the pipeline is flushed, treating the instruction being committed as a mispredicted branch. This is done to ensure that instructions from a lowest level cache whose signature may have been potentially unverified cannot be committed.

Two additional pipeline stages (labeled A1 and A2) are added at the tail end of the pipeline, following the last pipeline stage that handles commitment (labeled C) to handle the CST lookup and associated activities described above. The normal commitment is delayed until the instructions are exiting from A2. Additional stages may be added if the CST lookup and activities require more than two cycles. These added stages, obviously, do not affect the instruction pipeline commitment stage in any way as they follow the stages that would perform commitment in a normal pipeline. On a miss at the lowest on-chip cache level that was triggered by a L1 I-cache miss, the missing line is fetched and handled as usual to satisfy the L1 I-cache miss.

The following actions are then undertaken simultaneously:

The signature table is probed to locate any matching entry in the table. If a matching entry is not found, it is allocated and initialized and pinned down until either the generated signature or the decrypted signature is written to the CST entry. Note that in the worst case, if an entry cannot be allocated in the CST on a lowest level cache miss, because all the ways in the matching set within the CST are pinned, the cache miss handling stalls. If a matching entry is found, three cases arise: if the matching entry indicates that a match was performed and it resulted in a mismatch, the entry is left untouched. This is done to ensure that uncommitted instructions from the cache line will trigger an exception at the time of commitment. If the CST entry indicates that a match occurred, it is marked as a pending match to ensure that instructions from the version of the lowest level cache line that will now be fetched are also authenticated properly. If the matching entry in the CST indicates a pending match, no further actions are taken until the missing cache line is fetched. At that time, the CST is probed again and if the CST entry is still found as match pending, instruction dispatching is stalled until the pipeline drains. After the pipeline has drained, the CST entry is completely reset and instruction issue resumes with other activities that corresponded to a CST miss. The pipeline draining step assures that that the proposed authentication scheme detects if the newly fetched version of the cache line was altered since it was last fetched and used. Another obvious way of altogether avoiding this corner case is to flush matching entries in the CST when corresponding lines are evicted from the lowest level cache, but this approach requires additional probes of the CST and takes a performance toll.

On setting up a new CST entry (or after marking an existing CST entry as match pending), the signature of the fetched cache line is generated immediately after fetching the line.

A memory request to fetch the encrypted signature is generated. In general, memory requests for handling cache misses take a precedence over memory requests for fetching encrypted signatures, but queued up memory requests for fetching encrypted signatures are given precedence over normal memory requests periodically to avoid livelocks.

A.3 Extensions

A.3.1 Signature Generation, Etc.:

The size of the signature, the generating function, etc. can be programmable. These can be generated by a trusted authority and appropriate header extensions can be added to the binary of the executed code to:

(a) convey location of encoded signature table;
(b) DLLs and their secret key (see below),
(c) other relevant info (will spell this out later).

A.3.2 Handling Dynamically Linked Libraries:

Each library has its own signature and perhaps a separate secret key for decoding. As a control flow occurs, information is provided to the code (or through the hardware) to locate the dedicated secret key for the library. This mechanism could also be implemented as a software trap on attempts to branch to DLLs.

A.3.3 Handling Computed Branches

The handling of computer branches works the generally same way as DLLs or branching within the same module. The signature of cache lines that contain the executed instructions can be verified.

Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the example embodiments of the invention described herein. It is intended that this invention be limited only by the claims, and the full scope of equivalents thereof.

REFERENCES (INCORPORATED HEREIN BY REFERENCE)

[1] SETI@home. setiathome.ssl.berkeley.edu/.
[2] TCPA. www.trustedcomputing.org/.
[3] A. Carroll, M. Juarez, J. Polk, and T. Leininger. Microsoft Palladium: A business overview, August 2002. Microsoft Press Release.
[4] B. Gassend, D. Clarke, M. Van Dijk, and S. Devadas. Controlled physical random functions. In *Proceedings of the 18th Annual Computer Security Applications Conference*, December 2002.
[5] D. Lie, C. A. Thekkath, M. Mitchell, P. Lincoln, D. Boneh, J. C. Mitchell, and M. Horowitz. Architectural support for copy and tamper resistant software. In *Proceedings of Conference on Architectural Support for Programming Languages and Operating Systems (ASP-LOS)*, pages 168-177, 2000.
[6] U. Maheshwari, R. Vingralek, and W. Shapiro. How to build a trusted database system on untrusted storage. In *Proceedings of the 4th USENIX Symposium on Operating Systems Design and Implementation*, pages 135-150, October 2000.
[7] S. W. Smith and S. H. Weingart. Building a high performance, programmable secure coprocessor. In *Computer Networks (Special Issue on Computer Network Security)*, volume 31, pages 831-860, April 1999.
[8] E. Suh, D. Clarke, B. Gassend, M. van Dijk, and S. Devadas. The AEGIS processor architecture for tamper evident and tamper resistant processing. Technical Report LCS-TM-461, Massachusetts Institute of Technology, February 2003.
[9] E. Suh, D. Clarke, B. Gassend, M. van Dijk, and S. Devadas. Hardware mechanisms for memory authentication. Technical Report LCS-TM-460, Massachusetts Institute of Technology, February 2003.
[10] S. Weingart. Physical security for the µABYSS system. In *Proceedings of the IEEE Computer Society Conference on Security and Privacy*, pages 38-51, 1987.
[11] S. White, S. Weingart, W. Arnold, and E. Palmer. Introduction to the Citadel architecture: security in physically exposed environments. Technical Report RC16672, IBM Thomas J. Watson Research Center, March 1991.
[12] B. Yee. *Using secure coprocessors*. PhD thesis, Carnegie Mellon University, May 1994.

What is claimed is:

1. A microprocessor comprising:
a multistage instruction processing pipeline, comprising at least one of branch prediction logic elements and speculative execution logic elements, and having a minimum pipeline latency between receipt of a first instruction of a sequence of instructions and readiness for commitment of execution of the first instruction, configured to:
receive a sequence of instructions for processing,
concurrently decode the received instructions during the pipeline latency,
dispatch the instructions,
advance respective instructions of the sequence of instructions to a stage prior to commitment of instruction execution,
commit execution of the sequence of instructions to produce at least one execution result comprising alteration of at least one register of the microprocessor external to the instruction processing pipeline in response to execution of at least one instruction and an availability of a verification signal, and
respond to at least one of a misprediction signal and failure of availability of the verification signal, to cause a rollback of the instruction processing pipeline to a state prior to an error which caused the at least one of the misprediction signal and the failure of availability of the verification signal;
a memory configured to store at least a predetermined encrypted reference digital signature;
decryption logic elements configured to decrypt the encrypted reference digital signature in dependence on a decryption key securely stored in, and received from a secure hardware environment to produce a reference digital signature corresponding to an expected digital signature of an authentic sequence of instructions;
verification logic elements configured to match the reference digital signature with a digital signature of the received sequence of instructions; and
authorization logic elements configured, within a first mode of operation, to generate the verification signal within the minimum pipeline latency, contingent upon verifying that the reference digital signature matches the digital signature.

2. The microprocessor according to claim 1, further comprising a cache memory signature generator configured to receive the sequence of instructions from a cache memory, and to calculate the digital signature of the received sequence of instructions from a line of the cache memory before receipt of the sequence of instructions by the instruction processing pipeline.

3. The microprocessor according to claim 2, wherein the cache memory is within the microprocessor.

4. The microprocessor according to claim 1, further comprising a memory from which the predetermined encrypted reference digital signature is fetched together with an associated sequence of instructions from a memory.

5. The microprocessor according to claim 1, wherein the secure hardware environment comprises a trusted platform module.

6. The microprocessor according to claim 1, wherein the microprocessor has a second mode of operation in which the verification signal is generated independent of the authorization logic elements.

7. The microprocessor according to claim 1, wherein the decryption logic elements are further configured to decrypt the encrypted reference signature associated with a respective instruction during a period prior to dispatch of the respective instruction.

8. The microprocessor according to claim 1, wherein the authorization logic elements are further configured to permit the instruction processing pipeline to contingently proceed only if the reference digital signature matches the digital signature.

9. The microprocessor according to claim 1, further comprising a table stored in a memory configured to store a plurality of outputs of the verification logic elements corresponding to a plurality of respective reference digital signatures.

10. The microprocessor according to claim 1, wherein the instruction processing pipeline is further configured to suspend processing of a respective instruction of the sequence of instructions until receipt of the verification signal.

11. The microprocessor according to claim 1, further comprising:
an interface to a memory storing a checkpoint state representing a predetermined verified state; and
checkpoint logic configured to cause the microprocessor to assume the checkpoint state upon failure of the verification authorization signal.

12. The microprocessor according to claim 1, further comprising:
an interface to a memory storing a checkpoint state representing a prior verified state; and
checkpoint logic configured to cause the microprocessor to roll back to the checkpoint state if the selective generation of the authorization upon failure of the verification signal.

13. A method for verifying instructions executed by a microprocessor, comprising:
receiving a sequence of instructions for processing by a multistage instruction processing pipeline having a minimum pipeline latency between receiving a first instruction of the sequence of instructions and readiness to commit execution of the first instruction, and comprising at least one of branch prediction logic elements and speculative execution logic elements responsive to at least one of a misprediction signal and failure of an availability of a verification signal to cause a rollback of the multistage instruction processing pipeline to a state prior to an error which caused the at least one of the misprediction signal and the failure of availability of the verification signal;
concurrently decoding, and dispatching a plurality of the sequence of instructions to a stage prior to commitment of instruction execution during the pipeline latency;
committing execution of the sequence of instructions to produce at least one execution result comprising alteration of at least one register of the microprocessor external to the instruction processing pipeline, in response to execution of at least one instruction and the availability of the verification signal;
storing at least a predetermined encrypted reference digital signature in a memory;
decrypting the encrypted reference signature in dependence on a securely received decryption key in a secure hardware environment, to produce a reference digital signature corresponding to an expected digital signature of an authentic sequence of instructions; and
verifying that the reference digital signature matches a digital signature of the received sequence of instructions and generating the verification signal, contingent upon verifying that the reference digital signature matches the digital signature, in a secure hardware environment that generates the verification signal within the minimum pipeline latency.

14. The method according to claim 13, further comprising:
receiving the sequence of instructions from a cache memory; and
calculating the digital signature of the received sequence of instructions from a line of the cache memory by a cache memory signature generator.

15. The microprocessor according to claim 1, wherein the digital signature of the received sequence of instructions is calculated from the cache memory line by a cache memory signature generator during execution of the sequence of instructions by the instruction processing pipeline.

16. The microprocessor according to claim 1, wherein a plurality of predetermined encrypted reference digital signatures are fetched together in advance of associated sequences of instructions from a memory.

17. The microprocessor according to claim 1, further comprising a cache line signature table, configured to store an entry representing the earlier available of the generated signature of the received sequence of instructions and the reference digital signature.

18. The microprocessor according to claim 17, wherein the entry further comprises:
(a) an allocation status of the entry;
(b) a type of entry status, selected from the group consisting of the generated signature of the received sequence of instructions and the reference digital signature;
(c) a matching status of whether the generated signature of the received sequence of instructions has been matched to the reference digital signature; and
(d) a verification outcome status of the match of the generated signature of the received sequence of instructions and the reference digital signature.

19. The microprocessor according to claim 1, further comprising a signature generator configured to generate the digital signature of the received sequence of instructions.

20. The microprocessor according to claim 19, wherein the received sequence of instructions are accompanied by the encrypted reference digital signature, which are concurrently fed to the multistage instruction processing pipeline, the decryption logic elements, and the signature generator.

* * * * *